United States Patent [19]
Davis et al.

[11] Patent Number: 5,638,054
[45] Date of Patent: *Jun. 10, 1997

[54] PAGING RECEIVER WITH MODIFIABLE FEATURES OR FUNCTIONS

[75] Inventors: Walter L. Davis, Coral Springs, Fla.; Kuppuswamy Raghunathan, Austin, Tex.

[73] Assignee: Motorola, Inc., Schaumburg, Ill.

[*] Notice: The term of this patent shall not extend beyond the expiration date of Pat. No. 4,518,961.

[21] Appl. No.: 214,068

[22] Filed: Mar. 16, 1994

Related U.S. Application Data

[63] Continuation of Ser. No. 90,993, Jul. 13, 1993, abandoned, which is a continuation of Ser. No. 760,320, Sep. 16, 1991, abandoned, which is a division of Ser. No. 83,743, Mar. 30, 1988, Pat. No. 5,117,750, which is a division of Ser. No. 83,874, Aug. 7, 1987, Pat. No. 4,829,466, which is a continuation of Ser. No. 924,183, Oct. 23, 1986, abandoned, which is a continuation of Ser. No. 699,899, Feb. 6, 1985, abandoned, which is a division of Ser. No. 575,472, Jan. 30, 1984, Pat. No. 4,518,961, which is a continuation of Ser. No. 192,779, Oct. 1, 1980, abandoned.

[51] Int. Cl.⁶ ........................................... H04Q 7/14
[52] U.S. Cl. .................. 340/825.44; 340/825.47; 455/38.4; 455/343
[58] Field of Search .................. 340/825.44, 825.47, 340/825.48, 311.1; 379/56, 57; 455/38.4, 228, 343; 370/84, 91

[56] References Cited

U.S. PATENT DOCUMENTS

| | | | |
|---|---|---|---|
| 3,626,296 | 12/1971 | Van der Veen | 340/825.44 |
| 3,747,074 | 7/1973 | Schulze | 370/91 |
| 3,775,751 | 11/1973 | Anderson | 370/84 |
| 3,851,251 | 11/1974 | Wigner et al. | 340/825.44 |
| 3,976,995 | 8/1976 | Sebestyen | 340/825.44 |
| 4,160,240 | 7/1979 | Partipilo | 340/825.44 |
| 4,194,153 | 3/1980 | Masaki et al. | 340/825.44 |
| 4,369,443 | 1/1983 | Giallanza et al. | 340/825.47 |
| 4,392,135 | 7/1983 | Ohyagi | 340/825.44 |
| 4,518,961 | 5/1985 | Davis et al. | 340/825.44 |

Primary Examiner—Edwin C. Holloway, III

[57] ABSTRACT

A battery powered paging receiver for receiving paging messages includes a memory for storing address information for the paging receiver and for storing information related to features or functions of the paging receiver. When the address information of the received paging message corresponds to the stored address information, the paging receiver processes the received paging message in accordance with the stored information related to features or functions of the paging receiver.

4 Claims, 23 Drawing Sheets

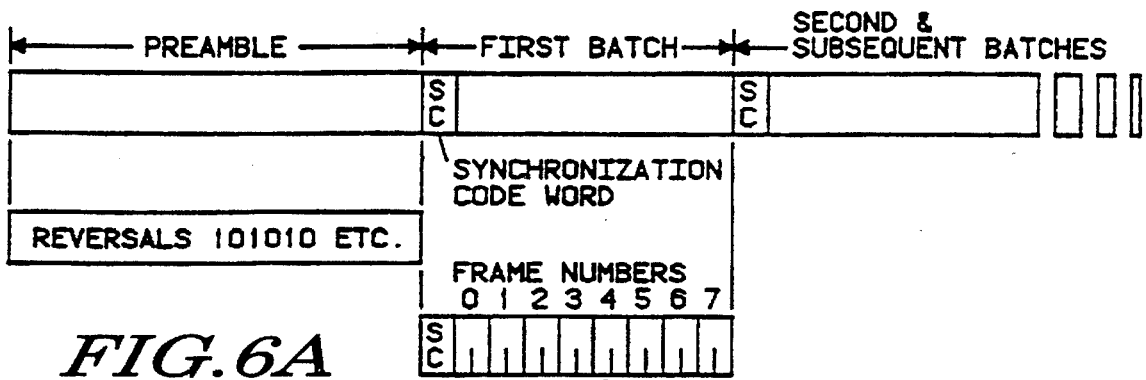
FIG.6A
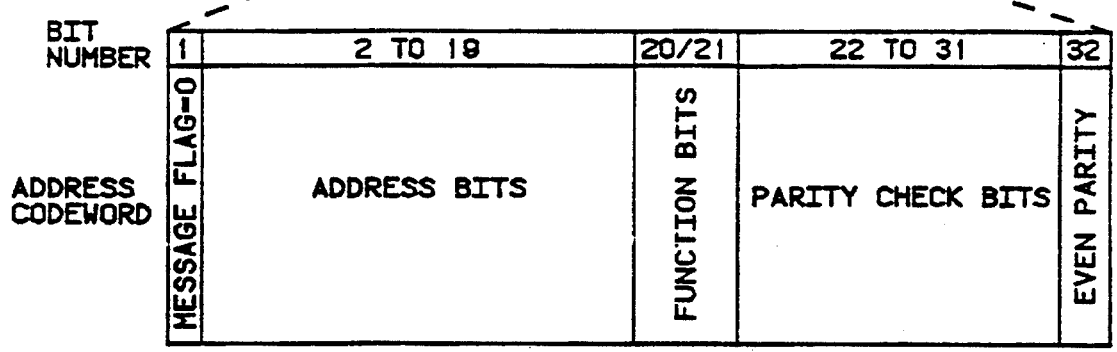
FIG.6B
| BIT POS. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
|  | 0 | 1 | 1 | 1 | 1 | 1 | 0 | 0 | 1 | 1 | 0 | 1 | 0 | 0 | 1 | 0 |
| BIT POS. | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
|  | 0 | 0 | 0 | 1 | 0 | 1 | 0 | 1 | 1 | 1 | 0 | 1 | 1 | 0 | 0 | 0 |
FIG.6C FIG.11A1
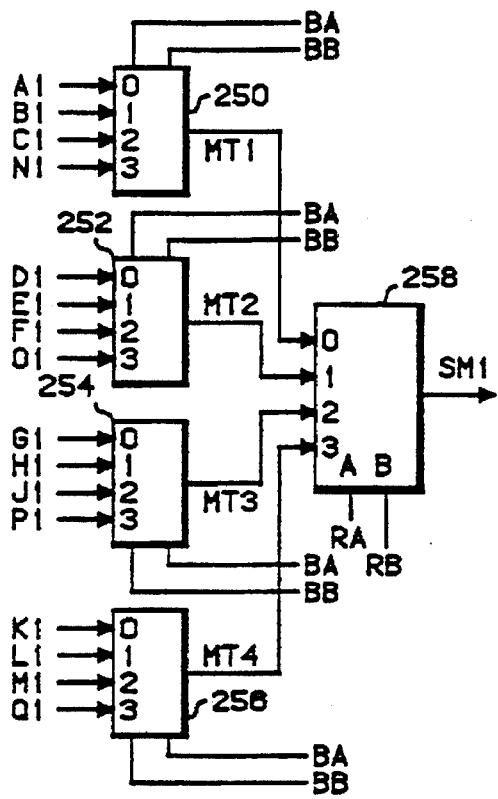
FIG.11A3
FIG.11A2
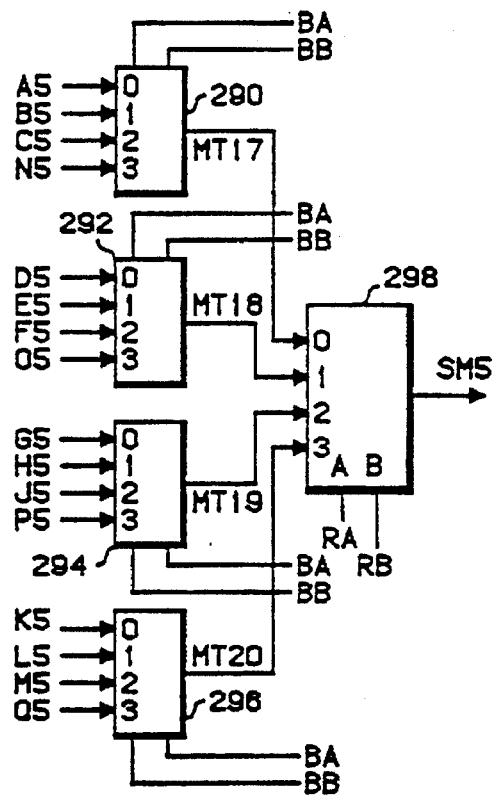
FIG.11A4

FIG.11B1
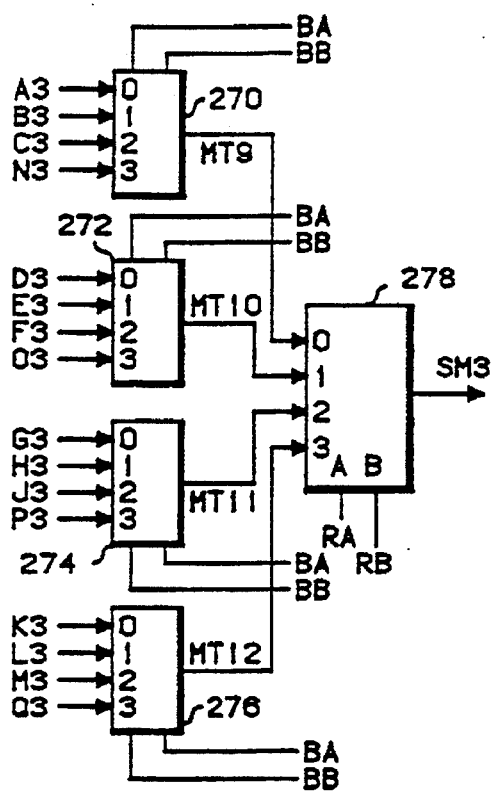
FIG.11B2
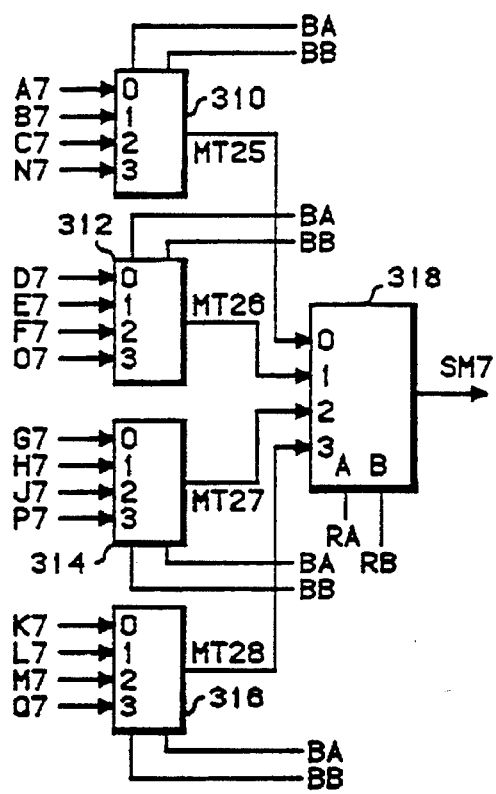
FIG.11B3
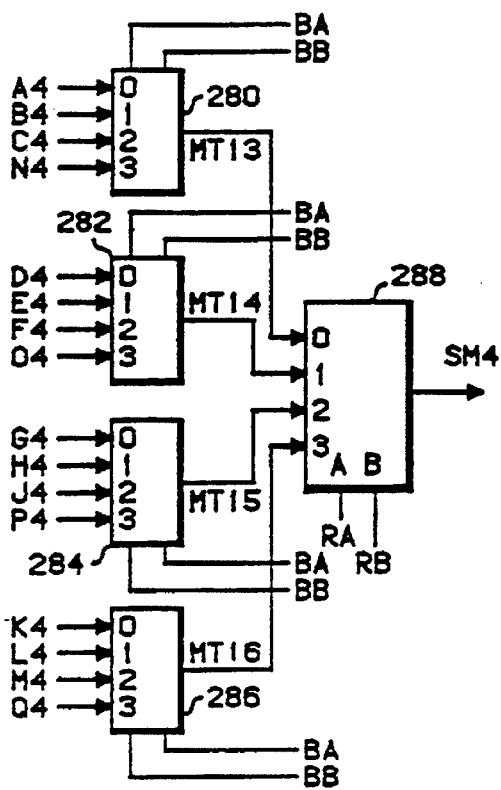
FIG.11B4
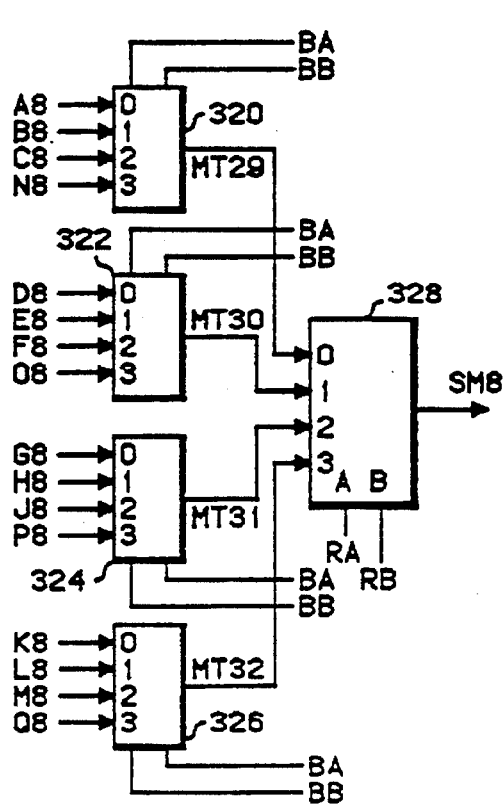

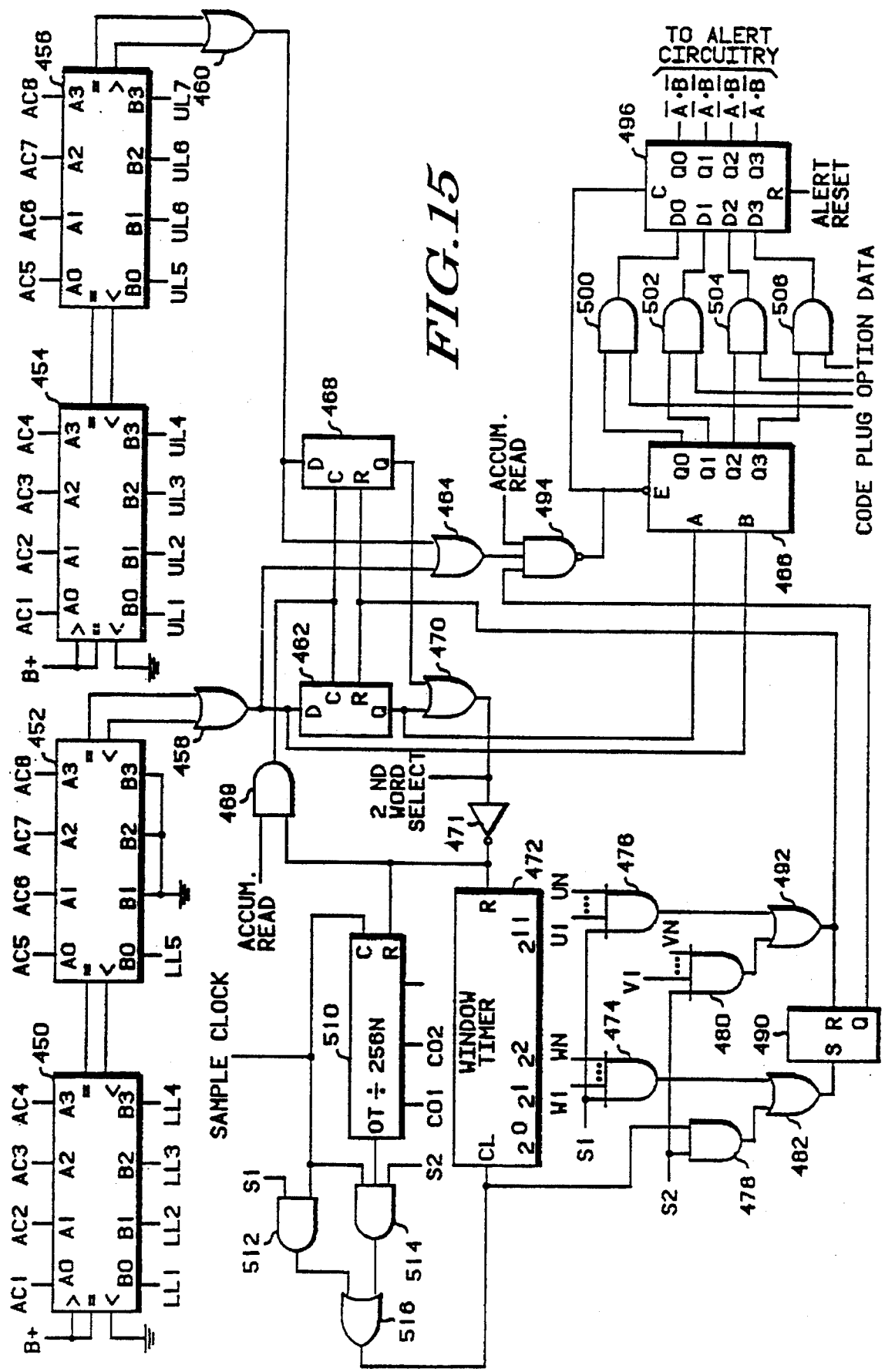

PAGING RECEIVER WITH MODIFIABLE FEATURES OR FUNCTIONS

This is a continuation of pending prior application Ser. No. 08/090,993 filed on Jul. 13, 1993 by Davis, et al. for "Paging Receiver With Modifiable Features Or Functions", now abandoned, which is a continuation of application Ser. No. 07/760,320, filed Sep. 16, 1991 now abandoned, which is a division of 07/083,743 filed on Mar. 30, 1988, now U.S. Pat. No. 5,117,750 which is a division of 07/083,874 filed Aug. 7, 1987 now U.S. Pat. No. 4,829,466 which is a continuation of 06/924,183 filed on Oct. 23, 1986, now abandoned which is a continuation of 06/699,899 filed on Feb 6, 1985, now abandoned, which is a division of 06/575,472 filed on Jan. 30, 1984, now U.S. Pat. No. 4,518,961 which is a continuation of 06/192,779 filed on Oct. 1, 1980 by Davis et al. for "Paging Receiver With Modifiable Features Or Functions", now abandoned.

BACKGROUND OF THE INVENTION

1. Field of the Invention

This invention relates generally to the field of portable paging systems and in particular to a portable paging device in which the signal processing is performed by a decoder operating in real time to provide multiple scheme decoding and energy-saving routines.

2. Description of the Prior Art

Pagers are generally small, portable, battery-operated radio receivers designed to be carried on the person of the user in a pocket or clipped to a belt. A typical user might be a medical doctor or maintenance person. The technique used in paging systems is referred to as selective calling in which transmissions intended for a particular receiver will cause a response only in that receiver. The selective calling capability is achieved by assigning to each pager one or more unique address codes which are encoded and modulated on the carrier wave. Each pager includes a decoding portion which is designed to cause a response only to its assigned address codes. If one of the assigned address codes is detected, the pager is activated to produce a corresponding alert Signal. Normally, none of the other pagers in the communications system will be activated by that transmission unless the system has a group call operation.

Pager communication systems are well known in the art and operate with many types of coding schemes including single or multi-tone signals, selected combination of tone and voice signals and digitally encoded signals. Typically there are wide area paging services capable of transmitting throughout a metropolitan area and local paging services which transmit in a much smaller service area as, for example, a specific building complex or other facility. The range of operation of the various systems is generally determined by the power of the transmitter used.

If a pager carrier, or user, is required to receive signals within the boundaries of several facilities, he could require a separate local pager for each such facility. The occurrence of such problems can be frequent, as is the case with doctors who may be on the staff of several hospitals and are required to visit patients in several hospital locations. Moreover, changing location, such as traveling to a nearby city having a different wide area service system, would render an original wide area pager and all of the several local pagers useless and require an entirely new set of pagers. Thus, it would be advantageous to have a paging device which can function to provide decoding and alert signaling for more than one pager communications system. Then the difficulty of changing pager addresses on a specific device or physically changing pagers or altering circuitry to change address codes when a pager is carried from one message service area to another could be eliminated.

While there are several tone only and tone and voice signal decoding systems, the decoding of such information is generally not as difficult or as demanding as decoding those systems which employ digitally encoded signals. Such digital systems are capable of a high volume of messages transmitted per unit time because of the faster information rate they can transmit for addressing individual paging devices.

The digital information which is sent out in a digital communications system normally comprises a binary signal train which includes level transitions from a first level to a second level. These levels indicate the distinction between a binary 0 and a binary 1. There must also be a specific time duration which corresponds to a bit interval. The non-return-to-zero (NRZ) binary coding system generally used does not delineate bit intervals. It therefore is necessary to ascertain when an information bit begins or ends and this applies to both synchronous and asynchronous systems. Because of the variability of the nature of the information in an could pass without the occurrence of a transition in the signal levels. Thus it is generally not obvious simply from the information received at a receiver precisely when a bit interval begins or ends.

There are two general types of digital systems and they are distinguishable by the time relationships between transmitter and receiver. In synchronous systems, the transmitter and receiver must be in synchronization so that bit address sequences and frames delineating information words can be correctly decoded. By contrast, asynchronous systems normally decode a preliminary information word which constitutes part of an address and, when identified, causes the establishment of a time window in anticipation of the subsequent detection of digital information related to the remaining portion of the address of an individual paging device. With either synchronous or asynchronous systems, the difficulties of providing decoding for more than one encoding system are complex. Moreover, the presence of a multi-system capability in a pager demands some sort of prioritizing to insure proper function when more than one system can be detected by the pager.

The prior art signal processing circuitry for pager communication devices generally comprise custom integrated circuits or custom hybrid circuits which perform the specific high speed decoding functions for a single signal decoding system. A multi-system pager by utilizing the present IC and hybrid decoding technology is prohibitive from the view of cost, design complexity and power consumption. In addition, there exist present and proposed pager communications systems which, because of total unit market volume, could not support the initial tooling and engineering costs associated with the development of the custom circuitry presently required and are therefore prevented from being established. However, the economy offered by a multi-system pager would make it possible to profitably manufacture relatively small numbers of single system pagers by adapting a high unit volume, multi-system pager to decode one specific decoding scheme.

A critical requirement for any signal decoder for a paging system is that it must process signals in real time so that decoding does not fall so far behind that information is lost. The concept of real time processing is well known in the art and is associated with the actual time during which physical events take place. With respect to real time signal processing by a decoder, the operations performed by the decoder which relate to a detection and decoding process must be sufficiently. rapid so that the results obtained are useful in controlling the device without the loss of information. Thus the operational speed of a multi-system decoder which is to perform digital signal processing is directly related to the information rate at which the pager communication system operates. The digital information transmission rate may vary from system to system and it is clear that faster rates are preferred because more information may be handled by an entire system in a given unit of time. Clearly, the faster the information rate the greater the processing speed demand on a multi-system decoder.

The high clock rate for a multi-system decoder performing signal processing in real time increases both the voltage required and power consumed by the system and thus can adversely affect the operating economics of a pager and could affect both the size and weight of the device. Just as it is a disadvantage to carry several different pagers around, it is equally disadvantageous to carry a bulky or heavy power pack to provide the power for the operation of a paging device. In general, the greater the power consumption, the larger the mass of the batteries which must be carried to provide for the operation. Indeed if the power drain is too great, fresh primary cells might be required for every few hours of operation. This could even create a situation in which operating batteries and several fresh cells would be carried by the person using the pager to ensure continuous operation. Because the pager is for individual portable operation, it is imperative that battery energy be conserved to provide a useful operational life for multi-system signal decoding.

SUMMARY OF THE INVENTION

The present invention encompasses a communication system message signaling device having a multi-scheme signal decoding capability for portable applications which comprises a battery operated communications receiver for detecting encoded signals transmitted over a communication channel and a decoder, coupled to the battery and responsive to detected encoded signals from the receiver to process the detected encoded signals in real time. The decoder is capable of processing the detected signals in accordance with any one of a plurality of decoding schemes. Also included is coding scheme selection means, coupled to the receiver and the decoder, and responsive to predetermined characteristics of the detected encoded signals for selecting which of the plurality of decoding schemes will be utilized for processing the detected encoded signals. A code memory, coupled to and accessed by the decoder, contains information corresponding to each one of the plurality of decoding schemes including a predetermined sequence of encoded signals in the selected scheme, the reception of which will cause an individual decoder to respond by signaling. The decoder has an equivalent embodiment which comprises a microcomputer.

Another aspect of the present invention encompasses a communication system message signaling device for portable applications which comprises a battery operated communications receiver for detecting encoded signals transmitted over a communications channel and a decoder, coupled to the battery and responsive to detected encoded signals in real time, the decoder including an internal clock establishing timing signals. Also included is a conservation means responsive to the timing signals of the decoder for reducing the power drain on the battery by temporarily disabling selective functions of the message signaling device. A code memory is coupled to aND accessed by the decoder and contains predesignated information, the reception of which will cause an individual decoder to respond by signaling. The decoder has an equivalent embodiment which comprises a microcomputer.

BRIEF DESCRIPTION OF THE DRAWINGS

Features of the invention which are believed to be novel are set forth with particularity in the appended claims. The invention itself, however, together with its further objects and advantages thereof, may be best understood by reference to the following description, when taken in conjunction with the accompanying drawings, in which:

FIGS. 6A, 6B and 6C comprise a descriptive diagram for one of a first data encoding systems for the preferred embodiments of the invention.

FIGS. 11A and 11B show the detailed electrical schematic of a multiplexer portion of the schematic of FIG. 8.

FIG. 15 shows the detailed electrical schematic for an error comparator portion of FIG. 8.

DESCRIPTION OF THE PREFERRED EMBODIMENTS

Figure 1:
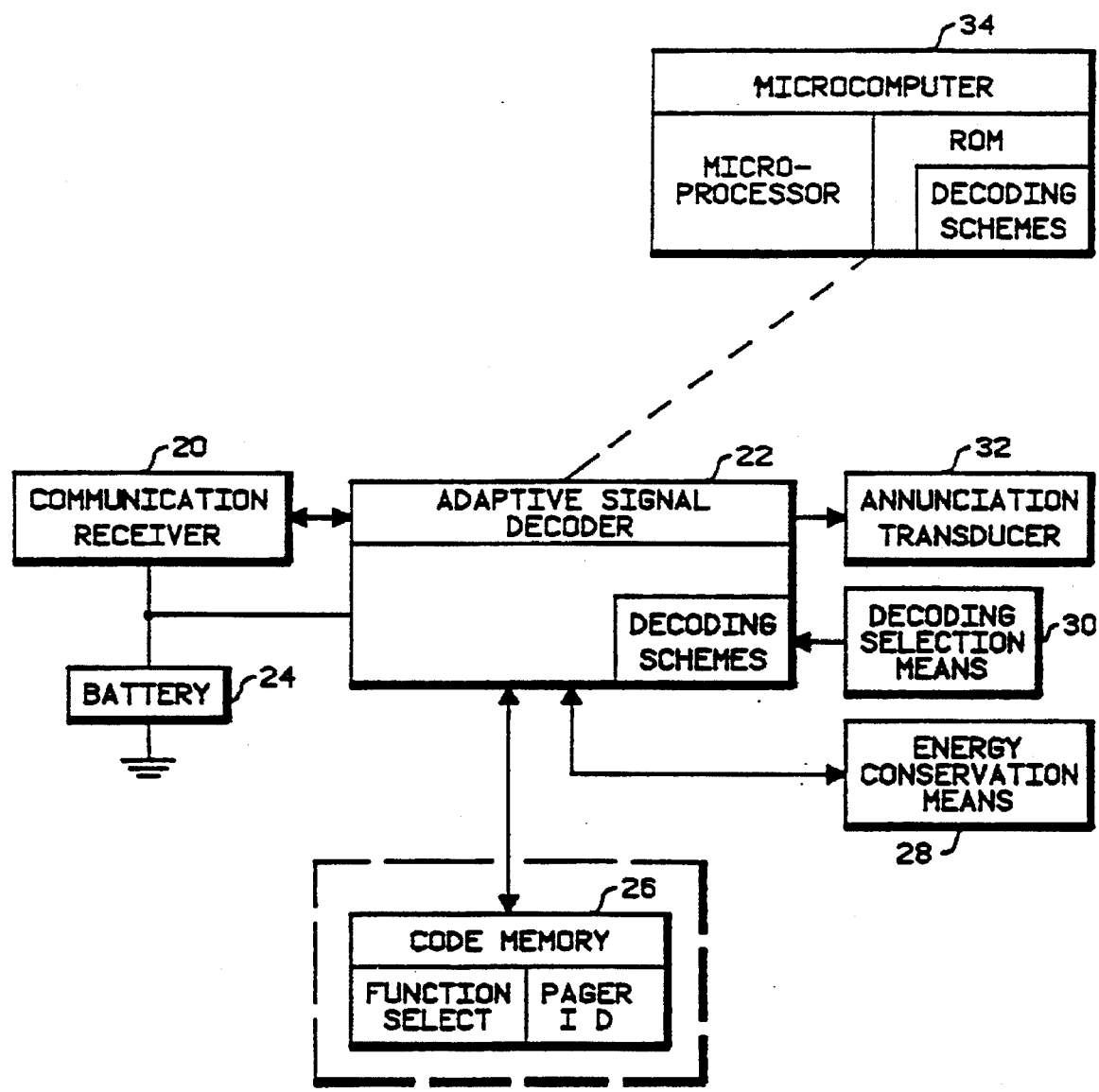
FIG. 1 is a functional block diagram of the present invention showing equivalent preferred embodiments.

FIG. 1 shows a functional block diagram applicable to both a first and second embodiment of the present invention. A communication receiver 20 is connected to an adaptive signal decoder 22. Decoder 22 contains a region designated Decoding Schemes which serves to indicate that it contains information to decode more than one decoding scheme. A battery 24 is shown connected to communication receiver 20 and decoder 22. Decoder 22 is additionally connected to a code memory 26 shown enclosed with a broken line. Code memory 26 further contains regions designated Function Select and Pager ID. The enclosure of code memory 26 with a broken line indicates the possibility that such a device can be made removable and therefore separable from the rest of the system. Also interconnected with decoder 22 is an energy conservation means 28. A decoding selection means 30 is coupled to the Decoding Schemes region of signal decoder 22. An output of signal decoder 22 is coupled to an annunciation transducer 32:

A microcomputer 34 is shown interconnected with adaptive signal decoder 22 by a broken line. This interconnection indicates that adaptive signal decoder 22 may be replaced entirely by microcomputer 34. Microcomputer 34 is shown to be further comprised of a microprocessor and a read-only memory, with the read-only memory portion including a section designated as Decoding Schemes. Microcomputer 34 will have the identical interconnections as does decoder 22. The replacement of adaptive signal decoder 22 by microcomputer 34 would also provide the exact same signal decoding functions and the resulting system function would be indistinguishable to a pager user. Thus, the function of the two alternative embodiments are indistinguishable within a device.

The operation of the system shown in FIG. 1 is such that the communication receiver is capable of receiving messages in any of several message formats. Adaptive signal decoder 22 responds to the received signals to analyze the data and select one of several decoding schemes for appropriately decoding the incoming information received by communication receiver 20. As with all paging devices, the resulting decoded signal is tested for comparison with a designated pager address contained in code memory 26. Upon detecting correspondence between the received and decoded signal, the address in code memory 26, an output signal is produced indicating to the pager user that a message has been received. In particular, the output signal from decoder 22 is supplied to annunciation transducer 32 to produce a signal indicative of the receipt of a message.

Because of the requirements for high speed, real time adaptive signal decoding and the requirement of preserving and extending the useful life of the battery contained in a paging device, energy conservation means 28 functions in cooperation with adaptive signal decoder 22 to conserve battery 24. It may also be appreciated that decoding selection means 30 provides an exterior selector to the pager operator to designate only some of the possible decoding schemes. This selective function may also be supplied by the code memory or may be factory preset independently of the code memory. It may also be appreciated that code memory 26 may contain several addresses, each one corresponding to the appropriately selected decoding scheme which is determined by the decoder 22 in response to the signals received by receiver 20.

In addition, code memory 26 includes a function elect region which is used to select the various features of the pager device. It is advantageous to build in the circuitry for all functions and then provide information in code memory 26 which identifies the address of the pager and designates various combinations of the possible function and annunciation features of the system.

The replacement of adaptive signal decoder 22 by microcomputer 34 containing its microprocessor and the decoding schemes contained within the read-only memory region provides the same diagram with block 22 removed and replaced in its entirety by block 34. The difference is in the internal function of the microcomputer in that, instead of the hardware adaptive signal decoder responding to the received communication signal, the microcomputer uses a microprocessor for processing the received signals in real time according to the same predetermined search routine. After identification by the same process, the microprocessor accesses the Decoding Scheme region of the read-only memory to determine the correct instructions contained in that memory for processing the decoding scheme. The microprocessor will access the code memory just as the adaptive signal decoder does and will respond to the external decoding selection means.

Again, the energy conservation means interacts with the microprocessor and ROM to conserve the battery for the system. When the microprocessor has detected the reception of a signal which corresponds to a pager identification contained in the code memory, microcomputer 34 connects with annunciation transducer 32 to produce a signal so that the pager carrier is made aware that a message has been received in one of the possible decoding schemes. For either the decoder or microcomputer, the form of the alert signaling pattern provided to the pager carrier may be a function of which of the various decoding schemes is detected. The decoding scheme may provide for both emergency and non-emergency calls with corresponding signals supplied to the annunciation transducer so that the pager carrier receives a distinct signal and can respond accordingly.

Figure 2:
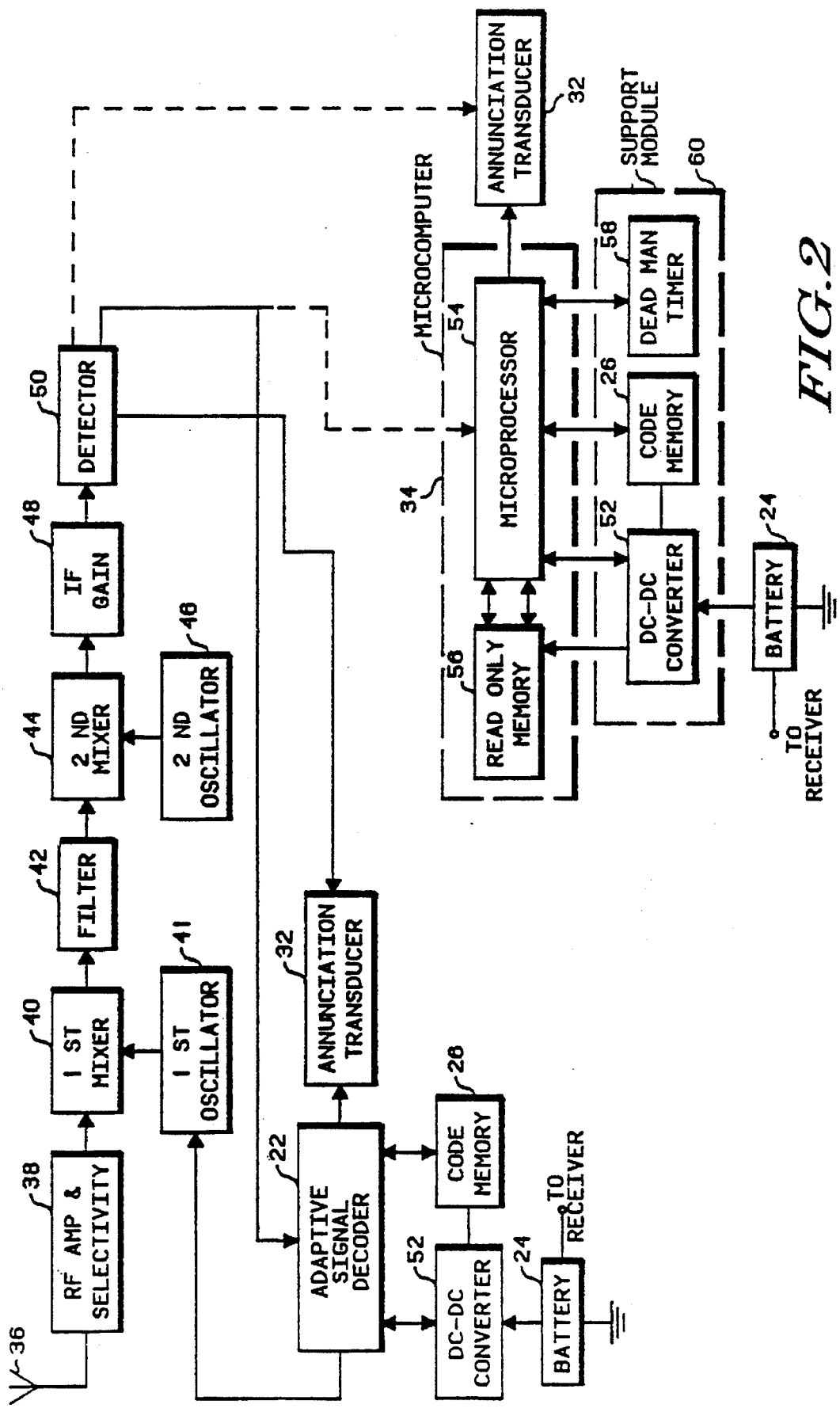
FIG. 2 is a more detailed functional block diagram of the present invention showing equivalent preferred embodiments.

FIG. 2 shows a more detailed block diagram of the embodiments of the present invention. An antenna 36 is connected to a radio frequency amplifier and selectivity device 38 which is connected to a first mixer 40. A first oscillator 41 is also connected to first mixer 40. The output of first mixer 40 is coupled through filter 42 to a second mixer 44. A second oscillator 46 is also connected to second mixer 44. The output of second mixer 44 is connected through an intermediate frequency (IF) gain device 48 to a detector 50. The first portion of FIG. 2 comprises a more detailed description of communication receiver 20.

The output of detector 50 is connected to adaptive signal decoder 22. Signal decoder 22 is connected to first oscillator 41. As in FIG. 1, the output of adaptive signal decoder 22 is connected to annunciation transducer 32. Detector 50 is shown connected to annunciation transducer 32 which is a normal connection for tone and voice paging system. Battery 24 is shown as providing power to the communication receiver and is also connected to a DC to DC converter 52. DC to DC converter 52 is also interconnected with adaptive signal decoder 22 and with code memory 26. Code memory 26, as before, is interconnected with decoder 22.

FIG. 2 shows in phantom line the complete replacement of the adaptive signal decoder 22 with the corresponding microcomputer 34 and peripheral devices. In particular, microcomputer 34 is shown as comprised of a microprocessor 54 multiply interconected with a read-only memory 56. Read-only memory 56 is interconnected with DC to DC converter 52. Microprocessor 54 is interconnected with DC to DC converter 52 and with code memory 26. Code memory 26 and DC to DC converter 52 are also interconnected. Microprocessor 54 is also shown interconnected with a deadman timer 58. The three peripheral devices, the DC to DC converter 52, code memory 26 and deadman timer 58, are shown enclosed by a broken line and are designated as a support module 60. Although not shown when microcomputer 34 replaces decoder 22, first oscillator 41 is connected to microprocessor 54. Detector 50 is shown connected in phantom with annunciation transducer 32 as is customary for tone and voice page systems. Battery 24 is shown connected with DC to DC converter 52 as before and supplying power to the communication receiver portion.

As is customary with radio receivers, the antenna receives a radio frequency signal which is suitably amplified and selected. Using a syperheterodyne technique, the first local oscillator 41 beats with the incoming signal frequency in mixer 40 the output of which is supplied to filter 42. The output of filter 42 is supplied to a second mixer 44 where the signal is mixed with the output of second oscillator 46 and the output supplied to the intermediate frequency gain circuit 48. The output of the gain circuit 48 is supplied to detector 50 which recovers the encoded signal from the modulated IF output. While a specific superheterodyne radio system has been described, it should be apparent to those skilled in the art that many other forms of communications receivers may be utilized.

The detector output is supplied to the adaptive signal decoder which may include multi-scheme decoding. The adaptive signal decoder is adaptive in the sense that it performs various characteristic measurements of several possible schemes should be applied for decoding. When a suitable scheme has been identified, the data is then decoded according to that format and the code memory is interrogated to see if the paging device has been addressed. In the event that the paging device has indeed been addressed, annunciation transducer 32, as before, produces a detect signal to the pager carrier.

It has been tacitly assumed that the various decoding schemes would all function on the same communications channel. The multi-scheme decoding of adaptive signal decoder 22 includes searching and detecting paging message schemes which may not operate at the same frequency. The function of the control line from decoder 22 to first oscillator 41 is to show that decoder 22 can, by the well-known process of frequency synthesis, control the frequency at which it receives signals for decoding. Consistent with the equivalent function of the embodiments, the same control can be exercised by microcomputer 34. Thus the multi-scheme decoding encompasses a plurality of different decoding schemes operating at different frequencies.

The battery 24 is interconnected through a DC to DC converter which supplies power to the adaptive signal decoder 22. The DC to DC converter is also responsive to the adaptive signal decoder 22 and comprises the energy conservation means. When the adaptive signal identifies the decoding scheme it also specifies those periods during which full power may not be required to determine if the pager has been addressed. Such time periods are established by the organization of the message scheme transmission format. Moreover, the DC to DC converter can provide any additional voltage necessary to operate the adaptive signal decoder at higher voltage levels to support the high speed real time operation.

For the second embodiment of FIG. 2, as in FIG. 1, adaptive signal decoder 22 is now entirely replaced with microcomputer 34 and the interconnected peripheral devices. The DC to DC converter 52 supplies power to read-only memory 56 and is responsive to microprocessor 54. Again, according to the determined coding scheme, at various times appropriate for the message formatting of the detected coding format, DC to DC converter 52 can reduce the power supplied to the system thereby conserving the battery energy. Deadman timer 58 funtions to ensure that there are no runaway execution conditions. In particular, microprocessor 54 is designed to provide a signal to deadman timer 58 on regular intervals. In the event that the deadman timer does not receive these signals at regular intervals, it will force a reinitialization of the program routine in microprocessor 54 to cause initialization of the searching to identify the decoding scheme being received.

The detected signals will also be processed according to the detected decoding scheme and the resulting information compared with the pager address information contained in code memory 26. The functioning of the signal detection device whether it contains a microcomputer or an adaptive signal decoder is completely indistinguishable from the point of view of the pager carrier.

Figure 3:
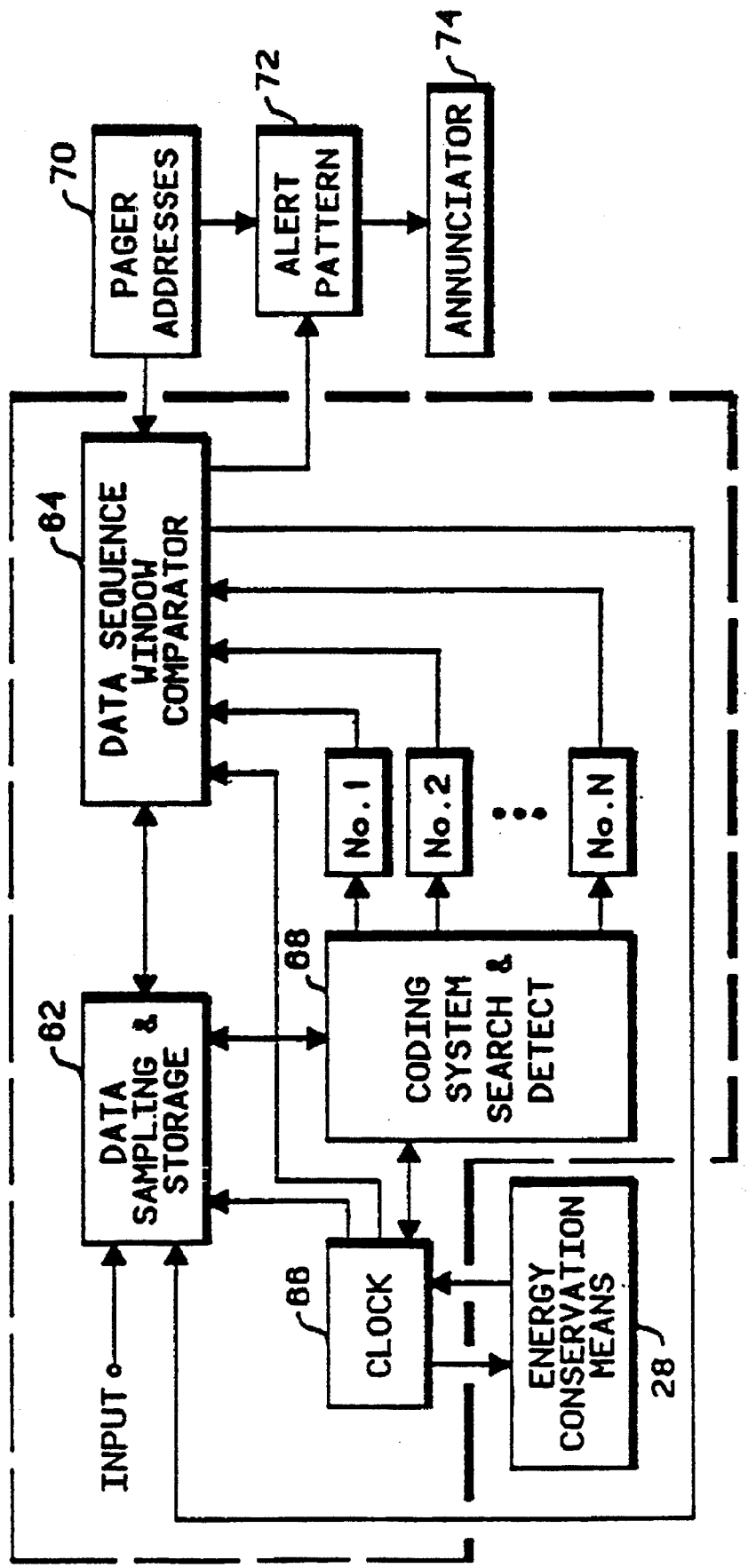
FIG. 3 is a functional block diagram showing the common infrastructure of the preferred embodiments.

FIG. 3 shows a block diagram corresponding to FIG. 1 emphasizing the common functional infrastructrue of adaptive signal decoder 22 and microcomputer 34. This diagram is equally applicable to both the hardware adaptive signal decoder system and the firmware microcomputer system of the two embodiments. The signal from detector 50 of FIG. 2 labeled Input is applied to a data and sampling storage circuit 62. The output of the data sampling and storage circuit 62 is supplied to a data sequence window comparator 64. The data sampling circuit receives timing signals from a clock 66 which is capable of supplying multiphase clock timing signals. Clock 66 also supplies timing signals to a coding system search and detect circuit 68. Data sampling and storage circuit 62 is interconnected with coding system search and detect circuit 68. The output of coding system search and detect circuit 68 is a plurality of signals, each one of which designates that one of the several possible decoding systems has been detected. These signals are connected to data sequence window comparator 64 so that the proper decoding may proceed. Data sequence window comparator 64 is also connected to clock 66. Clock 66 is also interconnected with coding system search and detect circuit 68. Energy conservation means 28 is interconnected with clock 66 to provide periods of lessened power drain.

Data sequence window comparator 64 is connected to a pager address circuit 70 which is normally contained in code memory 26. The output of data sequence window comparator 64 is coupled to an alert pattern circuit 72. Alert pattern circuit 72 is connected to be responsive to pager address circuit 70. The output of alert pattern circuit 72 is connected to an annunciator device 74 which corresponds to annunciation transducer 32 previously described.

When detector 50 (FIG. 2) contained in the communication receiver provides an input to the data sampling and storage circuit 62, clock 66 provides for sampling the data in a regular pattern as will be shown and described in more detail later. At the time the data is received, a decoding system search routine is initiated to determine, based on the characteristics of the detected code, which of the several possible decoding schemes should be utilized for decoding the data. This is accomplished by applying the various parameters to the detection system corresponding to each of the possible systems and testing the data for identifying characteristics. Once the decoding system has been identified, the proper limits are applied to data sequence window comparator 64 and the sampled and stored data is then appropriately processed to decode the information. An advantage of the technique of sampling and storing the data is that little if any sampled data is lost during the scheme identification process so that a high degree of confidence may be maintained in determining whether the pager has been addressed. Moreover, this process occurs in real time so that all of the received data may be used to both confirm the decoding system received and to apply the decoding to the detected signal to ascertain whether or not the pager has been addressed. The output of the data sequence window comparator 64 is fed back to data sampling and storage circuit 62 to initiate taking additional samples or to continue the sampling technique according to the scheme of the detected coding system.

The function of the interconnection between data sequence window comparator 64 and data sampling and storage circuit 62 is to continue sampling where necessary according to the selected scheme. This may be two or more sequential address words or it may be additional batches of encoded signals which must be processed according to the position of a signal within a batch of coded messages. For single address word systems the interconnection would not be utilized.

Figure 4:
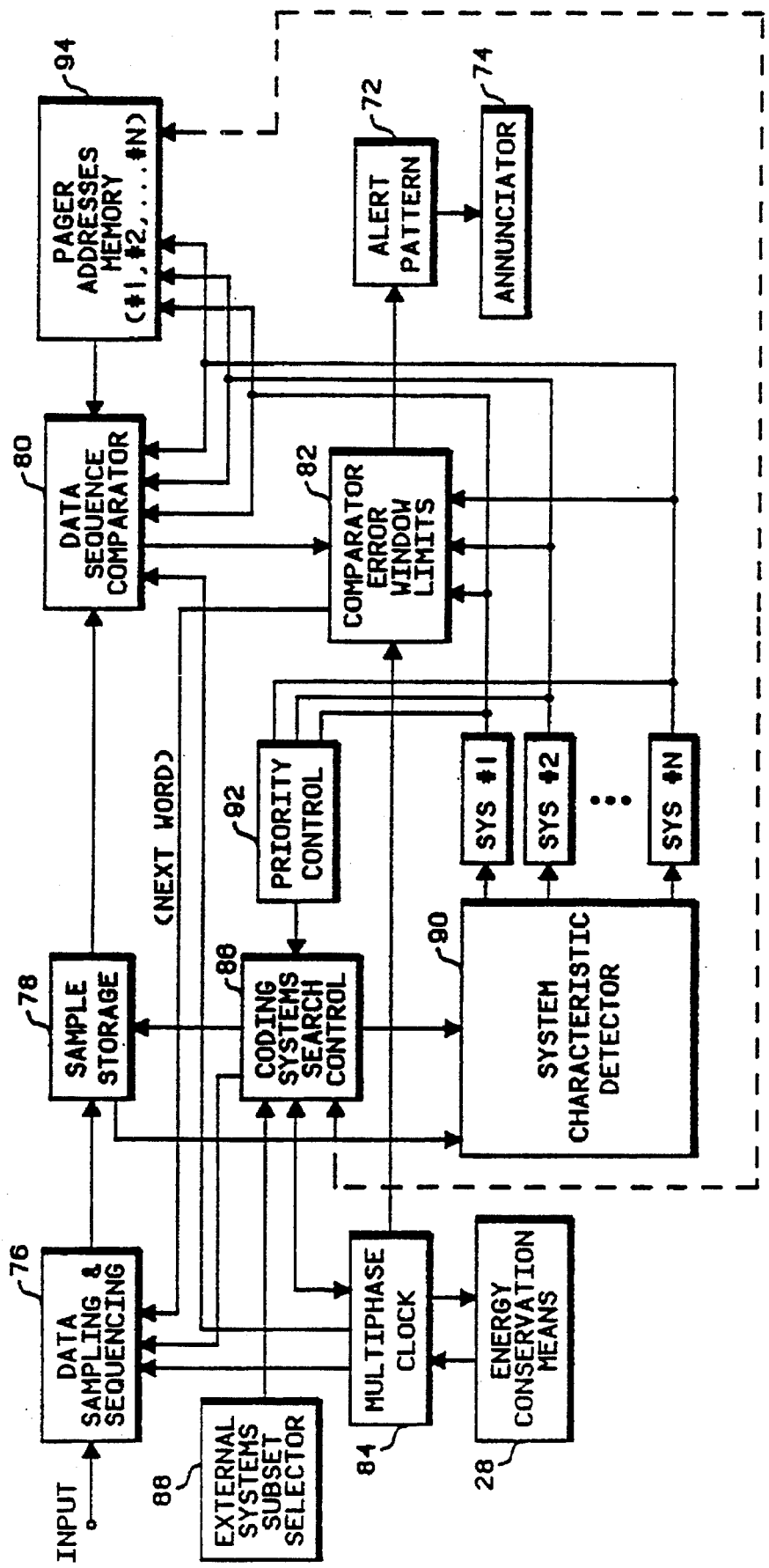
FIG. 4 is a more detailed block diagram of the common functional infrastructure of the preferred embodiments.

FIG. 4 shows, in additional detail, the diagram for either system containing an adaptive signal decoder or microcomputer and includes the interconnection of an external selector similar to the decoding selection means 30 shown in FIG. 1. An input signal which is the output of detector 50 is applied to a data sampling and sequencing circuit 76. The output of data sampling and sequencing device 76 is supplied to a sample storage device 78. Data sampling and sequencing device 76 and sample storage 78 comprise the data sampling and storage block 62 shown in FIG. 3. The output of sample storage device 78 is supplied to a data sequence comparator 80 which is also connected with a comparator error window limit device 82. The data sequence comparator 80 and comparator error window device 82 comprise the data sequence window comparator 64 of FIG. 3. A multiphase clock 84, which corresponds to clock 66 in FIG. 3, supplies timing signals to data sampling and sequencing device 76 and to data sequence comparator 80. Multi-phase clock 84 is also interconnected with energy conservation means 28 to allow for reduced operation periods of the system to conserve battery energy.

Multiphase clock 84 is also interconnected to a coding systems search control 86, which is also connected to be responsive to an external system subset selector 88. Coding systems search control is connected to data sampling and sequencing device 76 and sample storage device device 78. An additional output of coding systems search control 86 is connected to a systems characteristic detector 90 which is also connected to sample storage device 78. The outputs of system characteristic detector 90 are a series of lines indicative of the detection of and identification of one of the several possible decoding systems. Shown are N lines indicating system 1, system 2 through system N. Each of the outputs of system characteristic detector 90 is connected through a priority control device 92 to provide an input signal to coding systems search control 86. The outputs of system characteristic detector 90 are also supplied to the inputs of comparator error window limit device 82, to data sequence comparator 80 and to a pager address memory 94. The output of comparator error window limit device 82 is connected to alert pattern circuit 72 which is connected to annunciator 74. Alert pattern circuit 72 is connected to be responsive to pager address memory 94. Pager address memory 94 is shown interconnected by a broken line to coding systems search control 86. An additional output of comparator error window limit 82, labeled as a signal Next Word, is supplied to data sampling and sequencing device 76.

When the pager decoding system is actuated, the various parameters for one of the possible coding system are inserted into the various registers and counters, and the input signal to data sampling and sequencing device 76 from detector 50 is sampled according to a corresponding predetermined time sequence. The samples are stored for processing by data sequence comparator 80 and for analysis by the coding systems search control 86. The function of coding systems search control 86 is to organize the temporarily stored data for processing by the system characteristic detector 90 to determine from the received information the selected one of the several possible decoding schemes which should be employed to decode the received data. In the event that a wrong choice has been made, new parameters of the next coding system are input and another decoding system tested.

When system characteristic detector 90 activates one of the output lines indicating that the system has been detected, priority control 92 is actuated to disrupt the normal searching operation of coding systems search control 86 and to lock into the detected decoding system until such time as a message is received addressing the paging device or until it is determined that no more information is being received in that system. At such subsequent time, coding systems search control 86 will resume its searching operation to scan the incoming signals for the occurrence of messages broadcast in any of the possible decoding systems.

The output of system characteristic detector 90 is also supplied to comparator error window limit device 82 to alter the acceptable error limits for the various decoding systems and to pager addresses memory 94. The data in data sequence comparator 80 is tested for the window limits in comparator 82 with the proper pager address corresponding to the detected coding system. Comparator error window limit device 82 provides an output signal to alert pattern 72 and to actuate annunciator 74 to signal the pager carrier that a message has been received. A signal from pager address memory 94 determines which signaling pattern is supplied by alert pattern circuit 72 to annunciator 74.

Since several of the systems have sequential word coding formats or have multiple batch coding formats, there is an output from comparator error window limit device 82 back to the data sampling and sequencing device 76. This signal is labeled Next Word and provides additional sampling to decode the next serial word or for the next batch of messages within a given system.

The functioning of external system subset selector 88 is to eliminate searching through all possible coding systems and limit that search to only those systems which are receivable within a specific area or those systems to which the pager operator chooses to respond at any given time. It should be clear that this restriction may be provided by code memory 26 or could be independently hard-wired at the time of manufacture. This allows full flexibility for the pager to decode any of the N possible decoding systems and for the pager carrier to override the maximum number of possible decoding systems and concentrate his responses only to selected systems.

It may be appreciated that code memory 26, shown connected in phantom, can affect the coding systems search control as the code memory itself may contain certain limitations on which coding systems are accessible by the search control 86. This, in combination with the enabling of various functions of the pager, gives a complete versatility to a product line. Pager address memory 94 is also shown interconnected in phantom to coding systems search control 86. This line shows that control 86 can access the address words of the individual pager within each of the possible encoding systems.

It should be clear that when a pager is manufactured, or the time that the firmware is established, the pager address in various systems would ordinarily not be the same and to maintain uniqueness each pager unit must have a different address. Therefore, it is advantageous to subsequently designate several pager addresses corresponding to the various possible decoding systems. In addition, certain message systems use multiple addresses so that different types of signaling functions may be supplied to the carriers of their paging devices. An example would be a pager having two distinct addresses, the first designating an emergency message with a corresponding alert signaling pattern and a second indicating a non-emergency message with a substantially different alert signaling pattern.

Consistent with this type of operation, both embodiments of the present invention allow full capability to have several designated addresses within each of several possible decoding systems. Moreover, as has been described, the code memory or factory setting can restrict the availability of the functioning of the systems search routine which would reduce the number of decodable systems available to the carrier of a paging device.

Figure 5:
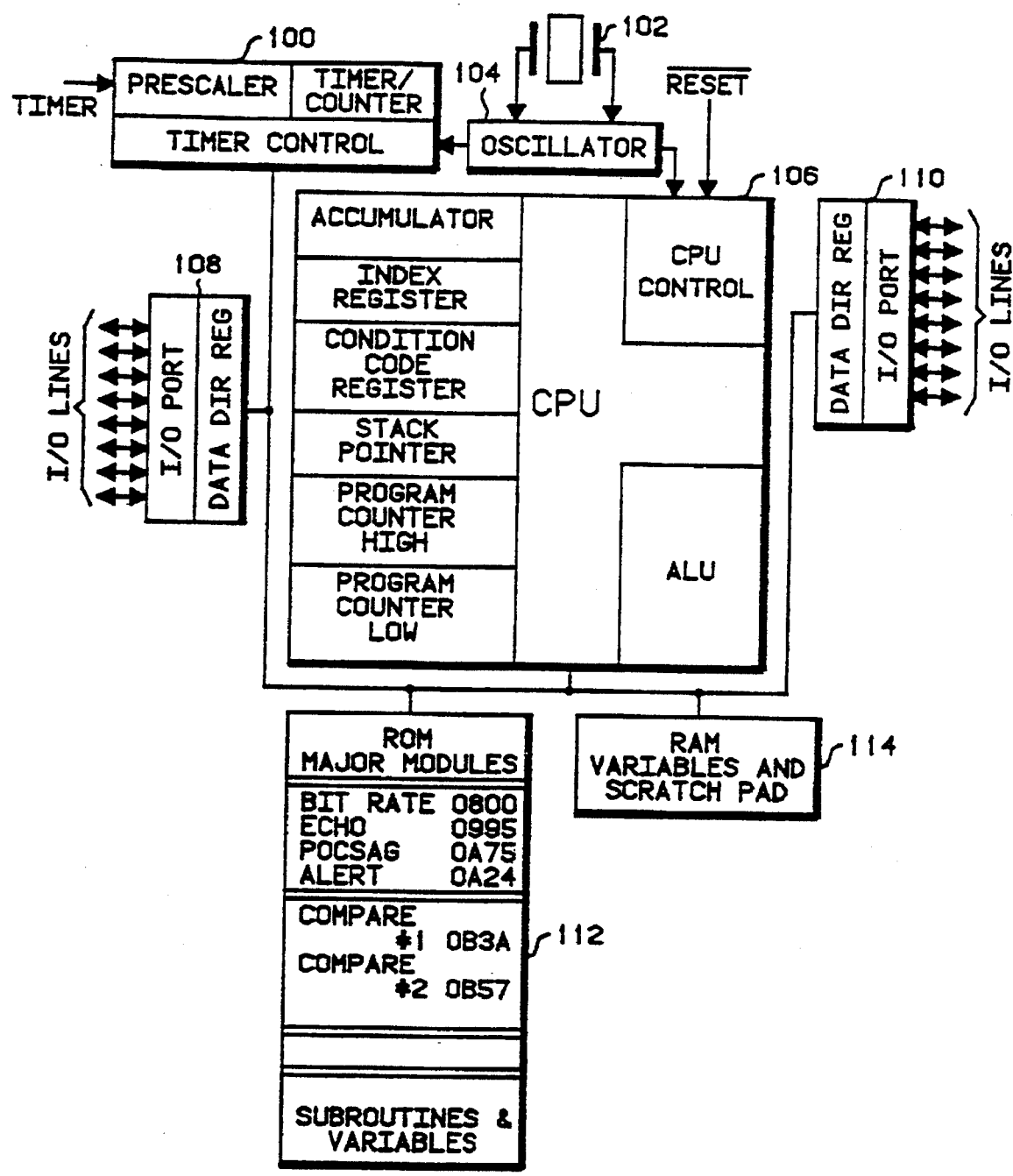
FIG. 5 is a combination functional and schematic diagram of the microcomputer embodiment of the invention.

FIG. 5 shows a combination functional and schematic block diagram of a microcomputer of the type suitable for containing a firmware implementation of the functional block diagram of the multi-scheme decoding pager having energy conservation shown as one embodiment in FIGS. 1-4. Although the microcomputer embodiment should not be so limited, it is preferred that the microcomputer be of the Motorola 146805 type. A timer signal for actuation is supplied to a timer control unit 100 containing a prescaler and a timer and counter. A crystal 102 is coupled to an oscillator circuit 104 which is also connected to timer control 100.

Oscillator 104 is also connected to a central processing unit 106 which contains the central processing unit control circuit, an arithmetic logic unit designated ALU, an accumulator, index register, condition code register, stack pointer, program counter high and program counter low low modules. Also connected to the central processing unit are data directional input/output registers 108 and 110 having a plurality of input/output lines. In particular, eight lines are shown for each of two input/output parts. Also interfacing with the central processing unit are a read-only-memory (ROM) 112 and a random access memory (RAM) 114. As is characteristic of the Motorola 146805 family, the on-chip RAM permits the microcomputer to operate without an external RAM memory. The parallel input/output capability includes programmable pins indicating whether it is to be an input or an output. The timer/counter is normally an eight bit counter with a programmable prescaler which can be used as an event counter to generate interrupt signals at certain software-selected events or can be used for timing keeping. In the case of the Motorola CMOS version MC146805, this timer can be set to wake up the microprocessor from a software-actuated command to establish a power-saving wait mode.

FIG. 5 also shows the arrangement of major firmware modules stored in the ROM and the corresponding addresses at which the modules begin. The choice and arrangement of this module is a function of the specific program of one of the embodiments of the present invention. It is sufficient to describe the major program modules and their address origination points so that with the core dump of the operating software program for the alternative embodiment, one can ascertain where the various subroutines begin. The use of RAM 114 is principally to contain variables accessed during the program and as a scratch-pad storage. The use o the Motorola 146805 is not a necessary requirement for the alternative embodiment, however, it is a convenient one. All of the subsequently disclosed coding are written to be compatible with the 146805 coding format.

The 146805 microprocessor and its associated architecture and internal instruction set have been described in detail in the following U.S. patents: U.S. Pat. No. 4,758,945, issued Jul. 19, 1988 to Remedi entitled "Method for Reducing Power Consumed by a Static Microprocessor"; U.S. Pat. No. 4,748,559, issued May 31, 1988 to Smith et al., entitled "Apparatus for Reducing Power Consumed by a Static Microprocessor"; U.S. Pat. No. 4,300,195, issued Nov. 10, 1981 to Raghunathan et al., entitled "CMOS Microprocessor Architecture"; U.S. Pat. No. 4,280,190, issued Jul. 21, 1981 to Smith entitled "Incrementor/Decrementor Circuit"; and U.S. Pat. No. 4,308,581, issued Dec. 29, 1981 to Raghunathan entitled "A Single Step System for a Microcomputer", the above five patents being commonly assigned to the assignee of the present invention. The five designated patents are hereby incorporated by reference for a more complete description of the MC146805 microcomputer.

The microcomputer embodiment of the present invention functions in a manner which is identical to a hardware embodiment. FIG. 5 shows a specific implementation for the microcomputer embodiment. Although not shown, it should be clear that the signal from detector 50 is coupled to one of the input/output ports as are the code memory and the alert pattern device.

While the present invention may be applied to any number of pager coding schemes and message formats, for the purposes of describing the preferred embodiments, two subtly different systems have been selected. It will be clear to those skilled in the art how to combine additional systems using a coding system search control and a coding system characteristic detector to be described in greater detail later. One is a binary paging system employing asynchronous detection of serial address words of fixed length and transmission rate. The other is a binary system employing synchronous transmission of fixed length truncated address words systematically arranged into fixed duration batches and transmitted at a different rate. For simplicity both systems employ binary coding which makes differentiation more difficult but the embodiments are more easily understood. It should be clear that any mixture of signal tones, tone and voice or digital signals may be combined. Such systems have such remarkably different characteristics that differentiation between such systems is an easier task.

The standard message coding format for the national paging system of the British Post Office is commonly known as POCSAG and has the following coding format. Each transmission is at a bit rate of 512 bits per second and consists of a preamble portion followed by one or more batches of selectively arranged code words. As shown in FIG. 6A, the preamble is a series of reversal logic states 1-0, etc. which has a duration of at least 576 bits. A code word is a 32 bit data sequence which contains information either for synchronization or for addressing an individual pager. Each batch begins with a 32 bit synchronization code word which is an invariant predetermined binary sequence. A batch comprises one synchronization code word and sixteen address code words which are subdivided into eight separate frames each containing two address code words. Subsequent batches in any message transmission contain the same format of a 32 bit synchronization word followed by eight frames, each containing two address code words each for a total of 16 address code words in a batch.

The address code words are grouped into eight frames numbered 0 to 7. The entire pager address population is similarly divided into eight possible groups. Each pager address is allocated to one of the corresponding eight frames according to the three least significant bits of its 21 bit code word identity. Thus, all pagers having addresses which end in 000 would be positioned in frame 0, and similarly, all pagers having an address code word ending in 111 would be in frame 7.

Address code words have a 32 bit structure and bit 1 of an address code word is always 0 as shown in FIG. 6B. Bits 2–19 are the address bits corresponding to the 18 most significant bits of the 21 bit identity sequence assigned to an individual pager. The three least significant bits are not transmitted since they merely serve to define the frame in which the address code word must be transmitted and are therefore derivable from the frame position in a batch. Bits 20 and 21 are two function bits which are used to select the required addresses from the four possible addresses assigned to the pager. Bits 22 to 31 are parity check bits and the final bit, bit 32, is chosen to give even parity. The decoding system will only examine address code words in a designated frame, and therefore, each pager's address code words must only be transmitted in the frame that is allocated to that code word format.

Each code word, whether it is a synchronization code word or an address code word, follows the same 32 bit format in which the most significant bit is transmitted first. The synchronization code word is shown in FIG. 6C with the most significant bit in bit position 1, and least significant bit in bit position 32.

Thus the 21 bit binary sequence for pager identity in this coding system allows for over two million combinations of possible addresses for pagers. The addition of two function bits provide a total of eight million message combinations comprising batch signaling functions and pager addresses.

Figure 7A:
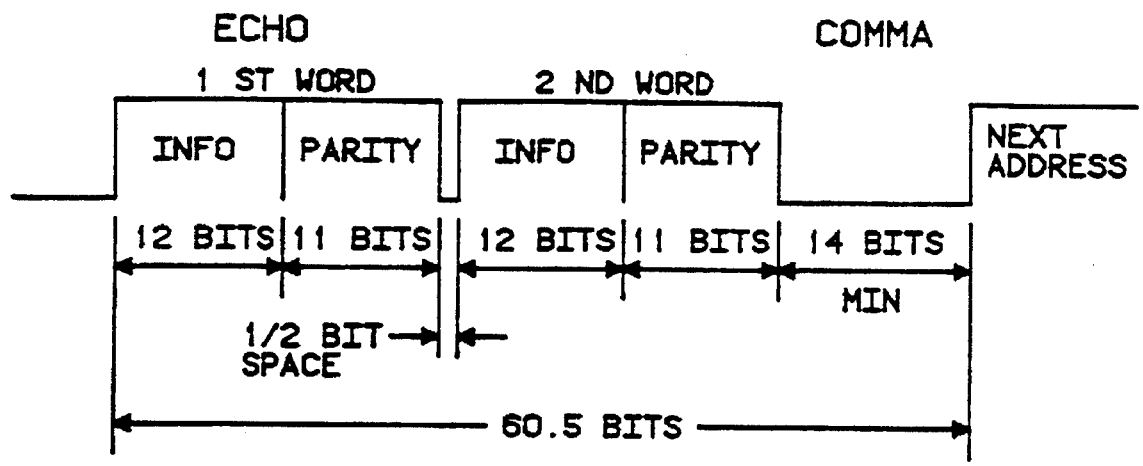
FIGS. 7A and 7B comprise a descriptive diagram for the second data encoding system for the preferred embodiments of the invention.

A binary message paging system developed by Motorola, Inc. and commonly known as ECHO transmits information at 300 bits per second and employs two sequential binary words for each pager address. A word for this system is a sequence of 23 binary bits. The logic convention used in this system requires that binary logic 1 correspond to the most positive voltage and that binary logic 0 correspond to the most negative voltage. As shown in FIG. 7A, each paging address in the ECHO system consists of two 23 bit binary words separated by a one-half bit interval and followed by a 14 bit duration comma. Two 23 bit paging address words follow each other serially to constitute the address of a pager and a comma or pause interval of a specified duration is transmitted between each pair of 23 bit addresses to form an interaddress gap. The total addressing data length is then 60.5 bits.

Each word of this dual-word addressing system is generated from 12 information bits. The sum of the information plus parity bits comprises the 23 bit word length. Parity bits are data bits which are added to the information bits to allow errors to occur and yet still ensure that one will not be mistaken for another word. It is conventional in this system that the logic level of the one-half bit space between sequential address words is always opposite of the logic level of the first bit of the second word in the two word address series. Thus, if the first bit of the second word is at a 1 level then the one-half bit space would be at a 0 level.

Figure 7B:
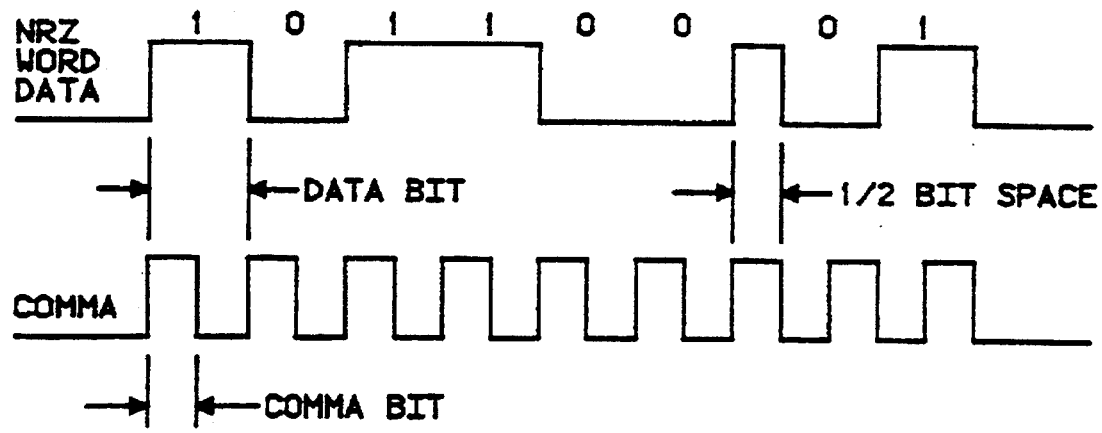

FIG. 7B shows that the comma or interpage interval consists of a repetitive 1-0 pattern that occurs at twice the bit rate of the normal message transmission for a duration equal to 14 normal 300 second bits. The bit rate of the interaddress gap is at 600 bits per second. The starting logic level of the comma must also be the same logic level as the first bit of the following word.

The use of 12 binary bits to designate the address of the pager allows for 4,096 unique combinations and adding a second word to additionally specify the address would ordinarily result in nearly 17 million unique pager addresses. However, the usual method for decoding ECHO message systems operates asynchronously for the first word in each sequence. This usual decoding apparatus is sensitive to cyclic variations of the address patterns resulting in possible false detections in the first word producing an incorrect identification of the pager address. To eliminate this problem which is due principally to the decoding hardware, two serial address words that are cyclically related are not used as the first word of the two 23-bit word address system since this could lead to a probability of a false word 1 detection. It is possible to provide only 178 different 23-bit binary words where each cyclic variation of any one would be different from any other of the 178 binary words or their cyclic variation by at least seven binary bits. It has additionally been observed that frame synchronization accuracy for the normal ECHO decoding apparatus may be improved by only utilizing those first words which have 12 or more cyclic transitions. This further restricts the number of available coding permutations in the first address word to 118. Thus, the first address word in combination with the 4,095 possible second words provide in excess of 480,000 addresses for the ECHO system.

Figure 8:
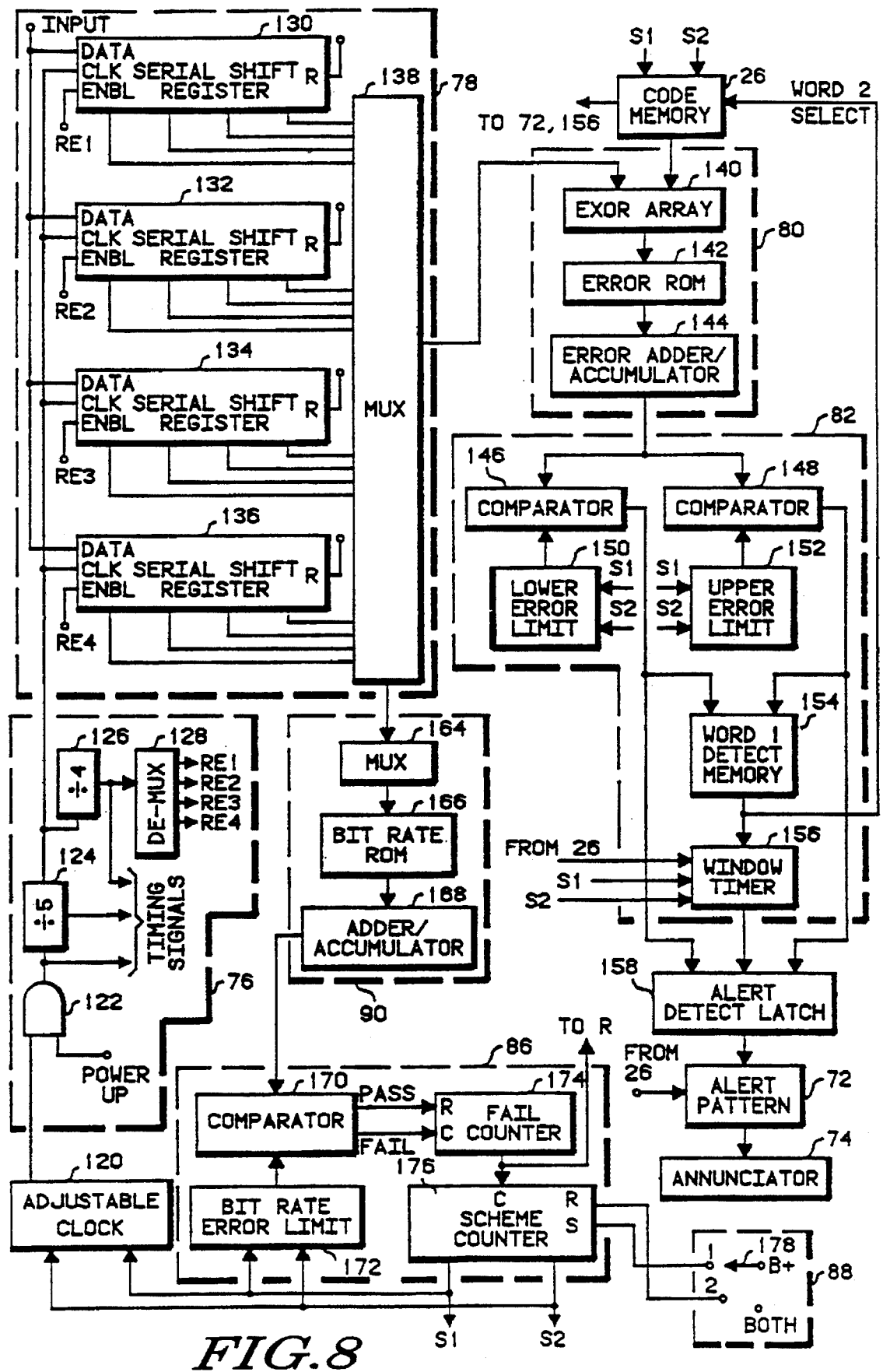
FIG. 8 is a detailed functional diagram of the common infrastructure of the preferred embodiments.

FIG. 8 shows a more detailed structural diagram for the preferred embodiments which comprise in the alternative an adaptive signal decoder or functional equivalent of a microcomputer implementation. For convenience only, one interconnected line is shown between various modules. However, it is to be understood that such a line is to represent as many as eight binary input lines. An adjustable multi-phase clock 120 is connected to the first input of an AND gate 122. A power-up signal from the energy conservation means 28 is connected to the second input of AND 122. The output of AND 122 is connected to a divide-by-five counter 124 which is connected to a divide-by-four counter 126. The outputs of AND 122, divide-by-five counter 124 and divide-by-four counter 126 are variously defined as timing signals as will be described in more detail later. In addition, the output of counter 126 is connected to a demultiplexer 128 having four output signals designated RE1, RE2, RE3 and RE4. AND 122, the counters 124 and 126 and demultiplexer 128 are shown enclosed by a broken line to enhance the comparison with data sampling and sequencing device 76 shown in FIG. 4. The output of counter 124 is coupled directly to each of the clock inputs of multiple bit serial shift registers 130, 132, 134 and 136. Register enable signals RE1, RE2, RE3 and RE4 are connected respectively to enable terminals of registers 130, 132, 134 and 136. The output of the communication receiver 20 labeled Input is connected to the data terminals of each of registers 130, 132, 134 and 136.

Each of registers 130, 132, 134 and 136 is multiply connected to a multiplexer 138. Four lines are shown interconnecting each register with multiplexer 138. Each of these four interconnect lines represents eight separate lines since preferably the serial shift registers are composed of a series arrangement of four eight-bit serial shift registers as will be described in greater detail later. The serial shift registers and multiplexer 138 are shown enclosed by a broken line to enhance comparison with the data storage device 78 of FIG. 4.

The output of multiplexer 138 is connected to an Exclusive OR array 140 preferably containing eight devices. Code memory 26 is connected to a second input of Exclusive OR array 140. The Exclusive OR array 140 is connected to an error read-only memory (ROM) 142. Error ROM 142 is connected to an error adder and accumulator 144. Exclusive OR array 140, error ROM 142 and error accumulator 144 are shown enclosed with a broken line to enhance the comparison with data sequence comparator 80.

The output of error accumulator 144 is connected to a comparator 146 and a comparator 148. Comparator 148 is connected to a lower error limit 150 and comparator 148 is connected to an upper error limit 152. Error limit circuits 150 and 152 each receive the S1 and S2 system select signals which will be described in detail later. Comparators 146 and 148 are connected to a word 1 detect memory 154. The word 1 detect memory 154 is connected back to code memory 26 and to a window timer 156. Window timer 156 also receives signal S1 and S2 which will be described later. Window timer 156 also receives a signal from code memory 26. Comparators 146 and 148 and window timer 156 are connected to alert detect latch 158. Alert detect latch 158 is connected to alert pattern circuit 72 which is connected to annunciator 74. Alert pattern circuit 72 is also connected to be responsive to code memory 26. Comparators 146, 148, lower error limit 150, upper error limit 152, word one detect memory 154 and window timer 155 are shown enclosed by a broken line to enhance the comparison comparator error window limits circuit 82.

An additional output terminal of multiplexer 138 is connected to a multiplexer 164. Multiplexer 164 is connected to a bit rate ROM 166 which is connected to an adder/accumulator 168. Multiplexer 164, bit rate ROM 166 and adder/accumulator 168 are shown enclosed by a broken line to enhance the comparison with system characteristic detector 90. Accumulator 168 is also connected to a comparator 170. Comparator 170 is connected to be responsive to a bit rate error limit device 172. Bit rate error limit 172 is responsive to system select signals S1 and S2. Two outputs of comparator 170, designated as Pass and Fail, are connected respectively to the reset and count terminals of a Fail Counter 174. Fail Counter 174 is connected to the count terminal of a scheme counter 176. The output of Fail Counter 174 designated as a signal "to R" is to be connected to each of the reset terminals of serial shift registers 130, 132, 134 and 136. Comparator 170, bit rate error limit 172, Fail Counter 174 and scheme counter 176 are shown enclosed by a broken line to enhance the comparison with coding systems search control 86.

A three position switch having center terminal 178 connected to B+ is shown with a first terminal designated "1" connected to the S terminal of scheme counter 76; a second terminal designated "2" is connected to the reset terminal of scheme counter 176; and a third terminal designated "both" is unconnected. The switch with its associated terminals are shown enclosed by a broken line to enhance the comparison with external system subset selector 88. Two outputs of scheme counter 176 are designated S1 and S2 and are connected to adjustable multi-phase clock 120, to code memory 26, to window timer 156 and error bit rate limit 172.

For the decoding system containing either the adaptive signal decoder or the microcomputer implementation, when initiated, counter 176 activates one output which is supplied to adjustable clock 120 to establish a timing operation for the bit rate detection procedure. This is the equivalent of selecting one of the two possible decoding schemes to determine if the correct message bit rate is being received. At a time appropriately determined by energy conservation means 28, the signals from adjustable clock 120 are provided to serially enable the registers 130, 132, 134 and 136. In particular, the output of counter 124 causes shifting or advancement of the data at the input line to each of the registers. During each sample clock pulse output from counter 124, one sample of the information from communication receiver 20 is applied to the one serial shift register which has been enabled. Demultiplexer 128 enables the shift registers serially so that the first sample of a derived incoming bit pattern would be stored in register 130, a second sample in register 132, a third sample in 134 and the fourth sample in 136. It is preferable that adjustable clock 120 be operated at 20 times the anticipated bit rate so that the output of counter 124 is precisely four times the bit rate which is the desired sampling rate.

At the time when the system is actuated Fail Counter 174 resets the serial shift registers to clear all of the information which may remain. In addition, scheme counter 176 selects the address information corresponding to the selected decoding scheme from code memory 26 and the correct limits for window timer 156 so that when sufficient sampling data has been supplied to Exclusive OR array 140, the process of confirming whether the address of the specific pager has been detected may continue.

As may be recalled by reviewing the coding formats for the ECHO and POCSAG systems, the word lengths in the various systems are respectively 23 and 32 bits. For an example of the operation of the diagram of FIG. 8, it is convenient to assume that the ECHO system has been selected so that the desired word length is then 23 bits. Each sampling of an incoming bit is applied in sequence to the serial shift registers so that the time period which is equivalent to acquiring 92 samples serial shift registers 130, 132, 134 and 136 have been filled with the data required for ECHO. This information is supplied through multiplexer 164 where it is reorganized and supplied to bit rate ROM 166. This bit rate ROM compares the individual bit patterns in the shift registers to determine the degree of correspondence and thereby to confirm whether the bit rate of the input signal has been confirmed. The correspondence determination for the data in the shift registers is accomplished by marking a sample position by corresponding sample position comparison and using the bit rate ROM which contains a table of errors corresponding to the various bit values of the position patterns. For each sample and for each enabling of any of the registers, accumulator 168 determines a total error for the reorganized data. This information is supplied to comparator 170 for comparison to a limit appropriate for the chosen scheme from bit rate error limit circuit 172. The outputs of comparator 170 are two signals designated Pass and Fail. In the event that the bit rate has been correctly determined and that information is being received in the ECHO system, the counter 174 is reset. This reset operation prioritizes the searching routine by ensuring that Fail Counter 174 cannot advance scheme counter 176 to select the next scheme. In the event that the error exceeds the maximum limits the output of comparator 170 will activate the fail signal. If no system has been detected in four consecutive sample attempts, Fail Counter 174 will cause advancement of scheme counter 176 and establish a new timing period for adjustable multi-phase clock 120 and clearing all of the shift registers.

For the POCSAG scheme the data sample accumulation is 128 samples which are supplied through multiplexer 138 into multiplexer 164 for comparison as to whether that assumed bit rate produces an acceptable error in accumulator 168. Again, the output of accumulator 168 is supplied to comparator 170 which would now have a new error limit corresponding to the POCSAG system. In the event that the POCSAG system was correctly identified again, Fail Counter 174 would be reset thus prioritizing and locking the decoding into that scheme.

An advantage in having a separate multiplexer 164 coupled to multiplexer 138 is that the bit rate determination procedure can be achieved by carefully reorganizing the data and once the scheme has been correctly identified the same information contained in serial shift registers 130, 132, 134 and 136 may be used to identify whether the individual pager has been addressed.

At an appropriate time, as designated by the various timing signals, the Exclusive OR array receives the appropriate eight bits from each portion of each serial shift register for comparison with the information in code memory 26. Since for the POCSAG system all 32 bits are processed for the comparison, then all of of the information contained in serial shift registers 130, 132, 134 and 136 is processed through Exclusive OR array 140 eight bits at a time. The output of Exclusive OR array 140 is connected to an error ROM 142. As before, this ROM has the advantage of allowing rapid processing to determine the number of errors by simply addressing the memory and having stored at that location the number corresponding to the number of errors difference in the two patterns. This error difference is supplied to error accumulator 144 for each of the eight samples tested. On a sample-by-sample basis, the output of error accumulator 144 is supplied to comparators 146 and 148 to test whether the number of errors is less than the lower acceptable limit or greater than the upper acceptable limit. The outputs of comparators 146 and 148 are supplied to a word 1 detect memory. It will be recalled that the ECHO system uses two serially related 23-bit words while the POCSAG system uses a single 32-bit word at a predetermined position in a batch message format. However, each POCSAG batch contains a synchronization word and it has been found to be advantageous for the POCSAG scheme decoding to let word 1 in the detection scheme correspond to this synchronization word. Once word 1 has been detected, a window timer is established which is required for the asynchronous detection of the ECHO system second word but is also advantageous for the POCSAG system since the window timer can establish the beginning and end of the frame period during which a proper POCSAG pager address word may be found. If the address word is not found, the system continues to sample until such time as the bit rate detector, which has continued to operate, has a sufficient number of Fail signals to indicate that the bit rate assumption is an error. This would indicate the termination of the broadcast of either system or its replacement by the other.

On the other hand, assuming that the first word of the address has been correctly identified for either system, then the normal search routine is established for the second word which is identical to the word 1 comparator error identification and when that word has been correctly detected, the alert detect latch is activated so that the alert pattern may be supplied to the annunciator to indicate to the pager carrier the receipt of a message.

Figure 9:
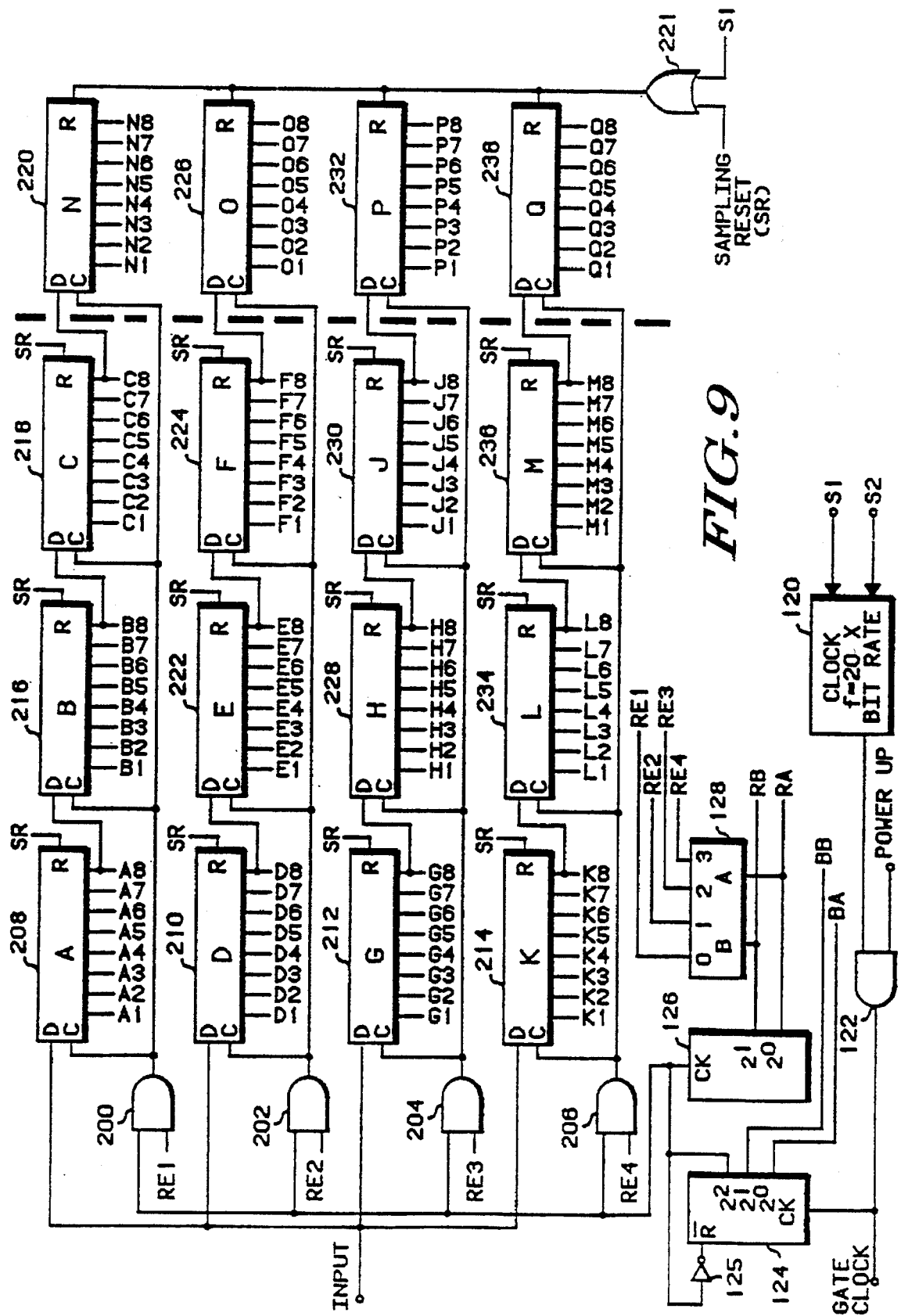
FIG. 9 shows an electrical schematic for the equivalent data sampling and sequencing operations of the preferred embodiments.

FIG. 9 shows the electrical schematic for data sampling and sequencing circuit 76 and sample storage circuit 78. It therefore is applicable to both the adaptive decoder and microcomputer embodiments. As described for FIG. 8, adjustable clock 120 is connected through AND 122 which is enabled by a Power-Up signal. The output of AND 122 is a gated clock signal and is supplied to the clock input terminal of counter 124. At the $2^0$ terminal of counter 124 is a signal BA and at the $2^1$ terminal is a signal labeled BB. The $2^2$ terminal of counter 124 is connected to the clock terminal of counter 126 and through an inverter 125 to its own R reset terminal. The $2^2$ terminal of divide-by-five counter 124 is also Connected to the first inputs of AND gates 200, 202, 204 and 206.

At the $2^0$ terminal of counter 126 is a signal designated RA which is also connected to the A input terminal of a binary one of four decoder/demultiplexer 128. At the $2^1$ terminal of counter 126 is a signal designated RB which is also connected to the B input terminal of demultiplexer 128. At the four terminal outputs of demultiplexer 128 are signals which are designated RE1, RE2, RE3 and RE4. Signal RE1 is connected to the second input of AND 200, RE2 is connected to the second input of AND 202, RE3 is connected to the second input of AND 204 and RE4 is connected to the second input of AND 206.

The signal from communication receiver 20 designated as Input is supplied to the data input terminals of shift registers 208, 210, 212 and 214. Each of registers 208, 210, 212 and 214 bears an additional alphabetic identification A, D, G and K, respectively. The output of AND 200 is connected to the clock terminal of shift register 208 and to the clock terminals of registers 216, 218 and 220. The eight output terminals of register 208 are designated A1 through A8. The A8 terminal of register 208 is connected to the data input terminal of register 216. Register 216 bears the additional alphabetic designation B and the eight output terminals of register 216 are designated B1 through B8. The B8 terminal of register 216 is connected to the data input terminal of register 218. Register 218 bears the additional alphabetic designation C and the eight output terminals of register 218 are designated C1 through C8. The C8 output terminal of register 218 is connected to the data input terminal of register 220. Register 220 bears the additional alphabetic designation N and the eight output terminals are designated as N1 through N8. The signal designated S1 from scheme counter 176 is supplied to the first input of an OR gate 221. The output of OR 221 is supplied to the reset terminal of register 220. The Sampling Reset signal from Fail Counter 174 is supplied to the second input of OR 221. The Sampling Reset signal is also supplied to the reset terminals of registers 208, 216 and 218.

The output of AND 202 is applied to the clock terminals of registers 210, 222, 224 and 226. The eight output terminals of register 210 are designated D1 through D8. The D8 terminal of register 210 is connected to the data input terminal of register 222. Register 222 bears the additional designation E and the eight output terminals are labeled E1 through E8. The E8 output terminal of register 222 is connected to the data input terminal of register 224. Register 224 bears the additional alphabetic designation F and the eight output terminals are designated F1 through F8. The F8 output terminal of register 224 is connected to the data input terminal of register 226. Register 226 bears the additional alphabetic designation O and the eight output terminals are designated O1 through O8. The output of OR 221 is connected to the reset terminal of register 226. The Sampling Reset signal from Fail Counter 174 is supplied to the reset terminals of each of registers 210, 222 and 224.

The output of AND 204 is connected to the clock terminal of registers 212, 228, 230 and 232. Register 212 also has the alphabetic designation G and the eight output terminals of register 212 are designated G1 through G8. The G8 output terminal of register 212 is connected to the data input terminal of register 228. Register 228 bears the additional alphabetic designation H and the eight output terminals are designated H1 through H8. The 8 output terminal of register 228 is connected to the data input terminal of register 230.

Register 230 bears the additional alphabetic designation J and the eight output terminals are designated J1 through J8. The J8 output terminal of register 230 is connected to the data input terminal of register 232. Register 232 bears the additional alphabetic designation P and the eight output terminals are designated P1 through P8. The output of OR 221 is connected to the reset terminal of register 232. The Sampling Reset signal from Fail Counter 174 is supplied to each of reset terminals of registers 212, 228 and 230.

The output of AND 206 is connected to the clock terminals of shift registers 214, 234, 236 and 238. Register 215 also bears the alphabetic designation K the eight output terminals of register 214 are designated K1 through K8. The K8 output terminal of shift register 214 is connected to the data input terminal of register 234. Register 234 bears the additional alphabetic designation L and the eight output terminals are designated L1 through L8. The L8 output terminal of register 234 is connected to the data input terminal of register 236. Register 236 bears the additional alphabetic designation M and the output terminals are designated M1 through M8. The M8 output terminal of register 236 is connected to the data input terminal of register 238. Register 238 bears the additional alphabetic designation Q and the eight output terminals are designated Q1 through Q8. The output of OR 221 is connected to the reset terminal of register 238. The Sampling Reset signal from Fail Counter 174 is supplied to each of the reset terminals of registers 214, 234 and 236.

In operation adjustable clock 120 operates at 20 times the anticipated bit rate and this rate is adjusted depending upon which of the two sampling systems of the preferred embodiments have been selected. This output is supplied at times determined by energy conservation means 28 through AND gate 122 to counter 124. The timing diagrams for the BA and BB signal outputs of counter 124 will be shown in FIG. 10. The 20 times the bit rate signal is divided by five to produce a regularly occurring pulse signal at four times the bit rate which is the sampling rate. This sampling rate is supplied to counter 126 and is also supplied to enable AND's 200, 202, 204 and 206 for each sampling period.

Figure 10:
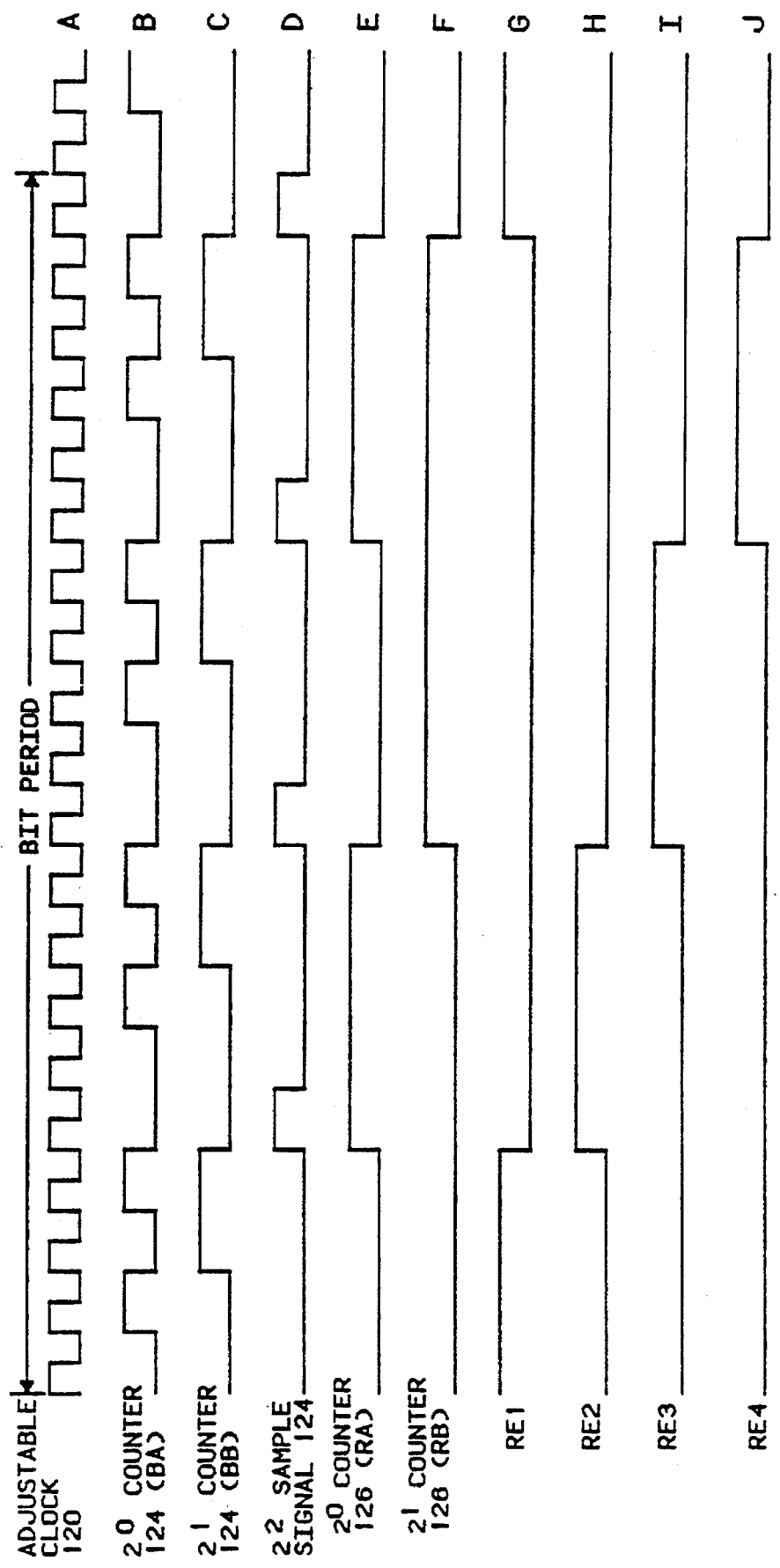
FIGS. 10 shows various timing diagrams for the operation of the schematic of FIG. 9.

At the outputs of counter 126 are signals RA and RB which will be shown in greater detail in FIG. 10 and are supplied to the input terminals of multiplexer 128. Multiplexer 128 serially selects which of the horizontal rows of 16 shift registers will be enabled for each serial sampling period. Although all four AND gates are enabled by the sampling signal, the enabling signal from multiplexer 128 selectively enables the various rows of shift registers through the AND gates.

Each row corresponds to one sampling period for as many as 32 possible bits. This capacity was chosen for the maximum word length which, for the two systems of the preferred embodiments, is 32 bits. It may also be seen that the functioning of signal S1 from scheme counter 176 operating through OR 221 will cause a resetting of shift registers 220, 226, 232 and 238 for all sampling intervals during which system 1 has been selected, thus allowing only a maximum of 24 bits of storage for the data. Moreover, whenever Fail Counter 174 causes a clocking of scheme counter 176, at the same time counter 176 advances to designate a new scheme select output, all of the shift registers are reset including registers 220, 226, 232 and 238 through OR 221.

During each sample interval, the data is advanced into one of the shift register rows and, correspondingly, the shift registers are clocked to accept and store that data. During the sampling intervals, as for the case of ECHO, after 92 such sample intervals, the 12 shift registers A, B, C, D, E, F, G, H, J, K, L and M will be nearly filled with data, the only exception being the last position of shift registers designated C, F, J and M since sufficient shift register positions have been allotted for the possibility of a 24-bit word. However, as will be described in detail later for the operation of the Exclusive OR array, only the first 23 bits of information will be utilized. To more fully understand the operation of the data sampling and sequencing circuit 76, it is convenient to refer to FIG. 10.

FIG. 10 shows 10 timing diagrams variously identified as 10A through 10J which are useful in understanding more completely the operation of the data sampling and sequencing circuit. FIG. 10A shows the output waveform for adjustable clock 120 which is a square wave operating at a frequency to produce 20 pulses for each anticipated bit interval. Signals BA and BB are shown respectively in FIGS. 10B and 10C. Signal BA is operated at the $2^0$ output of counter 124 and BB is generated at the $2^1$ terminal of counter 124.

FIG. 10D shows the signal generated at the $2^2$ terminal of counter 124. It may be seen that the signal generated at the $2^2$ output of counter 124 is a regularly occurring pulse train at four times in the anticipated bit period. This is the sampling clock signal for the circuit. The relative positions in time with respect to the sampling interval for the various outputs of counter 124 are shown in FIGS. 10B, 10C and 10D.

FIGS. 10E and 10F show, respectively, the signals generated at the $2^0$ and $2^1$ output terminals of counter 126. These correspond to output signals designated RA and RB. FIGS. 10G, H, I and J correspond to the register enable signals which are the outputs of multiplexer 128. In particular, FIG. 10G shows RE1; FIG. 10H shows RE2; FIG. 10I shows RE3; and FIG. 10J shows RE4.

The operation of data sampling and sequencing circuit 76 may now be explained in terms of the timing of the various control signals. During each sample signal interval as designated by Fi. 10D, one and only one of signals RE1, RE2, RE3 and RE4 are at a positive logic state to enable the appropriate AND gate o allow the sampling signal to clock in the information contained on the input signal which is applied to the data terminal of the selected shift register. As may be seen from the comparison of FIGS. 10G, H, I and J with FIG. 10D, for each succeeding sample signal interval, one of RE1 through RE4 becomes positive, thus enabling the next row of shift registers to accept during the sample interval the input signal at its data terminal. With each subsequent combination of sampling signal intervals and register enabling, the data constituting four measurements for each bit of the multi-bit words, are clocked into the various registers. Registers A, B, C and N contain serial information for the first of the four sample clock phases; registers D, E, F and O contain all of the second clock phase samples; registers G, H, J and P contain all of the third clock phase samples; and registers K, L, M and Q contain all of the fourth clock phase samples.

The Sampling Reset signal from Fail Counter 174 and the Scheme Select line S1 from scheme counter 176 operate through OR 221 to selectively cause resetting of shift registers N, O, P and Q. The purpose for this operation is that, during the measurement of the data for the ECHO system, the 32-bit word length is not necessary so that during the times when the ECHO system is either being tested or decoded, serial shift registers N, O, P and Q are constantly reset to 0 and held in that state.

The information at the output terminals of all of the serial shift registers are appropriately identified and are supplied to multiplexer 138.

While any of a number of various devices could be used to build the first embodiment shown in FIG. 9, it has been found advantageous to use CMOS devices of the Motorola 14000 series. Counter 124 is preferably of the type MC14163B which is a synchronous programmable four-bit counter. The choice of such a device results in the correspondence of clock terminal with pin 2, the reset R, terminal with pin 1, the $2^0$, $2^1$ and $2^2$,terminals correspond to pins 14, 13 and 12, respectively. It may be appreciated by those skilled in the art that the use of such counters may require additional interconnection as is designated by the data notes for the device. Divide-by-four counter 126 is also of the same general type as counter 124 with the corresponding pin and terminal identification. Demultiplexer 128 is preferably of the type MC14555B, which is a dual binary to one of four decoder demultiplexers. Either of the dual devices in the package would be sufficient for the decoding. In particular, the A terminal may be identified with pin 2, the B terminal with pin 3, the corresponding outputs for RE1 through RE4 would be identified as pins 4, 5, 6 and 7.

The sixteen serial shift registers designated with the alphabetic characters A, B, C, D, E, F, G, H, J, K, L, M, N, O, P and Q are all preferably of the type MC14015B. These are dual four-bit static shift registers which may be suitably interconnected to form eight-bit shift registers. When such a choice is made, the data terminal would correspond to pin 7; the clock terminals should be interconnected and they are pins 9 and 1; and the reset terminals similarly should be interconnected and they correspond to pins 6 and 14; the first four output terminals correspond to pins 5, 4, 3 and 10 and pin 10 should be interconnected with pin 15 which is the data input terminal for the second four bit device. The remaining four of the eight output terminals correspond to pins 13, 12, 11 and 2. With this choice of device, the corresponding outputs designated as 1–8 in FIG. 9 may be indentified with he following sequence of pins: 5, 4, 3, 10, 13, 12, 11 and 2. As with the choice f all such devices, a review of the data sheet will indicate to those skilled in the art that other pin connections must be made for suitable power and ground.

FIGS. 11A and 11B show the detailed infrastructure of multiplexer 138 in FIG. 8. In the description of this figure, the terminals of the serial shift registers will be described by the two character alphanumeric designation given to each of these terminals in FIG. 9. Terminals A1, B1, C1 and N1 are connected respectively to the 0–3 input-terminals of a multiplexer 250. Terminals D1, E1, F1 and 01 are connected respectively to the 0–3 input terminals of a multiplexer 252. Terminals G1, H1, J1 and P1 are connected respectively to the 0–3 input terminals of a multiplexer 254 and terminals K1, L1, M1 and Q1 are connected respectively to the 0–3 input terminals of a multiplexer 256. Each of multiplexers 250, 252, 254 and 256 receive the BA and BB select input signals from the designated output terminals of divide-by-five counter 124 as shown in FIG. 9. Each of signals BA and BB are supplied to multiplexers 250, 252, 254 and 256 at corresponding input terminals. The output terminals of multiplexers 250, 252, 254 and 256 are connected respectively to the 0–3 input terminals of a multiplexer 258. At the output terminals of multiplexers 250, 252, 254 and 256 are signals MT1, MT2, MT3 and MT4 respectively. Multiplexer 258 also receives at input terminals designated A and B respectively, signals RA and RB which are the output signals from designated terminals of counter 126. At the output of multiplexer 258 is a signal designated SM1.

Terminals A2, B2, C2 and N2 are connected respectively to the 0–3 input terminals of a multiplexer 260. Terminals D2, E2, F2 and 02 are connected respectively to the 0–3 input terminals of a multiplexer 262. Terminals G2, H2, J2 and P2 are connected respectively to the 0–3 input terminals of a multiplexer 264 and terminals K2, L2, M2 and Q2 are connected respectively to the 0–3 input terminals of a multiplexer 266. Each of multiplexers 260, 262, 264 and 266 receive signals BA and BB at corresponding input terminals. The output of multiplexers 260, 262, 264 and 266 are connected respectively to the 0–3 input terminals of a multiplexer 268. At the output terminals of multiplexers 260, 262, 264 and 266 are signals MT5, MT6, MT7 and MT8 respectively. Multiplexer 268 also receives signals RA and RB at A and B input terminals respectively. The output of multiplexer 268 is a signal designated as SM2.

Terminals A3, B3, C3 and N3 are connected respectively to the 0–3 input terminals of a multiplexer 270. Signals D3, E3, F3 and 03 are connected respectively to the 0–3 input terminals of a multiplexer 272. Terminals G3, H3, J3 and P3 are connected respectively to the 0–3 input terminals of a multiplexer 274. Terminals K3, L3, M3 and Q3 are connected respectively through the 0–3 input terminals of multiplexer 276. Each of multiplexers 270, 272, 274 and 276 receive signals BA and BB at corresponding input terminals. The output terminals of multiplexers 270, 272, 274 and 276 are connected respectively to the 0–3 input ternlinals of a multiplexer 278. At the output terminals of multiplexers 270, 272, 274 and 276 are signals MT9, MT10, MT11 and MT12 respectively. Signals RA and RB are connected respectively to the A and B input terminals of multiplexer 278. The output of multiplexer 278 is a signal designated SM3.

Terminals A4, B4, C4 and N4 are connected respectively to the 0–3 input terminals of a multiplexer 280. Terminals D4, E4, F4 and O4 are connected respectively to the 0–3 input terminals of multiplexer 282. Terminals G4, H4, J4 and P4 are connected respectively to the 0–3 input terminals of a multiplexer 284. Terminals K4, L4, M4 and Q4 are connected respectively to the 0–3 input terminals of a multiplexer 286. Each of multiplexers 280, 282, 284 and 286 receive the signals BA and BB at corresponding input terminals. The output of multiplexers 280,282, 284 and 286 are connected respectively to the 0–3 input terminals of a multiplexer 288. At the output terminals of multiplexers 280,282, 284 and 286 are signals MT13, MT14, MT15 and MT16 respectively. Signals RA and RB are applied to the A and B input terminals respectively of multiplexer 288. The output of multiplexer 288 is a signal designated SM4.

Terminals A5, B5, C5 and N5 are connected respectively to the 0–3 input terminals of a multiplexer 290. Terminals D5, E5, F5 and 05 are connected respectively to the 0–3 input terminals of a multiplexer 292. Terminals G5, H5, J5 and P5 are connected respectively to the 0–3 input terminals of a multiplexer 294. Terminals K5, L5, M5 and Q5 are connected respectively to the 0–3 input terminals of a multiplexer 296. Each of multiplexers 290, 292, 294 and 296 receive the BA and BB signals at corresponding input terminals. The outputs of multiplexers 290, 292, 294 and 296 are connected respectively to the 0–3 input terminals of a multiplexer 298 At the output terminals of multiplexers 290, 292, 294 and 296 are signals MT17, MT18, MT19 and MT20 respectively. Multiplexer 298 receives signals RA and RB at input terminals designated A and B respectively. The output of multiplexer 298 is a signal designated as SM5.

Terminals A6, B6, C6 and N6 are connected respectively to the 0–3 input terminals of a multiplexer 300. Terminals D6, E6, F6 and O6 are connected respectively to the 0–3 input terminals of a multiplexer 302. Terminals G6, H6, J6 and P6 are connected respectively to the 0–3 input terminals of a multiplexer 304. Terminals K6, L6, M6 and Q6 are connected respectively to the 0–3 input terminals of a multiplexer 306. Each of multiplexers 300, 302, 304 and 306 receive signals BA and BB at corresponding input terminals. The outputs of multiplexers 300, 302, 304 and 306 are connected respectively to the 0–3 input terminals of a multiplexer 308. At the output terminals of multiplexers 300, 302, 304 and 306 are signals MT21, MT22, MT23 and MT24 respectively. Multiplexer 308 receives signals RA and RB at the input terminals designated A and B respectively. The output of multiplexer 308 is a signal designated as SM6.

Terminals A7, B7, C7 and N7 are connected respectively to the 0–3 input terminals of a multiplexer 310. Terminals D7, E7, F7 and O7 are connected respectively to the 0–3 input terminals of a multiplexer 312. Terminals G7, H7, J7 and P7 are connected respectively to the 0–3 input terminals of a multiplexer 314. Terminals K7, L7, M7 and Q7 are connected respectively to the 0–3 input terminals of a multiplexer 316. Each of multiplexers 310, 312, 314 and 316 receive signals BA and BB at corresponding input terminals. The outputs of multiplexers 310, 312, 314 and 316 are connected respectively to the 0–3 input terminals of a multiplexer 318. At the output terminals of multiplexers 310, 312, 314 and 316 are signals MT25, MT26, MT27 and MT28 respectively. Multiplexer 318 receives signals RA and RB at input terminals A and B respectively. The output of multiplexer 318 is a signal designated as SM7.

Terminals A8, B8, C8 and N8 are connected respectively to the 0–3 input terminals of a multiplexer 320. Terminals D8, E8, F8 and O8 are connected respectively to the 0–3 input terminals of a multiplexer 322. Terminals G8, H8, J8 and P8 are connected respectively to the 0–3 input terminals of a multiplexer 324. Terminals K8, L8, M8 and Q8 are connected respectively to the 0–3 input terminals of a multiplexer 326. Each of multiplexers 320, 322, 324 and 326 receive signals BA and BB at corresponding input terminals. The outputs of multiplexers 320, 322, 324 and 326 are connected respectively to the 0–3 input terminals of a multiplexer 328. At the output terminals of multiplexers 320, 322, 324 and 326 are signals MT29, MT30, MT31 and MT32 respectively. Multiplexer 328 receives signals RA and RB at input terminals A and B respectively. The output of multiplexer 328 is a signal designated SM8.

To more fully understand the operation of the infrastructure of multiplexer 138, it will be advantageous to refer to FIGS. 12A–M which show thirteen timing signals for the preferred embodiments. FIG. 12A shows the output of adjustable clock 120. FIG. 12B shows the sampling signal occurring at the rate of four sample intervals per anticipated bit interval. FIGS. 12C, D, E and F correspond to the byte 0 through byte 3 signals which actuate the corresponding 0–3 input terminals of the first tier of multiplexers in the infrastructure of multiplexer 138. In particular, the byte 0 through byte 3 signals shown in FIGS. 12C–F would actuate the 0–3 input terminals of multiplexer 250. FIGS. 12G–J show longer intervals which are the RE1–RE4 signals derived from the RA, RB signals applied through multiplexer 128. In FIG. 11A multiplexer 258 may be said to correspond to multiplexer 128 and the 0–3 input terminals of multiplexer 258 are actuated respectively during the RE1–RE4 time intervals respectively.

Consider the generation of the SM1 signal, for example. During the sampling clock signal, the output terminals of all of the serial shift registers are effectively disconnected and only become connected at the termination of the sampling clock signal. Multiplexers 250, 252, 254 and 256 all respond to the waveforms shown in FIGS. 12C, D, E and F to actuate the 0–3 input terminals at appropriate times. During four complete sampling times, the information on signal SM1 is in the following sequence: A1, B1, C1, N1, D1, E1, F1, O1, G1, H1, J1, P1, K1, L1, M1, Q1. In effect, all of the first bits of all sixteen registers are serially arranged in the form of a stream output. However, to more fully comprehend the output of multiplexer 138, it is necessary to look at all eight outputs SM1-8 simultaneously. The following description applies to the information transfer during the 1 level of the RE1 signal, that is, during the accessing of the first row of serial shift registers. During any given time interval the output signals SM1–SM8 signals constitute all eight bits of what may be referred to as the first byte (Byte 0) of the first row of the serial shift registers. That is, all of the outputs of serial shift register 208 are transferred through multiplexer 138 and supplied to Exclusive OR array 140. During the second byte timing interval (Byte 1), the SM1–SM8 signals constitute all of the eight binary data bits stored in the second byte or second register 216. During the third (Byte 2) interval shown in FIG. 12E, all of the information contained in register 218, is transferred by the corresponding SM1–SM8 signals. Assuming that system 1 has not been selected so that serial shift register 220 would not be held in reset, then during the fourth (Byte 3) interval designated FIG. 12F all of the information contained in register 220, is transferred by SM1-8 signals to the Exclusive OR array 140.

Thus, the function of multiplexer 138 is to take the sixteen shift registers and order them in terms of rows and columns and transfer the information by initially selecting a row and then sequencing through all four columns or registers in a left to right operation, transferring all eight bits of information contained in each of the four column positions. Upon completion of four bytes which constitutes the maximum word length, the next row is selected, that is registers designated D, E, F and O, and again, all of the eight data bits of information in each of registers D, E, F and O are transferred to Exclusive OR array 140. Then, the third row of registers, G, H, J and P are selected and during each byte 0–3 intervals, all of the eight bits of information contained in registers G, H, J and P are transferred to the Exclusive OR array 140. During the selection of the fourth row, all of the eight bits of data information contained in registers K, L, M and Q are transferred to the Exclusive OR array. Thus, the data has been sampled and reorganized and supplied to an Exclusive OR array for suitable comparison with a reference pattern.

Figure 12:
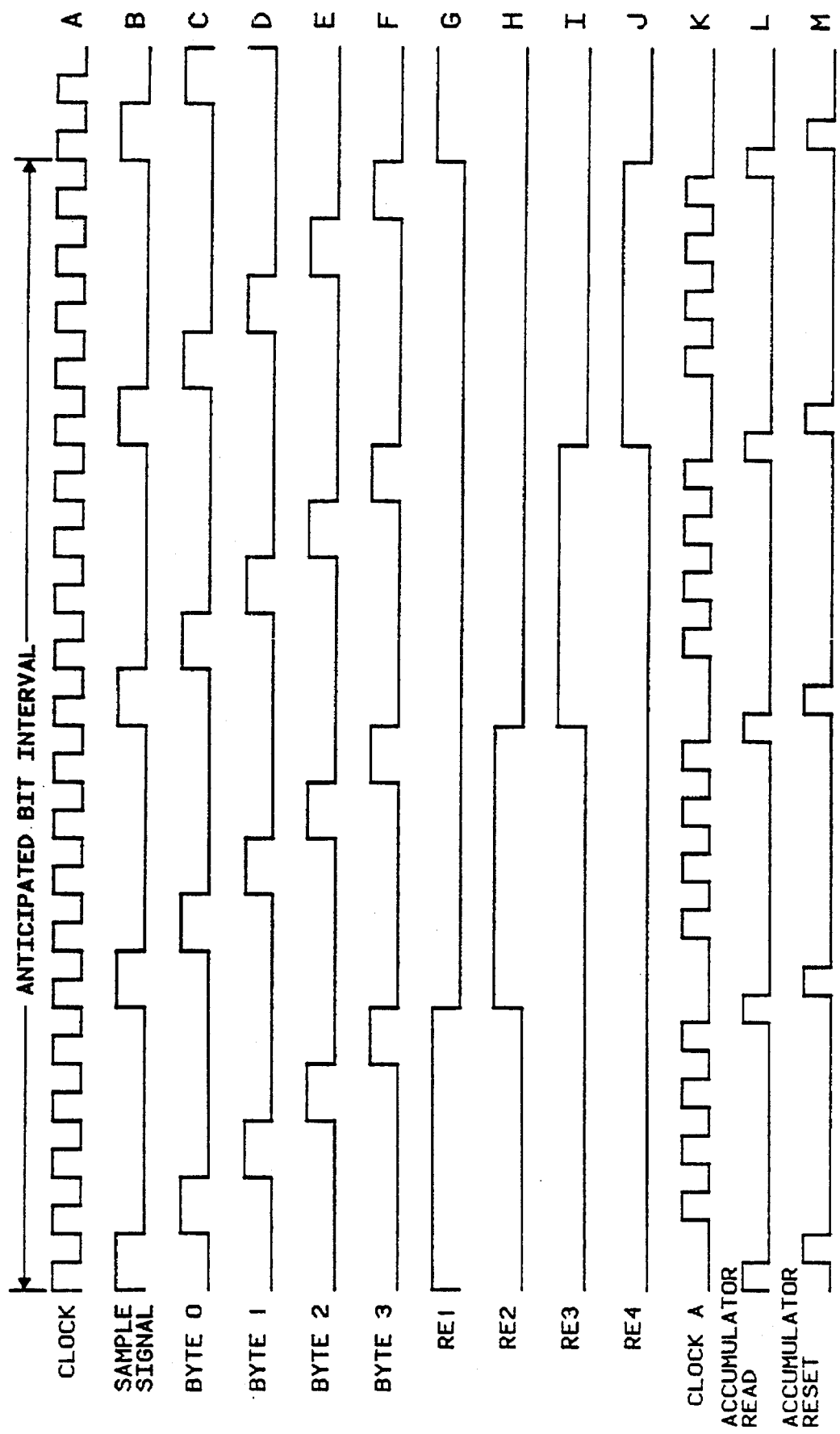
FIGS. 12 shows various timing diagrams for the schematic of FIGS. 11A and 11B.

It may be appreciated that any of several possible data reorganization schemes may be chosen to achieve the same type of comparison. However, for the present scheme, it has been found to be advantageous to choose for the multiplexer devices of the MC14539B type which is a dual four channel data selector/multiplexer. Since there are two such devices in the package, the pin correspondence will be made for only one device. Choosing the first device in the dual package, the A and B input terminals correspond to pins 14 and 2 respectively; the 0–3 input terminals correspond to pins 6, 5, 4 and 3; and the output terminals correspond to pin 7. The use of 14539B device type is appropriate for all forty multiplexing devices shown in FIGS. 11A and 11B. All are connected in a similar manner with the notable exception that the row multiplexers 258, 268, 278, 288, 298, 308, 318 and 328 receive signals RA and RB at the corresponding A and B input terminals and thus operate at a frequency which is one-fourth the operational frequency of the column selection mutliplexers. FIG. 12 also shows three additional timing diagrams, FIGS. 12K, 12L and 12M which will be described in greater detail later.

Figure 13A:
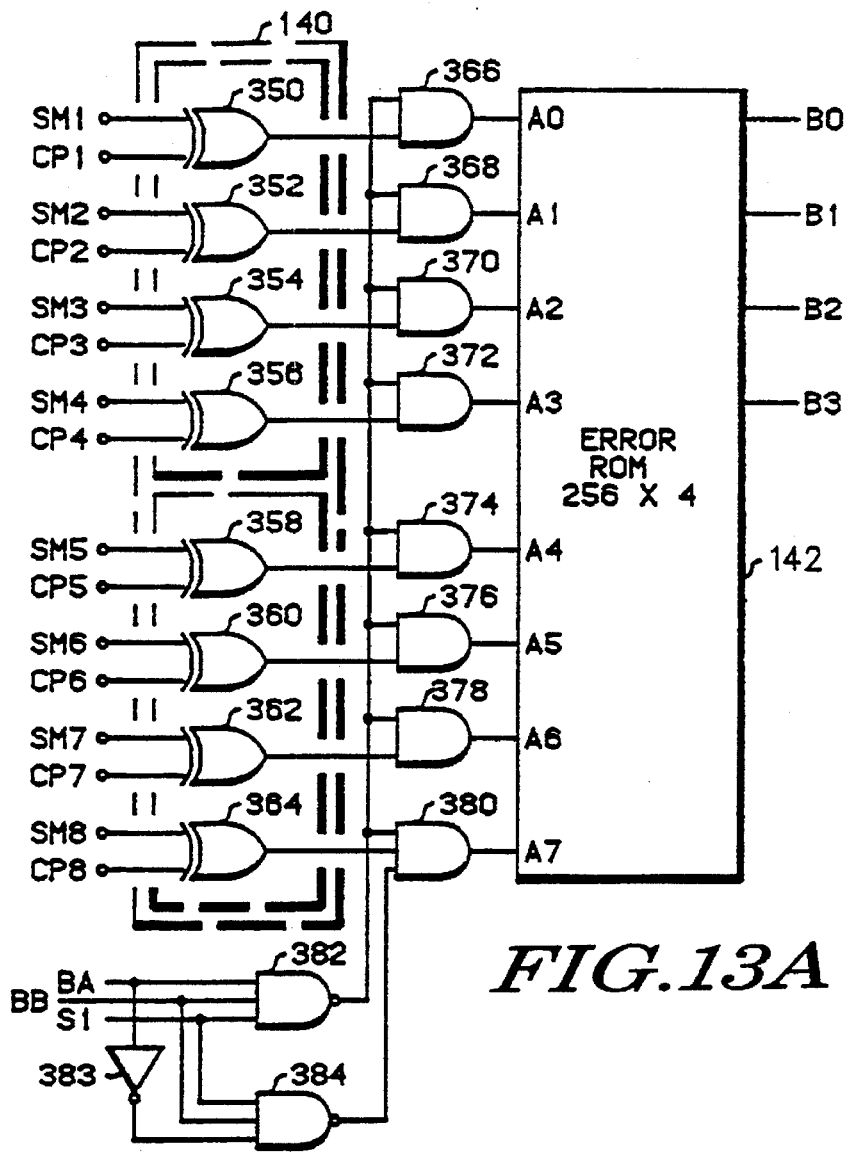
FIG. 13 shows the detailed electrical schematic for the Exclusive OR array portion of FIG. 8.
Figure 13B:
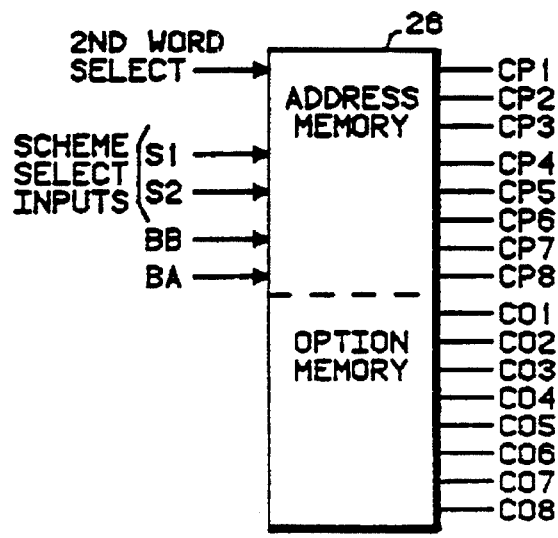

FIG. 13 shows the detailed structure of Exclusive OR array 140, error ROM 142 and code memory 26. The output signals of multiplexers 258, 268, 278, 288, 298, 308, 318 and 328, which are designated SM1, SM2, SM3, SM4, SM5, SM6, SM7 and SM8 are applied respectively to the first input terminals of Exclusive OR's 350, 352, 354, 356, 358, 360, 362 and 364. Code memory 26 is shown as having input terminals connected to receive scheme select signals S1 and S2 and a second word select signal. In addition, signals BB and BA, which correspond to the byte select inputs, are supplied to input terminals of code memory 26. The output terminals of code memory 26 are designated CP1-CP8 and CO1-CO8. For a designated byte as determined by the BA, BB signals which corresponds to the byte selection of the information in the serial shift registers, eight bits of information corresponding to an eight bit byte of the pager address code word stored in the code memory are supplied to the CP1-CP8 terminals. The CP1-CP8 terminals are connected respectively to the second inputs of Exclusive OR's 350, 352, 354, 356, 358, 360, 362 and 364. The CO1-CO8 terminals are connected to various devices as will be described in detail later. The CO1-CO3 terminals are used as POCSAG frame identification bits and CO4-CO8 are option enabling signals.

As may be recalled for the operation of an Exclusive OR, the output is 0 if the signals are identical and 1 if they are different. Thus, it may be seen that the Exclusive OR is an advantageous logic gate to determine whether the eight bits in each byte of the shift register agree with the code word address stored in code plug memory 26. As was described in FIG. 11, the eight bit binary configuration corresponding to,each byte of the sampled binary code word is transferred by means of signals SM1-SM8 to Exclusive OR's 350-364. Corresponding to each of the eight bit bytes for which, in the case of the preferred embodiments there are at most four, a corresponding byte of the memory address stored in code memory 26 is accessed for comparison in Exclusive OR's 350-364. The output of these Exclusive OR's for each combination of signals BA and BB correspond to the comparison of each eight bit byte of the detected code word with the corresponding byte of the stored code address word from the code memory. The output of Exclusive OR's 350, 352, 354, 356, 358, 360, 362 and 364 are connected to the first inputs of AND gates 366, 368, 370, 372, 374, 376, 378 and 380.

The byte select signal BA is supplied to the first input of a NAND gate 382 and through inverter 383 to the first input of a NAND gate 384. Byte select signal BB is supplied to the second input of NAND 382 and to the second input of NAND 384. The S1 output of scheme select counter 176 is supplied to the third input of NAND 382 and to the third input of NAND 384. The output of NAND 382 is connected to the second input of AND's 366, 368, 370, 372, 374, 376, 378 and 380. The output of NAND 384 is connected to the third input of AND 380. The output of AND's 366, 368, 370, 372, 374, 376, 378 and 380 are connected respectively to the A0-A7 address input terminals of error ROM 142. The output terminals of error ROM 142 are designated B0, B1, B2 and B3.

In operation, Exclusive OR array 140 and error ROM 142 function to provide a comparison between the eight bit bytes of the information contained in the various rows of the serial shift registers shown in FIG. 9 and the corresponding bytes of the address words contained in code plug memory 26. As has been described earlier, the Exclusive OR has a 1 logic level output when its inputs are different and a 0 logic level output when the input levels are the same. The enabling of AND's 366 through 380 is controlled by NAND's 382 and 384.

Byte select signals BA and BB along with the S1 scheme select signal are supplied to the inputs of NAND 382. NAND 382 will have a 0 output whenever BA, BB and S1 are at a 1 logic level and thus will disable all of AND gates 366-380. By referring to FIG. 10, during the fourth byte period (Byte 3), as defined by BA and BB being at a 1 level, the output of NAND 382 is at 0 thus disabling the interconnections between the Exclusive OR array 140 and the error ROM 142. This operation is provided so that no information from the fourth byte portion of the received and decoded information can be transferred into the error ROM. It will be recalled from the description of FIG. 9, that during the system 1 selection mode where signal S1 is at a 1 level, registers N, O, P and Q were held in a reset condition and thus could not accept data. As a redundancy in the design, during the fourth byte enabling cycle, all of AND gates 366-380 are disabled thus disconnecting the Exclusive OR from error ROM 142. In the ECHO coding system only 23 bits of information are used which corresponds to the 23 bit word. The inverse of signal BA, signal BB and scheme select signal S1 are supplied to the inputs of NAND 384. It may be seen that NAND gate 384 will have a 0 output when all inputs are at a 1 level and this occurs only during the third byte period. Thus, during this third byte period (Byte 2), only seven of the eight possible bits can be transferred into error ROM 142. Thus, the 23 word ECHO coding format is maintained in the error determination.

The operation of the code plug memory 26 is principally to store the predetermined individual page address words and to supply them to the Exclusive OR array for determining whether or not the correct address has been detected. Thus, code memory 26 preferably consists of two regions, a N by eight address memory and an eight bit option word memory. The option word contains four bits that may be provided to Alert Pattern circuit 72. Thus, for the designated code address, a different alert pattern might be employed, thus distinguishing between, as for example, emergency calls and ordinary calls to be returned.

Code memory 26 is accessed by scheme select signals S1, S2 and by the second word select signal. ECHO employs a second address word and, in the case of the asynchronous decoding of the POCSAG system, the second word is the 32 bit individual pager address word. As is consistent with the multiplexing circuits, signals BA and BB are supplied to code plug memory 26 to allow for the selection of eight bit bytes to be transferred to Exclusive OR array 140 at the appropriate times.

As has been described earlier, error ROM 142 uses the logic levels at the inputs to address a specific location at which is found a number corresponding to the number of errors in to the input addressing pattern generated by Exclusive OR array 140. This number of errors is coded in binary format and supplied at the output terminals of error ROM 142. The process of determining the errors in a table look up fashion increases the speed of the operation. To fully understand the data that would be contained in the error ROM 142, a table is included for a somewhat smaller system. For error ROM 142, because there are eight addressing input tables, it is a 256 by four bit word read-only memory table whereas for the purposes of explanation, Table I shows a 16 by four error table arrangement which is indicative of the type of information which would be stored in error ROM 142. Referring to Table I, the first four columns show the corresponding logic levels of the four binary inputs to a 16 by four bit error ROM, the fifth column shows the decimal equivalent of the output which is the number of errors between the compared signals. To fully understand the operation of this error table, it must be remembered that the lines accessing the address inputs would come from the output of Exclusive OR devices. The remaining four columns show the binary equivalent of the decimal value corresponding to the number of errors from an Exclusive OR array. Thus, one skilled in the art can easily duplicate the type of information contained in 15 error ROM 142.

TABLE I

ERROR ROM

| Binary Input | | | | Decimal Equivalent of Output | Binary Output | | | |
|---|---|---|---|---|---|---|---|---|
| $A_0$ | $A_1$ | $A_2$ | $A_3$ | | $R_{01}$ | $R_{02}$ | $R_{03}$ | $R_{04}$ |
| 0 | 0 | 0 | 0 | 0 | 0 | 0 | 0 | 0 |
| 0 | 0 | 0 | 1 | 1 | 0 | 0 | 0 | 1 |
| 0 | 0 | 1 | 0 | 1 | 0 | 0 | 0 | 1 |
| 0 | 0 | 1 | 1 | 2 | 0 | 0 | 1 | 0 |
| 0 | 1 | 0 | 0 | 1 | 0 | 0 | 0 | 1 |
| 0 | 1 | 0 | 1 | 2 | 0 | 0 | 1 | 0 |
| 0 | 1 | 1 | 0 | 2 | 0 | 0 | 1 | 0 |
| 0 | 1 | 1 | 1 | 3 | 0 | 0 | 1 | 1 |
| 1 | 0 | 0 | 0 | 1 | 0 | 0 | 0 | 1 |
| 1 | 0 | 0 | 1 | 2 | 0 | 0 | 1 | 0 |
| 1 | 0 | 1 | 0 | 2 | 0 | 0 | 1 | 0 |
| 1 | 0 | 1 | 1 | 3 | 0 | 0 | 1 | 1 |
| 1 | 1 | 0 | 0 | 2 | 0 | 0 | 1 | 0 |
| 1 | 1 | 0 | 1 | 3 | 0 | 0 | 1 | 1 |
| 1 | 1 | 1 | 0 | 3 | 0 | 0 | 1 | 1 |
| 1 | 1 | 1 | 1 | 4 | 0 | 1 | 0 | 0 |

While FIG. 13 more appropriately corresponds to the adaptive signal decoder embodiment for the present invention, it is descriptive of the microcomputer embodiment with the precaution that the arithmatic logic unit of the microcomputer would provide the Exclusive OR function in a manner somewhat different than the corresponding integrated circuit device.

Code plug memory 26 could be constructed from the commercially available nichrome PROM's which would have several addressing select lines for utilization by the scheme select signals, the byte select signals BA and BB and the second word select signal. The total binary word length is somewhat arbitrary and what has been chosen is N times-eight for individual pager address words and eight additional bits for designating options.

While any of a number of logic devices may be utilized, it has been found to be convenient to use devices of the type MC14023UB for three input NAND's 382 and 384. MC14081B is appropriate for the two input AND's 366, 368, 370, 372, 374, 376 and 378 and MC14082B is appropriate as a four input AND gate for AND 380. Moreover, an MC14070B, which provides a quad package Exclusive OR gate, is appropriate for Exclusive OR array 140. Indeed, since the devices are in quad packages and eight such Exclusive OR gates are required, it will be necessary to use two such IC devices. As all of the logic gates have at most two or three inputs and a single output, it is not necessary to make pin identifications and anyone skilled in the art reviewing the data sheet can easily interconnect these devices.

It has also been found advantageous to utilize a part of a device of the type MCM14524 for error ROM 142. This 1024 bit read-only memory provides enough space for the 256 by four table required in the preferred embodiments. Again, those skilled in the art will ascertain by reviewing the data sheet that additional pin connections must be made to supply power, grounding, etc. to the IC. For the normal interconnections, the A0–A7 address input terminals are designated as pins 15, 14, 7, 9, 10, 11, 12 and 13. The corresponding output terminals B0–B3 correspond to pins 3, 4, 5 and 6.

Figure 14:
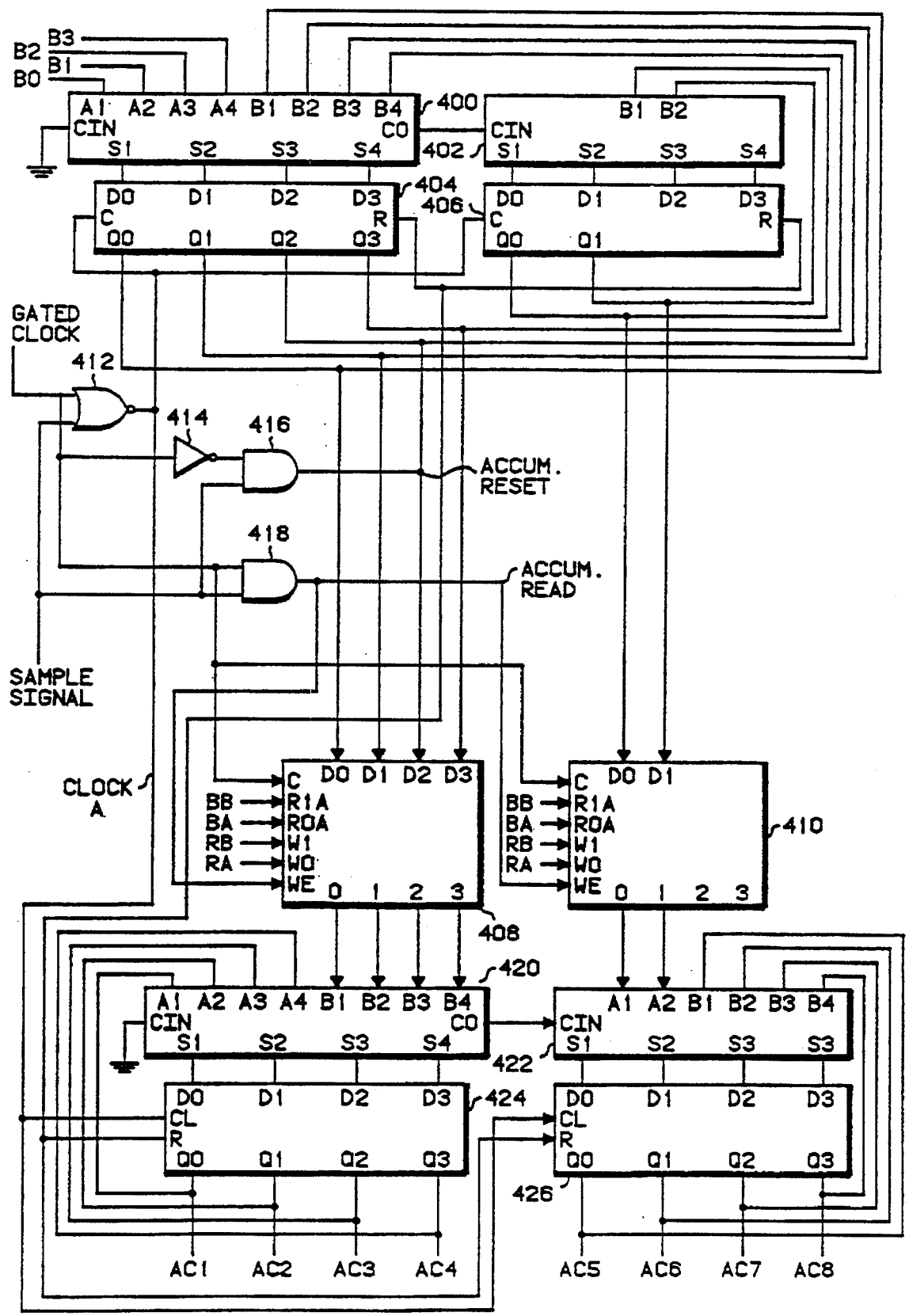
FIG. 14 shows the detailed electrical schematic for the adder/accumulator portion of FIG. 8.

FIG. 14 shows the infrastructure for adder/accumulator 144 originally shown in FIG. 8. The output terminals of error ROM 142 designated B0–B3 are connected respectively to the first four input terminals of a binary four bit adder 400. The carry in (CIN) terminal of adder 400 is grounded, and the carry out (CO) terminal is connected to the carry input terminal of a binary four bit adder 402. The four output terminals of adder 400 are connected to the four input terminals of a four bit D type register 404. The four output terminals of register 404 are connected respectively to the second four input terminals of adder 400. The first four input terminals of binary adder 402 are grounded. The output terminals of adder 402 are connected to the four input terminals of a four bit D type register 406. The first two output terminals of output register 406 are connected back to the fifth and sixth input terminals of adder 402. The seventh and eighth input terminals a-re grounded. The four output terminals of register 404 are connected respectively to the data input terminals of a buffer memory 408. The first two output terminals of register 406 are connected to the first two data input terminals of a second four by four multi-port buffer register 410.

The gated clock signal from the output of AND 122 is applied to the first terminal of a NOR gate 412, to the clock input of buffer memory 408, through inverter 414 to the first input of an AND gate 416, and to the first input of an AND gate 418. The sample signal which is the output of the $2^2$ terminal of counter 124 and whose waveform is shown in FIG. 10D is supplied to the second input of NOR 412, to the second input of AND 416 and to the second input of AND 418. The output of NOR 412 is connected to the clock terminals of four bit D type registers 404 and 406. The output of NOR 412 is also a signal designated clock A. The output of AND. 416 is connected to the reset terminals of registers 404 and 406. The gated clock signal is also connected to the clock input of terminals of buffer memories 408 and 410.

Buffer memories 408 and 410 are preferably four-by-four multi-port registers which allow independent reading of any two words while writing into any one of four words. Signals BA and BB, whose waveforms are shown in FIGS. 10B and 10C respectively, are supplied to the R0A and R1A input terminals of registers 408 and 410. Signals RA and RB whose waveforms are shown in FIGS. 10E and F respectively are supplied to the W0 and W1 input terminals of registers 408 and 410. The output of AND 418 is connected to the WE input terminals of registers 408 and 410.

The four output terminals of register 408 are connected to the fifth through eighth input terminals of a four bit adder 420. The first two output terminals of register 410 are connected to the first two input terminals of a four bit adder 422. The carry in terminal CIN of adder 420 is grounded and the CO terminal of adder 420 is connected to the CIN terminal of adder 422. The four output terminals of adder 420 are connected respectively to the four input terminals of a four bit D type register 424. The four output terminals of adder 422 are connected respectively to the four input terminals of a four bit D type register 426. The output of AND 416 is connected to the R terminals of D type registers 424 and 426 and the output of NOR 412 is connected to the CL terminals of registers 424 and 426. The four output terminals of register 424 are connected respectively to the first four inputs of adder 420. The four output terminals of register 426 are connected respectively to the fifth through eighth input terminals of adder 422.

At the four output terminals of four bit D type register 424 are signals AC1, AC2, AC3, AC4 and at the four output terminals respectively of four bit D type register 426 are signals AC5, AC6, AC7 and AC8. These signals are the accumulator output signals which are subsequently supplied to the error comparators. At the output of AND 416 is a signal designated Accumulator Reset and at the output of AND 418 is a signal designated Accumulator Read.

For the purposes of understanding the operation of the infrastructure of accumulator 144 as shown in FIG. 14, it is advantageous to refer to FIGS. 12K, L and M. FIG. 12K shows the clock A waveform which is supplied to the clocking terminals of D type registers 404 and 406. The Accumulator Read signal which is established at the output of AND 418 is shown in FIG. 12L and the Accumulator Reset signal which is established at the output of AND 416 is shown in FIG. 12M. In operation, accumulator 144 receives the signal information from output terminals B0–B3 of error ROM 142. Four bit binary adders 400 and 402 have been interconnected with four bit D type registers 404 and 406 to provide an accumulator operation. The adders alone are not clocked devices and therefore cannot function as accumulators. The addition of the D type registers provides a latching operation so that an accumulated total may be obtained.

For each of the eight bit compare operations of Exclusive OR array 140 there is a corresponding output from error ROM 142 which is supplied to four bit adder 400. Four bit adders 400 and 402 are cleared to all zeros at the start of each register comparison and during the middle of each byte select pulse the error information in error ROM 142 is read out, supplied to the adders and the output of the adders is latched into the D type registers. The count in the D type registers is fed back to the input of the adders to be added to the next error value coming from error ROM 142. This operation produces sequentially the sum of error byte 0, the sum of error bytes 0 and 1, the sum of bytes 0, 1 and 2 and finally the sum of bytes, 1, 2 and 3.

The output supplied to four-by-eight memories formed by registers 408 and 410 is the the final error summation resulting from adding the four error counts from error ROM 142. As will be described in greater detail later, four by four multi-port registers 408 and 410 are selectively enabled so that they receive the sum of the four byte error values.

To understand the operation of the adders and latching devices, reference should be made to FIGS. 12K, 12L and 12M. FIG. 12K shows the timing pulses for the clock A signal which is applied to the clock input terminals of four bit D type registers 404 and 406. This signal allows clocking of the error count information at the center of each of the byte select intervals. Thus, sufficient time is allowed to transfer information from the serial shift register to the Exclusive OR arrays, obtain the output from error ROM 142 and then to total it through the adding operations of adders 400 and 402. After error ROM 142 output has been added to the value stored in latches 404 and 406 for each of the four register bytes, the accumulator read signal which is derived from AND 418 and then transfers the final error count to the buffer memory formed by 408 and 410. The accumulator reset signal, which is supplied from AND 416, then resets the D type registers 404 and 406. The reset occurs at the termination of the accumulator read pulse which is at the termination of the sampling time. Thus, before the introduction of new data from the next byte operation, the latching registers have been cleared and the adders prepared to take in the next error byte. information and to process it through the accumulator.

The operation of four by four multi-port registers 408 and 410 is that of buffer memories. The outputs of the accumulated total error for the four bytes of information are supplied to the data input terminals of multi-port registers 408 and 410. These registers selectively store the information so that it may be supplied to four bit adders 420 and 422 without disrupting the normal operation of adders 400 and 402. The functioning of the buffer memory provided by registers 408 and 410 is to accumulate the eight bits of total error for each row of sample registers. Four bit adders 420 and 422 are interconnected with this buffer memory to add the contents of the four error sum counts in the buffer memory and thus provide a total error count for the comparison of the four sample registers with the address word in code memory 26. The operation of four bit adders 420 and 422 is identical to that of 400 and 402, and the latching operation of D type registers 424 and 426 is similar to that of latches 404 and 406. Again, the signal A is provided to the clock terminals and the accumulator reset signal from the output of AND 416 is applied to the reset terminals of the D type registers used as latches.

The buffer memory is composed of two multi-port registers 408 and 410. These allow independent reading of any two words while writing into any one of four words. Therefore, at the appropriate time, the accumulator read signal which is developed at the output of AND 418 loads the sum for the last four byte comparison from the outputs of register latches 404 and 406 into the buffer memories so that they may be further summed by four bit adders 420 and 422. To fully understand the information contained in the buffer memory, it should be appreciated that at any given time it has stored in its addressable positions the last four total for the sun of the byte additions which are generated at the output of the latching registers 404 and 406.

Thus, while the first combination of four bit adders 400 and 402 add the sum of errors for any row of the serial shift registers, the second set of adders, that is adders 420 and 422, add the total number of errors in the words for the last four register comparisons. The information which full adders 420 and 422 receive is contained in the buffer memory so that during the same timing pulses, as represented by the clock A signal, the total error for the entire sixteen register array is summed and the result appears at the output of latching registers 424 and 426. With each additional sample pulse, the total error changes to correspond to the net effect of the newly derived byte error produced by the outputs of latching registers 404 and 406. Thus, the signals at the output of latching registers 424 and 426 is the total sum at any given time for the total error for all sixteen registers shown in FIG. 9. The final output terminals generate signals AC1–AC8 which correspond to the net total error resulting from the comparison of the detected binary signal pattern.

While any of a number of IC's may be used for accumulator 144, for the adaptive signal decoder embodiment it has been found to be advantageous to utilize devices of the type MC14008 for adders 400, 402, 420 and 422. With that choice, the following pin correspondence may be made: carry in and carry out terminals correspond to pins 9 and 14; the first set of four input terminals correspond to pins 7, 5, 3 and 1 and the second set of input terminals to pins 6, 4, 2 and 15; and the output terminals correspond to pins 10, 11, 12 and 13. Devices of the type MC14076B are appropriate for latches 404, 406, 424 and 426. With that choice, the following pin correspondence may be made: the clock and reset terminals correspond to pins 7 and 15; and the four input and four output terminals correspond respectively to pins 14, 13, 12, 11, 3, 4, 5 and 6. The buffer memory is comprised of two four-by-four multi-port registers of the type MC14580B. With that choice the following pin correspondence may be made: the W0, W1, R0A and R1A correspond respectively to pins 8, 9, 13 and 14; the WE terminal corresponds to pin 15 and the clock terminal corresponds to pin 16; the four input terminals and four output terminals correspond respectively to pins 20, 19, 18, 17, 4, 5, 6 and 7.

The eight output signals from accumulator 144 are designated AC1 through AC8. These correspond to the total error in the sixteen serial shift registers at any given sampling period. In FIG. 15 signals designated AC1–AC4 are supplied to the four input terminals of a four bit magnitude comparator 450; signals AC5–AC8 are supplied to the four input terminals of a four bit magnitude comparator 452; signals AC1–AC4 are supplied to the four input terminals of a four bit magnitude comparator 454; and signals AC5–AC8 are supplied to the four input terminals of a four bit magnitude comparator 456. Comparator 450 has B+ supplied to the greater than and equal to input terminals while the less than input terminal is grounded. The equal output terminal and less than output terminal are connected respectively to the equal and less than input terminals of comparator 452.

Signals designated LL1 through LL4 are supplied to the second set of input terminals of comparator 450. Signal LL5 is supplied to the first of the second set of input terminals of comparator 452, with the remaining three input terminals of the second set being grounded. Signals LL1 through LL5 may be selected in the hardware version by coupling the system select signals S1 and S2 to a ROM. In the microcomputer implementation separate registers may be utilized to state this information. Such techniques are well known in the art. The equal to and less than output terminals of comparator 452 are connected to the inputs of an OR gate 458.

B+ is applied to the greater than and equal to input terminals of comparator 454 with the less than input terminal being grounded. The equal and less than output terminals of comparator 454 are connected respectively to the equal and less than input terminals of comparator 456.

Signals UL1 through UL4 are supplied respectively to the second set of input terminals of four bit comparator 454. Signals UL5 through UL8 are supplied to the second set of input terminals of comparator 456. The equal to and greater than output terminals of comparator 456 are connected to the inputs of an OR 9ate 460.

The output of OR 458 is connected to the D input terminal of a flip-flop 462, to the first input of an OR gate 464 and to the B input terminal of a multiplexer 466. The output of OR 460 is connected to the D input terminal of a D type flip-flop 468 and to the second input of OR 464. The Accumulator Read signal is supplied to a first input of an AND gate 469. The output of AND 469 is connected to the clock input terminals of data flip-flops 462 and 468. The Q output terminal of flip-flop 468 is connected to the first input of an OR gate 470. The Q output terminal of data flip-flop 462 is connected to the second input of OR 470 and to the A input terminal of multiplexer 466. The Output of OR 470 is connected to the reset input terminal of a window timer 472 through an inverter 471, and the output of OR 470 is a signal labeled second word select. The output of inverter 471 is connected to the second input of AND 469. Window timer 472 is a 12 stage binary counter having 12 corresponding output terminals.

The decoding gates for the establishment of the first edge of the timing window and the subsequent second edge the timing window will be shown in general. The actual times will be described in detail below and it should be clear to those skilled in the art which timer connections should be coupled to which gates to achieve this operation. A system 1 select line is supplied to the first inputs of AND gates 474 and 476. The remaining inputs of AND gate 474 are connected to various of the output terminals of window timer 472. The selection of actual connections is dependent upon the value required for the initiation of the window timer. This will be described in some detail later. Similarly, the remaining inputs to AND 476 will be connected to appropriate output terminals of window timer 472 for the time at which the window is closed. Again, the actual connections to the output stages are dependent upon the number selected for the upper limit of the timing operation.

Similarly, for system 2, scheme 2 signal S2, is supplied to the first input terminals of AND's 478 and 480. The output of AND 474 is connected to the first input of an OR gate 482. The output of AND 478 is connected to the second input of OR 482. The output of OR 482 is connected to the set terminal of a flip-flop 490. The output of AND 480 is connected to the first input of an OR gate 492 and the output of AND 476 is connected to the second input of OR 492. The output of OR 492 is connected to the reset terminal of flip-flop 490 and to the reset terminals of data flip-flops 462 and 468. The Q output terminal of flip-flop 490 is connected to the first input of a NAND gate 494. The second input of NAND 494 is the signal designated Accumulator Read whose waveform is shown n FIG. 12L. The output of OR 464 is connected to the third input of NAND 494. The output of NAND 494 is connected to the enable input of multiplexer 466 and to the clock terminal of a D type latching register 496.

The four output terminals of multiplexer 466 are connected respectively to the first input terminals of AND gates 500, 502, 504 and 506. The second inputs to each of AND gates. 500, 502, 504 and 506 are derived from the code plug option data as shown in FIG. 13. The outputs of AND gates 500, 502, 504 and 506 are supplied respectively to the four data input terminals of register 496. The signal designated Alert Reset which comes from annunciator 74 is supplied to the reset terminal of register 496. The Q0–Q3 outputs of register 496 are signals which are provided to the alert pattern circuitry 72.

The sample clock signal is supplied to the clock input terminal of a programmable delay counter 510. Signals CO1, CO2 and CO3 which are provided by the option memory portion of code address memory 26 as shown in FIG. 13 are supplied to the corresponding input terminals of programmable delay counter 510. The sample clock signal is also supplied to the first inputs of AND gates 512 and 514. System select signals S1 and S2 are supplied respectively to the second input terminals of AND's 512 and 514. The output terminal of programmable delay counter 510 is connected to the third input of AND 514. The outputs of AND's 512 and 514 are connected to the inputs of an OR gate 516. The output of OR 516 is connected to the clock input terminal of window timer 472. The output of inverter 471 is connected to the reset terminals of programmable delay counter 510 and window timer 47 are connected through inverter 471 to the output of OR 470 at which is generated the second word select signal.

In operation, the output from the comparator is supplied simultaneously to a lower limit comparator and an upper limit comparator to determine the best and worst comparisons for the errors generated by the comparison between the information stored in the code plug memory and the binary data derived and decoded from the communications receiver. In the event that there is an output at either the equal to or less than terminal of comparator 452, the output of OR 458 applies a signal to the data terminal of flip-flop 462 and to terminal B of multiplexer 466 to indicate that the number of errors was less than or equal to the lower count limit. The output of OR 458 also operates through OR gate 464 to generate a detect signal which is supplied to NAND 494 which, if this were the second word, would cause an Alert Enable signal to be supplied to multiplexer 466 and to the clock terminal of register 496.

If there is a signal at either the equal to or greater than output terminals of comparator 456, this causes an output of OR 460 which supplies a signal to the D input terminal Of data flip-flop 468 to indicate that the number of errors was greater than the maximum limit. The output of OR 460 also operates through OR 464 to provide a detect signal to an input of NAND 494. Again, if the detect is a second word, NAND 494 would cause an alert enable signal to be supplied to multiplexer 466 and to the clock terminal of register 496. At the appropriate time, the Accumulator Read signal time provides an alert enable pulse to the enable input of multiplexer 466 and the clock terminal of D type latching register 496. For a word detect resulting from an output from either terminal of comparator 452, or a word inverse detect, which would be the result of an output at either of the output terminals of comparator 456, data flip-flops 462 and 468 function such that at the next Accumulator Read signal, the information corresponding to a detect is clocked through to their respective Q output terminals. Both Q output terminals are coupled through OR gate 470 to enable window timer and to establish a second word select signal.

The output of OR 470 enables window timer 472 by removing the reset signal that had been applied to the timer by inverter 471. In addition, the input of AND 469 which is responsive to the output of 471 acts to disable AND 469 to prevent further Accumulator Read clock signals from being applied to flip-flops 462 and 468. This latter action preserves the identity of whether word 1 or its inverse was received.

If the ECHO system is being decoded, the S1 input to AND 512 is enabled, and the sample clock signal at the second input of AND 512 is supplied to the clock input of window timer 472 through OR 516. As a result, the window timer begins to count in accordance with the Sample clock signal and, at a count of 368, enables AND gate 474 which sets flip-flop 490 to open the second word detect time window. If window timer 472 reaches a count of 380 before a second word is detected, the inputs to AND gate 476 are enabled to generate an output signal that resets flip-flop 490 through OR 492. This signal closes the word 2 detect window and resets the detect flip-flops 462 and 468.

If the POCSAG system is being decoded, the clock to window timer 472 is delayed by the action of programmable delay counter 510. Specifically, when the reset signal is removed from window timer 472, a similar reset signal is removed from programmable counter 510. However, the sample clock signal path to window timer 472 is blocked by the disable conditions on AND gates 514 and 512 until programmable delay counter 510 reaches its programmed count of 256 times where N is a programmable number generated by the inputs CO1, CO2 and CO3 from code memory 26 of FIG. 13 and which correspond to the address frame number assigned to the individual pager address for the POCSAG coding format. When delay counter 510 reaches its limit count, it generates an output signal that, together with the S2 signal enable AND 514 to allow the sample clock to be fed through OR gate 516 to reach the clock input of the window timer 472.

When window timer 472 reaches a count of 124, the inputs of AND gate 478 are enabled, generating an output signal that is coupled through OR 482 to the set input of flip-flop 490 Thus the output signal at AND 478 acts to open the detect window for the detection of the POCSAG address word in the appropriate frame. Similarly, when the window timer 472 reaches a count of 260, the inputs to AND 480 are enabled to generate an output signal that is coupled through OR 492 to reset flip-flops 490, 462 and 468, resulting in termination of the detect window and a resetting of the detect flip-flops.

Thus, for the POCSAG system, the net effect of programmable delay counter 510 is to generate a signal which delays the opening of the address word detect window until the appropriate time for the assigned address frame. It should be noted that, since the POCSAG code does not provide for inverse word address assignments, the inverse word detect path could be disabled for system 2 by applying all 1 level signals to the upper error limit inputs UL1 through UL8, thereby making it impossible to find an input error count that would pass the upper limit error comparison test.

Assuming that a word 1 detect has been established, either through the lower count limit or the upper count limit and that scheme 1 has been selected, then flip-flop 490 has been set causing the Q output of flip-flop 490 to enable NAND 494 to provide the correct alert enable signal at the detection of the second word. The output of demultiplexer 466 then depends upon the combination of specific first and second words that were detected and an appropriate alert is generated.

A distinct advantage of detecting both the lower and upper limit, especially in the ECHO system, lies in the fact that when a correct comparison is made, the errors are less than some predetermined value. In a similar manner, if the errors are enormous, it means, rather than detecting the anticipated code address, the system has detected the binary inversion of that address. Thus with one analysis of the data, this coding scheme allows for the detection of either the code word or its binary inverse. The ECHO system uses this detection method for the purpose of designating different combinations for corresponding alert signals. Thus, if one chooses to address words in the ECHO system, one can achieve four different addresses is by appropriate combinations of the address word and its binary inverse for the first and second words. The decoding device shown in FIG. 15 allows for precisely this type of operation. The parallel operation of the lower count limit and upper count limit allow for detecting either the word in code memory address 26 or its binary inversion.

When any first word has been detected, as in the example of the first word in the ECHO system, window timer 472 is enabled to start the counting period for determining when the next word should be detected. At the appropriate time, the window is opened so that the system may look for the occurrence of the second word. With the window opened, NAND gate 494 is enabled so that upon the actuation of an Accumulator Read signal in conjunction with a Detect signal through OR 464, the Alert signal can be provided to cause alert pattern circuit 72 to activate the annunciator to provide the alert. Consistent with this type of decoding, it is necessary for the system to recall not only that a first word has been detected, but rather that the first word or its binary inverse has been detected. The function of multiplexer 466 is precisely to decode, from the detect information at its A and B input terminals, the signaling sequence that was decoded and to enable the appropriate AND gate to respond to the code plug option data and supply sufficient information to register 496 to produce the Alert signal to pattern detector 72 and cause annunciator 74 to respond by signaling to alert the user.

Again, as is common with most systems, the Alert will continue for a fixed period of time or until it is manually reset. In either case, the Alert Reset line will clear register 496 and cause the system to be reset to enable the next decoding operation.

For the devices shown in FIG. 15 it has been found to be advantageous to utilize devices of the type MC14585B for comparators 450, 452, 454 and 456. With this choice, the following pin correspondence may be made: the greater than, equal to and less than input terminals correspond to pins 4, 6 and 5; the greater than, equal to and less than output terminals correspond to pins 13, 3 and 12; and the first and second set of four bit input terminals correspond to pins 10, 7, 2, 15, 11, 9, 1 and 14.

Window timer 472 may be a device of the type MC14040B. With such a choice, the clock and reset terminals correspond to pins 10 and 11; and the output terminals in sequence from lowest to highest stage correspond to pins 9, 7, 6, 5, 3, 2, 4, 13, 12, 14, 15 and 1.

A device of the type MC14555B is suitable for demultiplexer 466 and a device of the type MC14076 is suitable for D type register 496. Both types of devices have been previously described.

Delay counters are well known in the art, and the exact details of the construction of delay counter 510 are not necessary. It can be implemented by Using a divided-by-$2^8$ (=256) counter and a programmable divide-by-N counter. In the preferred embodiment a counter of the type MC14040B discussed previously is used as the divide-by-256 counter, and an MC14526B programmable divided-by-N counter can be used as the divide-by-N elements.

In FIG. 16, signals MT1, MT2, MT3 and MT4 from the output Of the first tier of multiplexers shown in FIG. 11A are supplied to the four input terminals of a bit rate ROM 520. Signals MT5–MT8 are supplied to the four input terminals of a bit rate ROM 522. Signals MT9–MT12 are supplied to the four input terminals of a bit rate ROM 524. Signals MT13–MT16 are supplied to the four input terminals of a bit rate ROM 526.

Signals MT17–MT20 from FIG. 11B are supplied to the four input terminals of a bit rate ROM 530. Signals MT21–MT24 are supplied to the input terminals of a bit rate ROM 532. Signals MT25–MT28 are supplied to the four input terminals of a bit rate ROM 534. Signals MT29–MT32 are supplied to the four input terminals of a bit rate ROM 536.

The two output terminals of bit rate ROM's 520 and 522 are supplied to corresponding input terminals of a four bit adder 540. The two output terminals of bit rate ROM's 524 and 526 are supplied to the corresponding input terminals of a four bit adder 542. The two output terminals of ROM's 530 and 532, are connected to corresponding input terminals of a four bit adder 544. The two output terminals of bit rate ROM 534 are supplied to the first two input terminals of a four bit adder 546. The two output terminals of bit rate ROM 536 are supplied, respectively, to the first inputs of AND's 548 and 550. The outputs of AND's 548 and 550 are connected, respectively, to the third and fourth input terminals of four bit adder 546.

Byte select signal BA is applied through an inverter 552 to the first input terminal of a NAND gate 554. Byte select signal BB is supplied to the second input of NAND 554. The output of NAND 554 is connected to the second inputs each of AND's 548 and 550. The system select signal S1 is supplied to the third input of NAND 554. The output of NAND 554 is identical to the output of NAND 384 in FIG. 13 but it is included here for the purpose of simplifying the explanation of FIG. 16A.

The three output terminals of four bit adder 540 are connected respectively to the first three of the first set of input terminals of a four bit adder 560. The three output terminals of four bit adder 542 are connected respectively to the first three of the second set of input terminals of four bit adder 560. The first three output terminals of four bit adder 544 are connected respectively to the first three of the first set of input terminals of four bit adder 562. The first three output terminals of four bit adder 546 are connected respectively to the first three of the second set of input terminals of four bit binary adder 562. For adders 540, 542, 544 and 546, the unused input terminals are grounded. The fourth output terminal of four bit binary adder 540, 542, 544 and 546 is not connected. The fourth input terminals of the first and second set of inputs to four bit binary adders 560 and 562 are also grounded.

The four output terminals of four bit binary adders 560 and 562 are connected respectively to the eight input terminals of a binary four bit adder 564. The four output terminals of binary adder 564 are connected respectively to the four of the second set of input terminals of a binary adder 566. The CO terminal of adder 566 is connected to the CIN terminal of binary adder 568. The two binary adders 566 and 568 are connected with corresponding latching registers to provide an adder/accumulator for the outputs of binary adder 564. The CO output terminal of adder 564 is connected to the first input terminal of the first set of input terminals of four bit binary adder 568. The four output terminals of binary adder 566 and the four output terminals of binary adder 568 are connected respectively to the four input terminals of D type registers 570 and 572. The clock A signal is applied to the clock input terminals of D type registers 570 and 572 and the accumulator reset signal is supplied to the reset terminals of both D type registers. As will be recalled, these D type registers are interconnected to their corresponding adders to provide a latching action to accumulate the information provided at their inputs. The four inputs of D type register 570 are connected respectively to the four outputs of binary adder 566. The four inputs of D type register 572 are connected respectively to the output terminals of binary adder 568. The remaining three input terminals of the first set of input terminals of binary adder 568 are connected to ground.

Figure 16A:
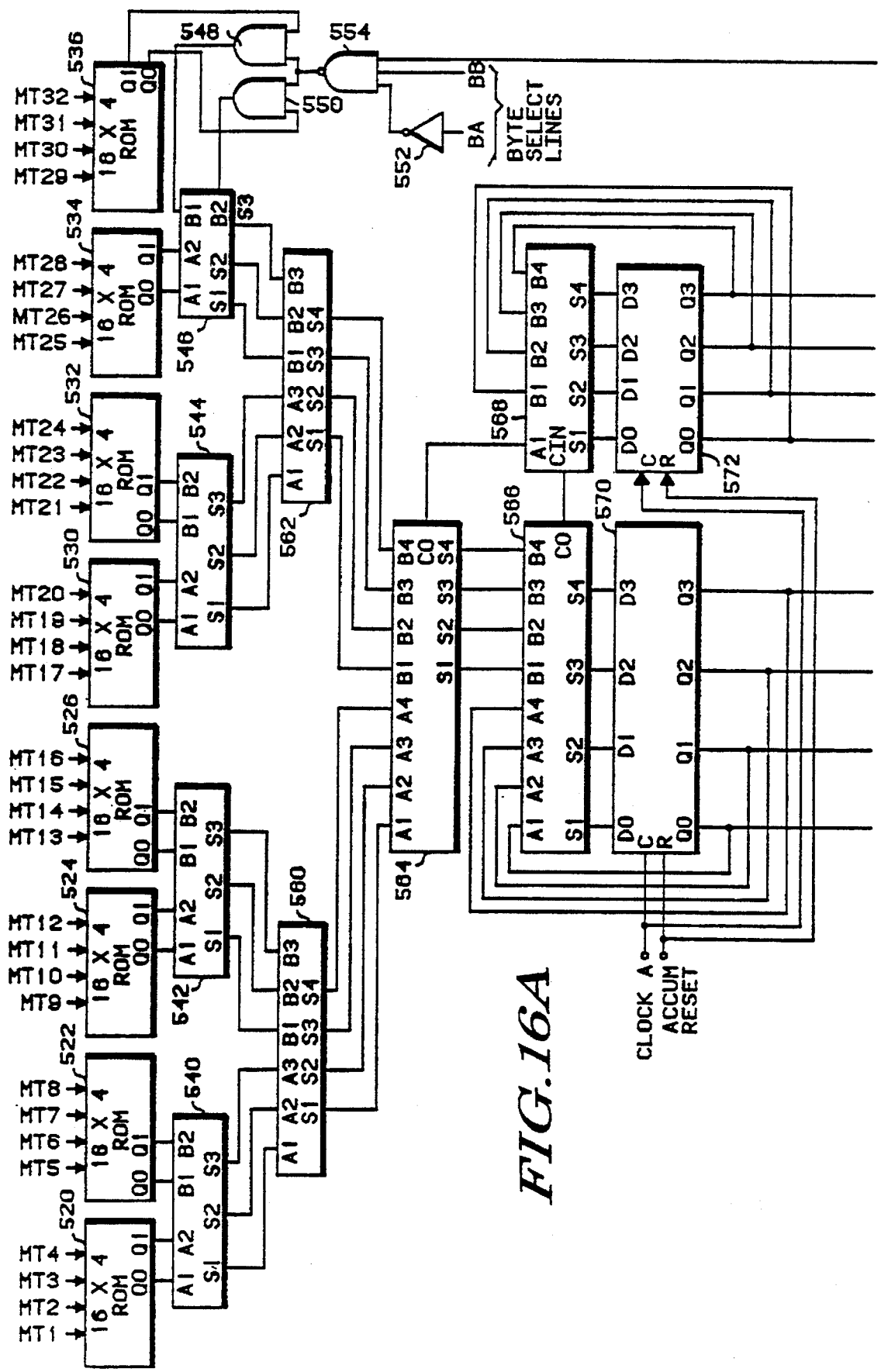
FIGS. 16A and 16B show a detailed schematic for the bit rate detection portion of FIG. 8.
Figure 16B:
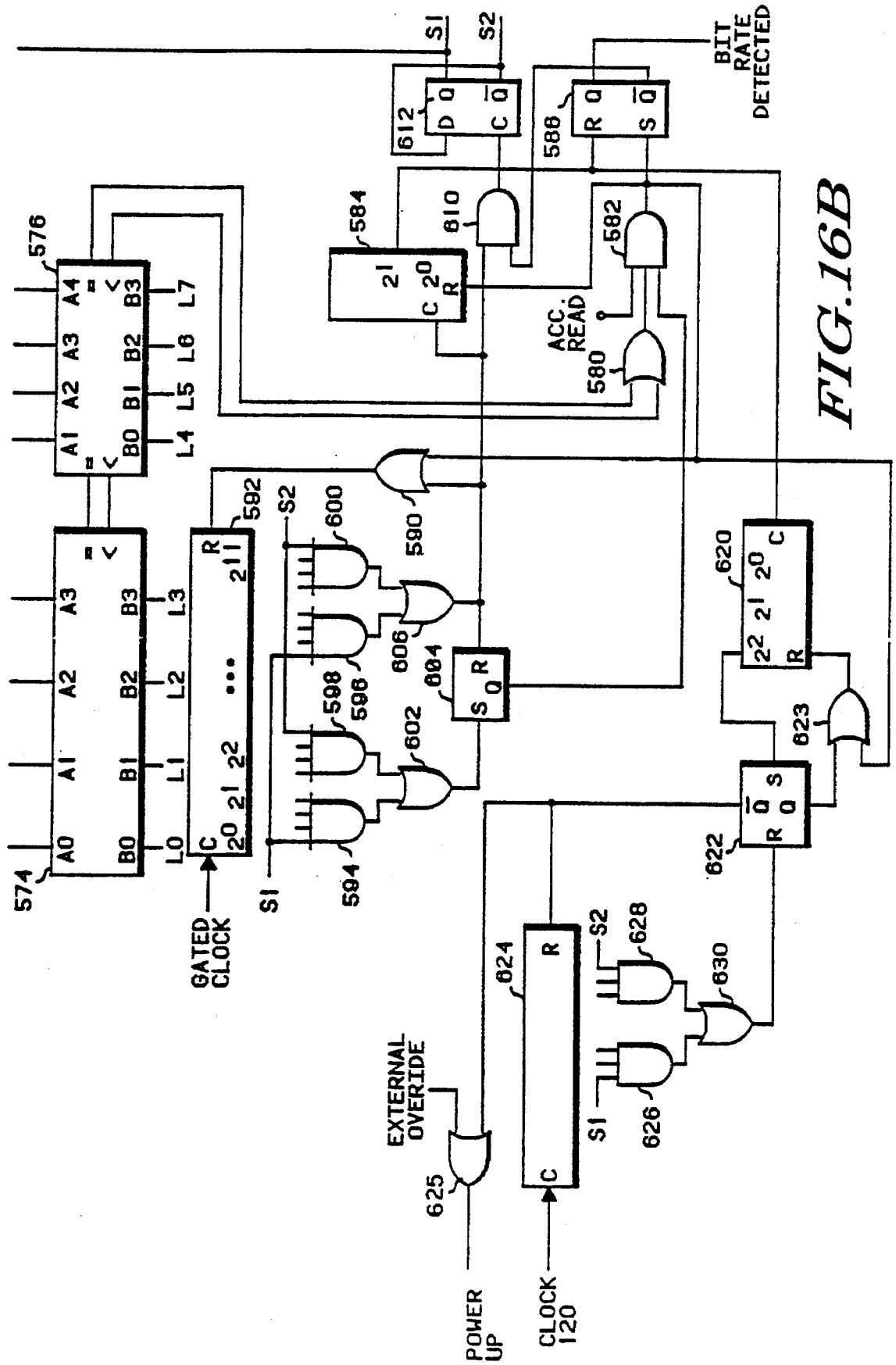

Referring now to FIG. 16B, the four output terminals of D type register 570 and the four output terminals of D type register 572 are supplied respectively to the four input terminals of four bit magnitude comparators 574 and 576 respectively. The equal and less than output terminals of magnitude comparator 574 are connected respectively to the equal and less than input terminals of magnitude comparator 576. The second set of input terminals of four bit magnitude comparator 574 receives a signal designated L0–L3 and the corresponding second set of input terminals of four bit binary magnitude comparator 576 receive signals designated L4–L7. These signals are generated in a manner similar to that used to generate the previous limit values, and their value is controlled by the S1 or S2 signals to provide the correct comparison limit for the determination of the bit rate for the corresponding system.

The equal and less than outputs of magnitude comparator 576 are coupled respectively to the first and second inputs of an OR gate 580. The output of OR 580 is connected to the first input of an AND gate 582. The accumulator read signal is applied to the second input of AND 582. The output of AND 582 is connected to the reset terminal of a two stage binary counter 584, to the S terminal of a flip-flop functioning as a bit rate detect latch 586, and to the first input of an OR 590. The output of OR 590 is connected to the reset terminal of a timer 592 which receives at its clock input terminal the gated clock signal. Timer 592 has a plurality of outputs corresponding to each power of two represented by each of its twelve stages. As will be recalled, for the description of FIG. 15, timer 592 closely corresponds to window timer 472 shown in that figure. Also, appropriately attached to the timer 472 in FIG. 15 were a series of AND gates which control the eventual selection and application of the window limits for the testing of the incoming data. In a similar manner for timer 592 in FIG. 16, system select signal S1 is applied to the first inputs of an AND 594 and an AND 596. The system select signal S2 is applied to the first inputs of an AND 598 and an D 600. The remaining inputs to AND's 594, 596, 598 and 600 are connected to predetermined terminals of timer 592.

There may be appropriately interconnected for whichever timing limits are deemed appropriate. In particular, for system 1 it has been found advantageous to have AND 594 connected such that the output goes to 1 at a count of 92. Similarly, for the upper limit of system 1 AND 596 responds at limit count of 97. For the system 2 select AND 598 responds to the lower limit at the value of 128 and AND 600 responds to the upper limit at the value of 133.

The outputs of AND 594 and AND 598 are coupled respectively to the inputs of an OR 602. The output of OR 602 is coupled to the set terminal of a flip-flop 604. The outputs of AND 596 and AND 600 are connected to the inputs of an OR gate 606. The output of OR gate 606 is connected to the reset terminal of flip-flop 604, to the second input of OR 590, to the first input of an AND 610, and to the clock terminal of counter 584. The Q output of flip-flop 604 is supplied to the third input of AND 582. The output of AND 610 is connected to the C terminal of a D type flip-flop 612. The signals at the Q and $\overline{Q}$ output terminals of flip-flop 612 correspond to the system signals S1 and S2 respectively. As described earlier, the S1 signal is applied to the third input of NAND 554. The system S2 signal is applied also to the D input of flip-flop 612.

The $2^1$ output terminal of counter 584 is supplied to the R terminal of flip-flop 586. The $\overline{Q}$ output of flip-flop 586 is connected to the second input of AND 610. The Q output of flip-flop 586 is a signal which indicates the correct detection of bit rate.

In operation, the bit rate detection, scheme of FIGS. 16A and 16B takes the information from the first tier of multiplexers shown in FIGS. 11A and 11B and applies it to a series of bit rate error ROM's to determine the relative correspondence of the data in the various sample registers. The result of this information analysis procedure is to show if the input signal is a digital bit stream having the correct bit rate.

To confirm that the input signal is a digital waveform of the correct bit rate, the data in the sample registers is examined to determine if there is a phase of the sample clock for which the bit patterns in the four sample registers are identical, or nearly identical within some error margin that allows for errors caused by random noise. That is, if the input is a digital signal of the proper bit rate, there should be some phase of the sample signal at which all or nearly all of the corresponding bit samples have the same value.

To determine the relative degree of correspondence in the sample registers, the corresponding bit positions in each register are connected to a series of bit rate ROM's. The four input signals at the input of each ROM may have any of sixteen different combinations and these are used to address various locations in the ROM to produce a number having a value related to the correspondence among the bit data. This measure of correspondence is converted to a binary output and supplied to a series of four bit adders. The first tier of four bit adders combines the outputs from pairs of bit rate ROM's and the second tier of adders combines the outputs from corresponding pairs of the first tier of four adders. The third tier of adders combines the outputs of the second pair of adders in the second tier. The information thus contained in adder 564 is in effect the accumulative sum for all the correspondence operations that have occurred in bit rate ROM's 520, 522, 524, 526, 530, 532, 534 and 536.

To more fully understand the type of operation that is involved in determining the correspondence among the bits, Table II shows the type of information which is contained in each of the bit rate ROM's. Table II shows four columns indicating the bits which would address the ROM. The table shows all of the sixteen possible binary combinations of inputs. The fifth column shows the decimal equivalent for the value of the correspondence. Correspondence is a matter of similarity or dissimilarity in the bits and is not a function of the respective bit positions in a pattern. The sixth and seventh columns show the binary encoding of the decimal equivalent for the correspondence among the input information. With the information shown in Table II, anyone skilled in the art can construct the appropriate bit rate ROM's to provide the correspondence information which is supplied to the three tiers of adders.

TABLE II

| BIT RATE ROM | | | | | | |
|---|---|---|---|---|---|---|
| Binary Input | | | | Decimal | Binary Output | |
| A | B | C | D | Equivalent | $Q_1$ | $Q_0$ |
| 0 | 0 | 0 | 0 | 0 | 0 | 0 |
| 0 | 0 | 0 | 1 | 1 | 0 | 1 |
| 0 | 0 | 1 | 0 | 1 | 0 | 1 |
| 0 | 0 | 1 | 1 | 2 | 1 | 0 |
| 0 | 1 | 0 | 0 | 1 | 0 | 1 |
| 0 | 1 | 0 | 1 | 2 | 1 | 0 |
| 0 | 1 | 1 | 0 | 2 | 1 | 0 |
| 0 | 1 | 1 | 1 | 1 | 0 | 1 |
| 1 | 0 | 0 | 0 | 1 | 0 | 1 |
| 1 | 0 | 0 | 1 | 2 | 1 | 0 |
| 1 | 0 | 1 | 0 | 2 | 1 | 0 |
| 1 | 0 | 1 | 1 | 1 | 0 | 1 |
| 1 | 1 | 0 | 0 | 2 | 1 | 0 |
| 1 | 1 | 0 | 1 | 1 | 0 | 1 |
| 1 | 1 | 1 | 0 | 1 | 0 | 1 |
| 1 | 1 | 1 | 1 | 0 | 0 | 0 |

As may be recalled from the description of FIG. 14, although the four bit adders can be used to add various combinations of bits, they do not accumulate. Thus, it is necessary to combine adders 566 and 568 along with D type registers 570 and 572 to form an accumulator. That is precisely the function of those four devices and they are interconnected in a manner which is very similar to the description of the function of the two accumulators of FIG. 14.

The eight output terminals of D type registers 570 and 572 which operate as latches are supplied to magnitude comparators 574 and 576. The magnitude comparators 574 and 576 compare the first and second sections of the four bits of the accumulated total of the correspondence of the various bit patterns from the MT signals and compare this with an eight bit number which is selected by the system selection signals S1 or S2. It is also necessary to time the bit detection operation so that the bit rate may be correctly ascertained. Timer 592 is coupled to the gated clock and provides a plurality of outputs for determining timing limits. System 1 and system 2 signals select appropriate combinations of those limits to open and close a window which corresponds to the appropriate time for ascertaining whether there is an acceptable result from the comparison operation performed by magnitude comparators 574 and 576. In particular, the lower limit for system 1 is determined by the interconnections of timer 592 with AND 594 and the upper limit is determined by the interconnections of timer 592 with AND 596.

Similarly, for system 2 select, the lower limit is determined by the interconnection of AND 598 with timer 592 and the upper limit is determined by the interconnections of AND gate 600 with timer 592. The output of OR 602 indicates that, for the selected system, the window is open and that proper comparisons may be made. The output of OR 606 is a signal indicative that the window is closed and that if the correct comparison has not been detected, then the time is inappropriate for the comparison to continue.

For the ECHO system, it is appropriate to have AND 594 enabled at a count of 92 and AND 596 enabled at a count of 96. For the POCSAG system, it is appropriate to have AND 598 enabled at a count of 128, and AND 600 enabled at a count of 132.

The Q output of flip-flop 604 is a signal which is indicative that the time window is open and that is provided to enable AND 582. The Accumulator Read signal which was described in detail in FIG. 14 is also applied to enable AND 9ate 582 to produce a bit rate detected signal in conjunction with the equal or less than outputs operating through OR 580. The output of AND 582 is a signal indicative that the bit rate has been detected. This is applied to a bit rate detect latch comprised of flip-flop 586 which maintains a latched detect and priority condition so long as additional tests of the bit rate continue to confirm that the bit rate is correct. In the event that the comparison does not occur during the window timing operation, the output of OR 606 closes the window through the resetting of flip-flop 604, the disabling of AND 582, the resetting of timer 592 and the disabling of AND 610. It also supplies a clock pulse to counter 584, causing it to advance its state by one count.

Once a bit rate has been correctly detected, the detect bit rate signal is latched in and additional measurements will be made to confirm that the same bit rate is transmitted during the course of decoding. In the event that two attempts at confirming bit rate fail, the $2^1$ output of counter 584 generates a signal at the R terminal of flip-flop 586 to disengage the latch and thus terminate the prioritizing operation, thus causing the system select operation to continue to search the other systems to confirm the detection of the appropriate system characteristic.

While any of a number of IC's may be utilized for the decoder implementation of FIGS. 16A and 16B, the following are appropriate and all have been previously described: for ROM's 520, 522, 524, 526, 530, 532, 534 and 536, a device of the type MC14524; for adders 540, 542, 544, 546, 560, 562, 564, 566 and 568, a device of the type MC14008; for counter or timer 592, a device of the type MC14040; for D type registers 570 and 572, a device of the type MC14076; for comparators 574 and 576, a device of the type MC14585; and for counter 584, a device of the type MC14024.

FIG. 16B also shows the energy conservation means for the adaptive signal decoder. While as will be described in greater detail later, the equivalent microprocessor implementation can provide energy saving functions internally, the decoder requires a counting system to provide energy conservation by delaying and powering down during the time between selecting new decoding schemes.

The $2^1$ output of a counter 584 is connected to the clock input of a three stage binary counter 620. The $2^2$ output terminal of counter 620 is connected to the set terminal of a flip-flop 622. The Q output terminal of flip-flop 622 is connected to the first input of an OR gate 623. The output of OR 623 is connected to the reset terminal of counter 620. The $\overline{Q}$ output terminal of flip-flop 622 is connected to the reset terminal of a multi-stage binary counter 624 and to the first input of an OR gate 625. The second input of OR 626 is supplied by an external override signal which allows the pager operator to override the energy conserving operations of the counter and resume pager operation at any given time. The output of OR 625 is a signal labeled power up which is supplied to devices in FIGS. 8 and 9.

Clock 120 is connected to the clock terminal of counter 624. Counter 624 is defined as having several sages and any of the twelve stage counters previously utilized would be appropriate for its operation. The system select signals S1 and S2 are supplied to the first inputs of AND gates 626 and 628. The second and third inputs to AND's 626 and 628 are not shown but are intended to be connected to any of the various stage output terminals of counter 624 depending upon the time delay operation that is desired. The output of AND's 626 and 628 are connected to the inputs of an OR 630. The output of OR 630 is connected to the reset terminal of flip-flop 622.

In operation, the energy conservation device acts to disable the gated clock signal, and thus to disable most of the decoder, if the bit rate search procedure fails to find an appropriate digital signal after several attempts. Since the decoder is implemented in CMOS logic elements, this disabling of the clock signal acts to reduce the power down by the decoder, and thus to conserve the energy in the battery.

Specifically, each time fail counter 584 generates an output signal at its $2^1$ output terminal, indicating a failure to find the appropriate bit rate for the present system selection; counter 620 is advanced by one count. If there are four successive failures, counter 620 generates an output signal at its $2^2$ output terminal which sets flip-flop 622. The setting of flip-flop 622 causes its $\overline{Q}$ output to be disabled, and as a result, if the external override signal is also disabled, the power up output signal at the output of OR 625 is switched to a low level. The power up signal at a low level disables the gated clock signal at the output of gate 122. At the same time, the $\overline{Q}$ output signal of flip-flop 622 removes a reset condition from counter 624, and counter 624 begins to count. At an appropriate time that could be made to be a function of the present state of the system, select flip-flop 612, one of the AND gates 626 or 628 will be enabled to generate a signal at the output of OR 630 that resets flip-flop 622. This resetting action generates an enabling signal level at the $\overline{Q}$ output of flip-flop 622, which in turn generates a high level, power up signal at the output of OR 625. The system remains enabled until there are again four successive failures to find the correct bit rate. OR gate 623 acts to ensure that only four successive failures cause the decoder to revert to the power saving mode, since any bit rate detect signal from AND 582 resets counter 620.

For the signal decoder, it is desirable to use an MC14040 binary counter for both counter 620 and counter 624. Similarly, an MC14043 Quad R-S latch can be used for flip-flop 622. The connections of the MC14040 counter have been discussed previously, and the proper connections of the R-S flip-flop are obvious to one skilled in the art.

Figure 17A:
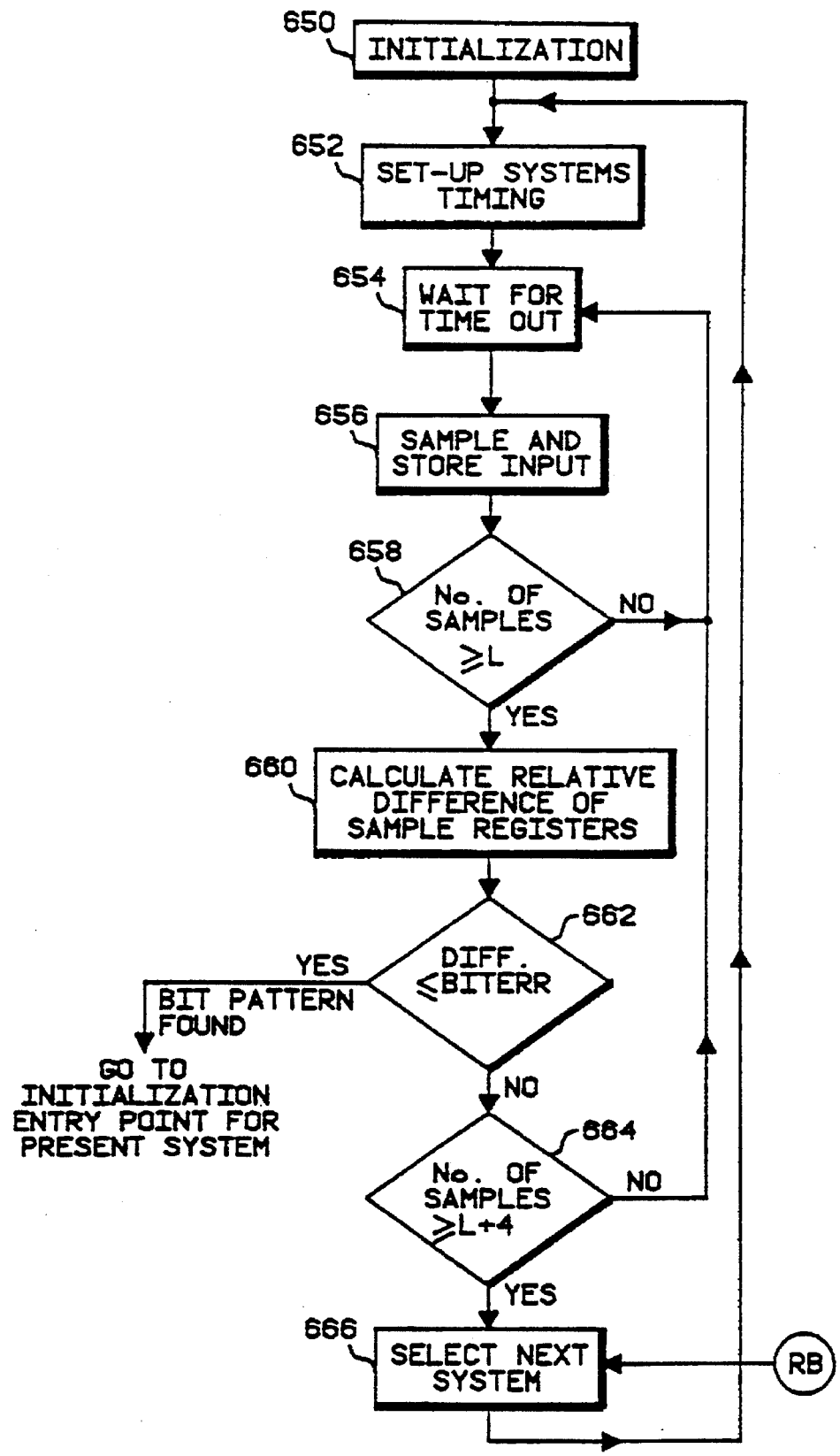
FIGS. 17A through 17E comprise a detailed flowchart of the microcomputer implementation of the preferred embodiments of the invention.

FIGS. 17A, B, C, D and E show a flowchart of the program which will provide for operation of the microcomputer device which is functionally equivalent to that of the adaptive signal decoder described in FIGS. 1-4 and 6-16. For the microcomputer embodiment, reference should, again, be made to FIG. 5 which shows in detail the microcomputer and its associated complement of firmware to achieve the identical function of the signal decoding device. FIG. 17A shows an initialization block 650 coupled to a systems timing block 652. The output of block 652 is coupled to a wait for time out block 654. Block 654, as will be described in detail later, functions as part of the energy conserving means to reduce the power drain from the battery. The output of waiting block 654 is connected to a sample and store input instruction block 656 whose output is connected to a decision block 658 that determines whether the number of data samples meets a fixed limit. The NO branch of decision block 658 is coupled back to the waiting block 654. The YES branch of decision block 658 is coupled to a calculation block 660. When the sample registers are filled with data, calculation block 660 begins the calculation of the relative difference or correspondence between the sampled data in the bit rate comparison operations. The output of calculation block 660 is coupled to decision block 662. The YES branch of decision block 662 is coupled to the initialization block 670 on FIG. 17B. The NO branch of decision block 662 is coupled to decision block 664. Decision block 664 ensures that four more samples have been acquired and the NO branch is coupled back to the wait for time out block 654. The YES branch of decision block 664 is connected to the select block 666 to select the next system. The output of select the next system block 666 is coupled back to the set-up systems timing block 652. Entry point RB is connected to the select next system block 666 as will be described in detail later.

Figure 17B:
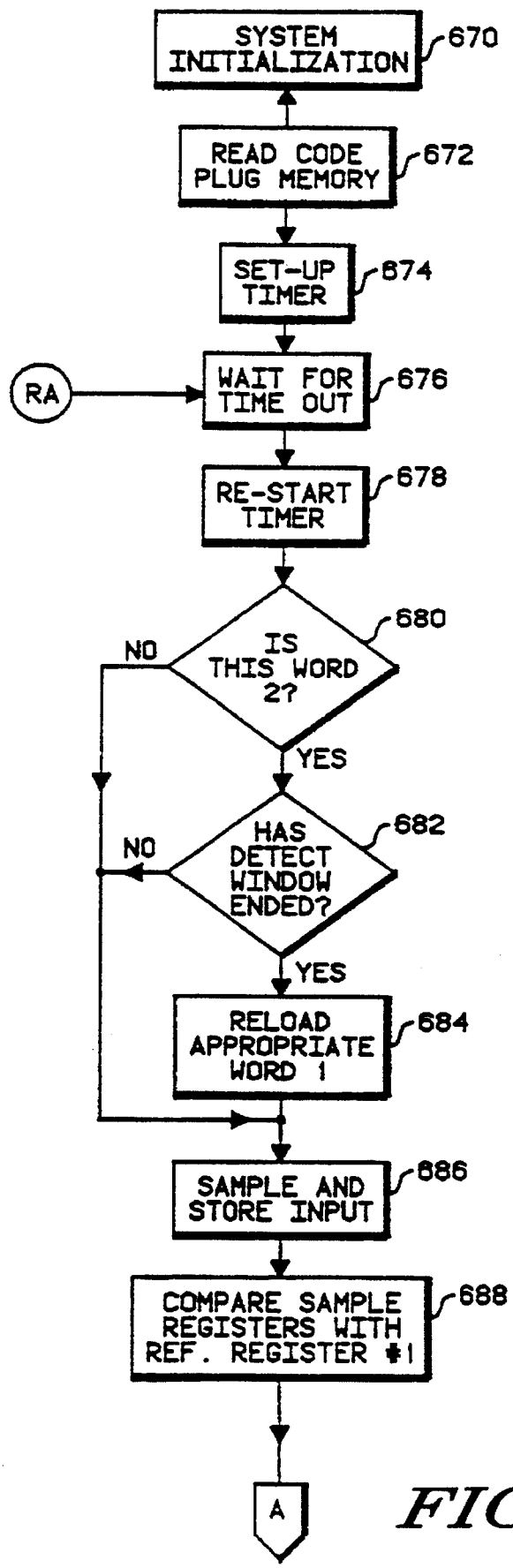

Following the affirmative branch of decision block 662, FIG. 17B shows a system initialization block 670. The output of block 670 is coupled to read code plug memory block 672. The output of block 672 is connected to a set-up timer block 674 and the output of the timer block 674 is connected to the wait for time out block 676. Block 676 has an entry point RA which will be described in greater detail later. Wait for time out block 676 also constitutes part of the energy conserving means for the device. The output of waiting block 676 is connected to a restart timer block 678. The output of restart timer block 678 is connected to decision block 680. Decision block 680 tests whether or not the current word is a second word. The YES branch from decision block 680 is connected to decision block 682. Block 682 determines whether or not the detect window has ended. The YES branch from decision block 682 is connected to a block 684 directing the reloading of word one. The negative branches of decision blocks 680 and 682, along with the output of reload word one block 684 are connected to a sample and store input block 686. Block 686 is representative of the sampling and storing operation used to detect the address word for the individual paging device. The output of sample and store block 686 is connected to block 688 labeled compare sample register with reference register 1. As will be described in greater detail, register 1 at this point contains the pager address word.

Figure 17C:
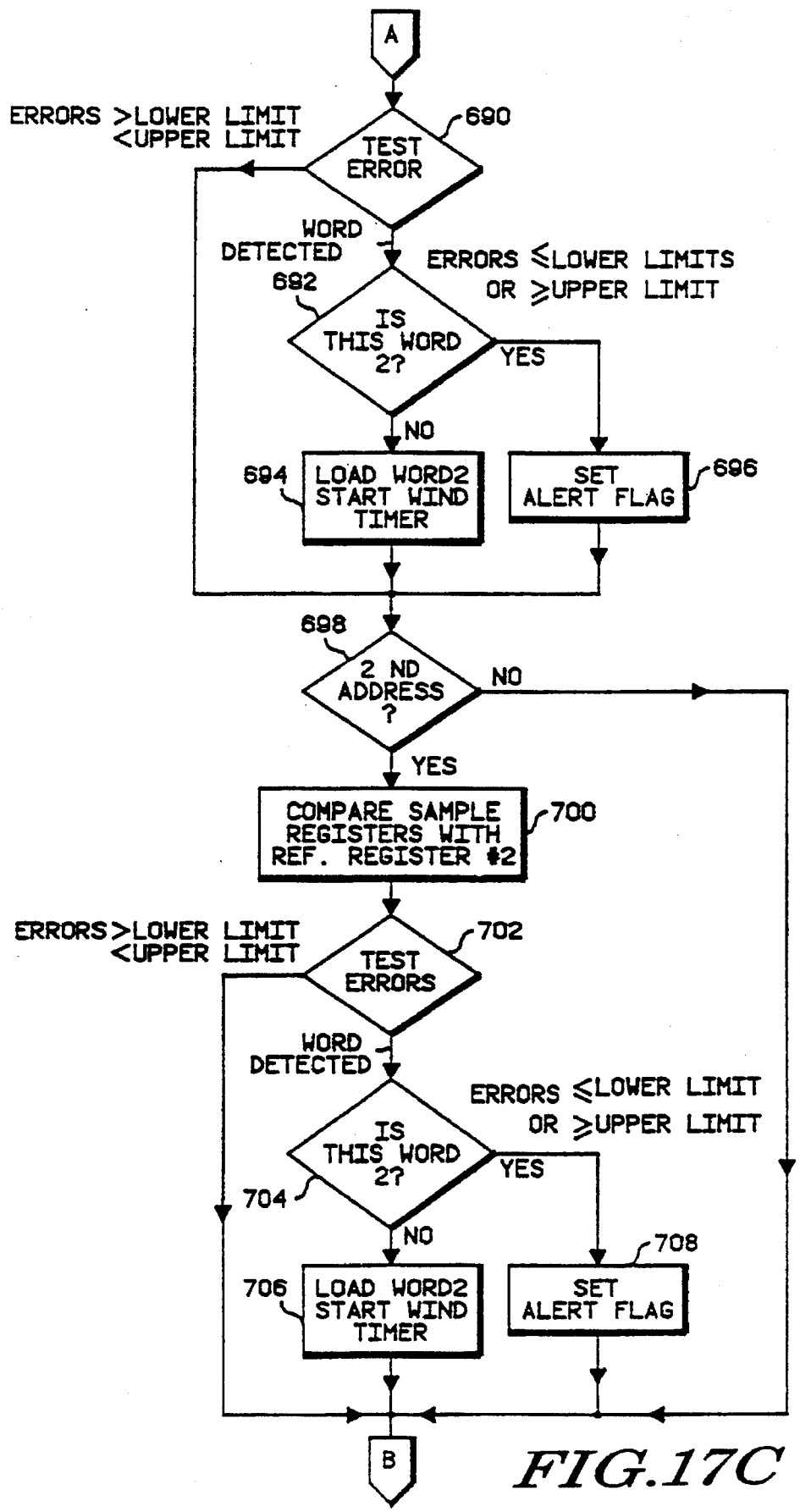

The output of compare block 688 is connected to an connect point labeled with the alphabetic character A which is replicated on FIG. 17C.

FIG. 17C shows point A connected to a decision block 690. The word detect branch from decision block 690 is connected to a second decision block 692 which determines whether or not this is a word 2. The negative branch from decision block 692 is connected to block 694 which orders the loading of word 2 and a restarting of the timer. The YES branch from decision block 692 is connected to a set alert flag block 696. The excessively high and lower limit branch from test error decision block 690, the load word 2 and start timer block 694 and the output of set alert flag block 696 are connected to a decision block 698.

The next series of tests and command blocks, which end at connect point B, are applicable to the ECHO system alone. This results from the fact that the ECHO system may have two independent addresses. Decision block 698 tests whether this is a second address. The NO branch from decision block 698 which is the branch taken during the specification of the S2 POCSAG system, is connected to connect point B. The YES branch of decision block 698 is connected to block 700 which compares the sample register with the reference in register 2. Register 2 contains the second independent address word. The output of compare block 700 is connected to decision block 702. Decision block 702 tests the error limit for the comparison operation commanded by block 700. The word detect branch from decision block 702 is connected to a decision block 704. Decision block 704 tests whether or not this is a second word. The NO branch from decision block 704 is connected to block 706 which causes the loading of word 2 and restarting of the timer. The YES branch of decision block 704 is connected to set alert flag block 708. The excessively high or low limit branch from test error decision block 702, the output of load word 2 block 706 and the output of set alert flag block 708 are all connected to exit point B.

Figure 17D:
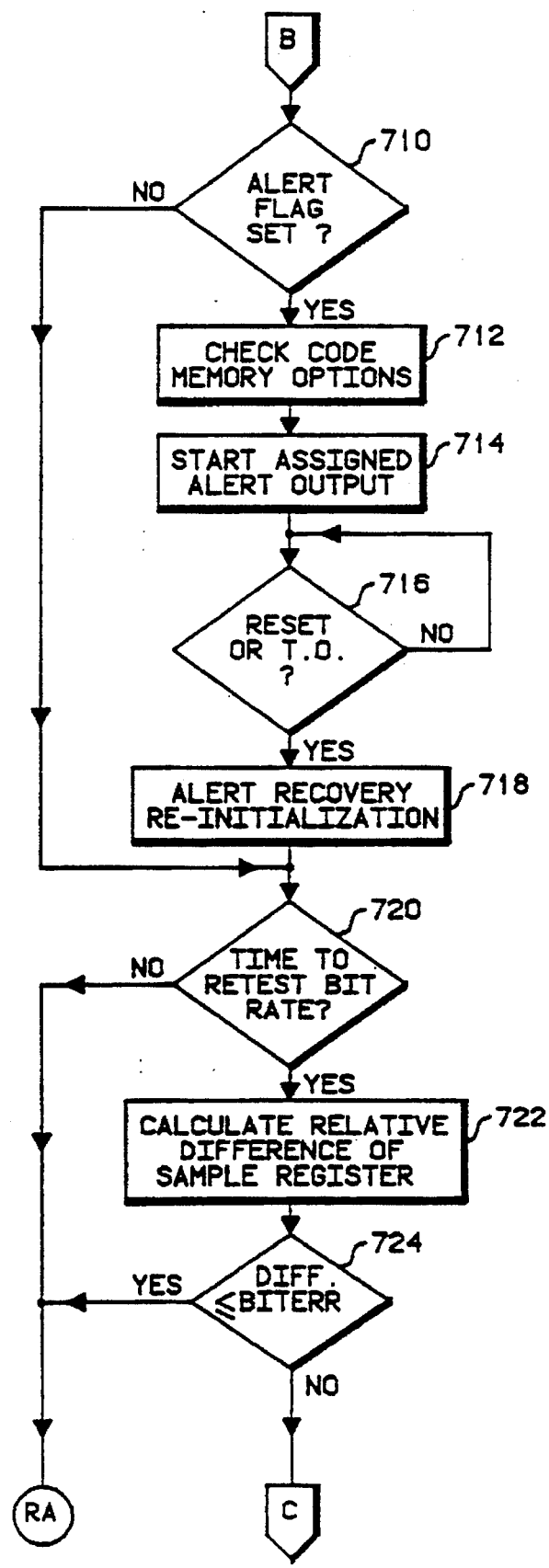

FIG. 17D shows point B connected to a decision block 710. Decision block 710 determines whether or not an alert flag has been set. The YES branch from decision block 710 is connected to the check code memory options block 712. The output of block 712 is connected to the start assigned alert output block 714. The output of block 714 is connected to decision block 716. Block 716 resets the alert output if an external reset signal is received, or if an automatic time out reset occurs. The negative branch of decision block 716 is connected back to its input. The YES branch of decision block 716 is connected to an alert recovery reinitialization block 718. The output of alert recovery block 718 along with the negative branch of alert flag set decision block 710 are connected to decision block 720. decision block 720 tests whether it is the correct time to retest the bit rate. The YES branch from decision block 720 is connected to calculate relative difference of sample register block 722. It may be observed that block 722 is identical to block 660 previously described. The output of calculation block 722 is connected to decision block 724. It may be observed that decision block 724 is identical to decision block 662 previously described. The NO branch of decision block 724 is connected to connect point C. The NO branch of decision block 720 and the YES branch of decision block 724 are connected to exit point RA. It will be recalled that exit point RA corresponds to entry point RA designated in FIG. 17B.

Figure 17E:
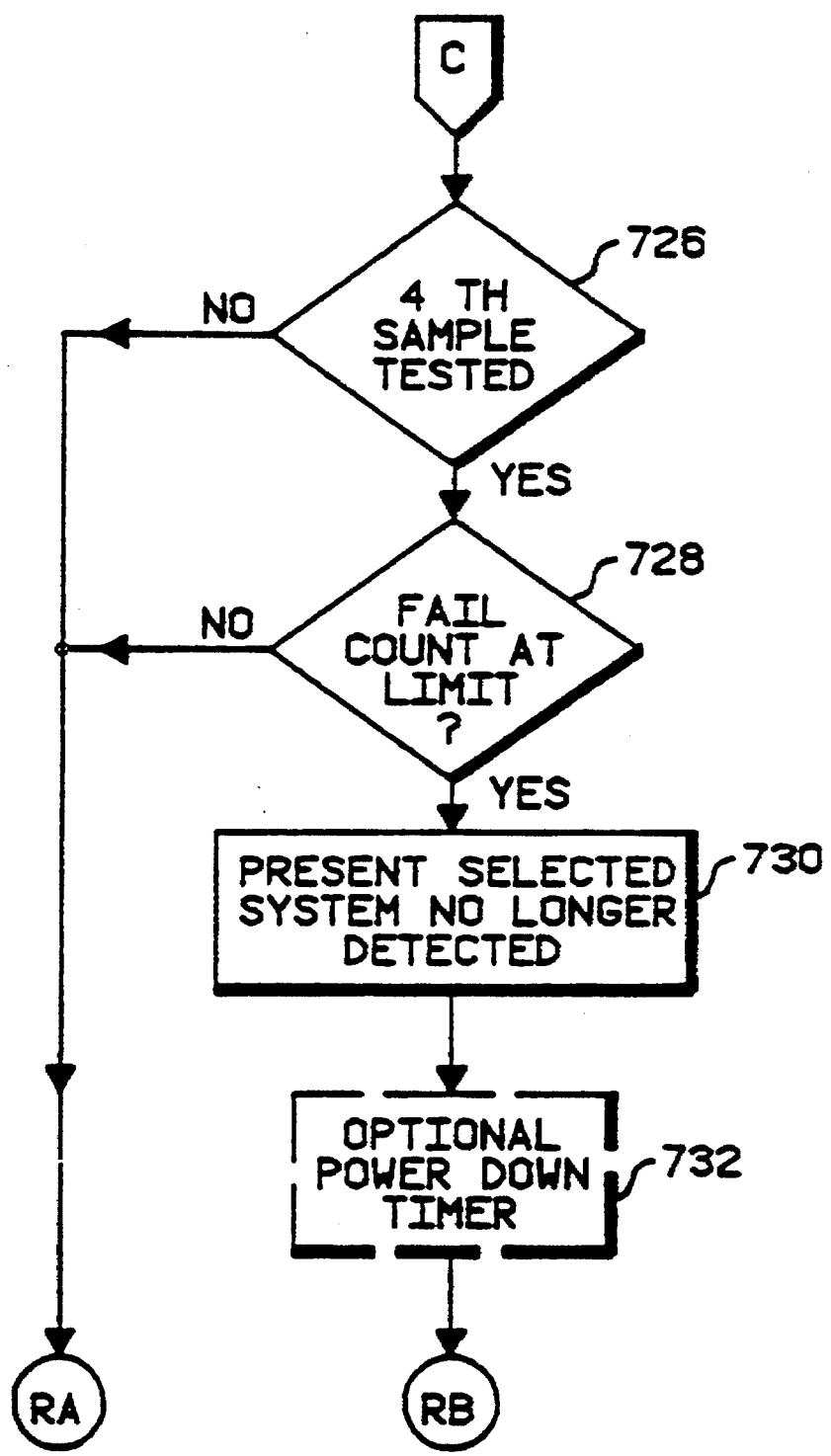

FIG. 17E shows point C connected to decision block 726 which determines whether or not the fourth sample has been tested. The YES branch from decision block 726 is connected to a decision block 728 which determines whether the fail counter is at its limit. The YES branch from decision block 728 is connected to information block 730 which indicates that the present selected system is no longer being detected. Information block 730 is connected to exit point RB through a block 732 that is drawn in phantom. It will be recalled that exit point RB corresponds to entry point RB on FIG. A which is connected to the select the next system block 666. The NO branch from decision block 726 and the NO branch from decision block 728 are connected to exit point RA which, again, is an entry point to block 676 on FIG. 17B. Clock 732 is an optional power down timer which may operate in conjunction with the previously described waiting block 654 and 676 to provide energy conservation in the system. The output of block 732 is connected to exit point RB. It will be recalled that exit point RB corresponds to entry point RB on FIG. 17A.

Functionally, the program represented by the flow-chart directs the microcomputer to function in a remarkably similar manner to the adaptive signal decoder. Thus, after some turn-on initialization procedures that start at block 650, the program sequence directs that the sample registers be filled with data samples (L=92 samples for ECHO and 128 for POCSAG), before the sample data is tested to determine if the input signal is a digital bit stream within the acceptable limits for the bit rate block 660. If the bit rate is found, the program block 662 directs the program to begin decoding the data to determine if an address signal is being transmitted.

The program directs that the input b sampled at the appropriate time (block 676 through 686), and that the samples be stored in appropriate registers (block 686). Then, the contents of the sample register are compared with the address or addresses contained in the code plug memory. In the steps represented by blocks 690, 692, 694 and 696, the samples are compared with an address word in a manner similar to that used in the adaptive signal decoder. However, in the steps represented by blocks 700, 702, 704, 706 and 708, the sample registers are compared with a second address, which is a feature that the adaptive signal decoder does not have. This block permits eight possible combinations of sequential words and their inverses to be directed. Since the POCSAG system does not provide for two independent address assignments, this section of the program is bypassed when the POCSAG system is being decoded.

In each of the decoding steps, the program generates an alert signal if an assigned address signal is received, and this alert signal or flag is decoded in the section of the program represented by blocks 710, 712, 714, 716 and 718, and an appropriate alert signal is generated. As in the adaptive signal decoder, the form of the alert is determined by information contained in the code plug.

Finally, the input signal is periodically retested to determine if the correct bit rate is still being received, and this function is provided by program blocks 720, 722, 724, 726, 728 and 730. If the bit rate test indicates that the proper bit rate is not being received, the firmware system functions just like the adaptive signal decoder, and searches for another system decoding scheme.

The optional timer power down block 732 can, under control of an external input, shut down the operation of the decoder for a predetermined period of, time in a manner that is exactly analogous to the operation for the adaptive signal decoder. This latter mode provides for conservation of the energy in the battery. In addition, another energy conservation means is incorporated into the firmware programing for the microcomputer implementation which has no counterpart in the adaptive signal decoder. That is, as a result of the organization and exclusion of the firmware routines, the microcomputer typically executes the program loop that directs the decoding operation from sample to sample in less time than the time between samples. The microcomputer then powers itself down to a low drain mode until it is time to process the next data sample. This mode of operation is made possible by the combination of the firmware program and the unique WAIT and STOP commands of the 146805 CMOS microprocessor that drastically reduce the power drain of the microprocessor by removing the clock signal from most of its internal circuitry.

To complete the detailed description of the equivalent microcomputer embodiment of the present invention, a program table is included with the detailed information which is stored in memory. Table III is a memory core dump of the entire firmware program which is stored in the microprocessor. The main functional operation of this program is described by the flowchart of FIGS. 17A–17E. The principal program modules designated in the flowchart are also shown in FIG. 5 as being contained in ROM 12.

TABLE III

| | | | | | | | | | | | | | | | | |
|---|---|---|---|---|---|---|---|---|---|---|---|---|---|---|---|---|
| 800 | 3F | 4A | 3F | 46 | 3F | 47 | 3F | 48 | 3F | 49 | A6 | 80 | B7 | 4B | 3F | 10 |
| 810 | 3F | 11 | 3F | 12 | 3F | 13 | 3F | 14 | 3F | 15 | 3F | 16 | 3F | 17 | 3F | 18 |
| 820 | 3F | 19 | 3F | 1A | 3F | 1B | 3F | 1C | 3F | 1D | 3F | 1E | 3F | 1F | A6 | 9F |
| 830 | B7 | 04 | A6 | 00 | B7 | 05 | 5F | BF | 00 | B6 | 01 | E7 | 28 | 5C | A3 | 11 |
| 840 | 26 | F5 | AE | 10 | A6 | 01 | B7 | 58 | B6 | 58 | 27 | 0E | A6 | 5C | B7 | 57 |
| 850 | CD | 0B | DB | CD | 0B | F7 | A6 | C3 | 20 | 09 | A6 | 80 | B7 | 57 | CD | 0C |
| 860 | 13 | A6 | 70 | B7 | 56 | B7 | 08 | A6 | 02 | B7 | 09 | 3F | 48 | 8F | 0B | 00 |
| 870 | 00 | 76 | 66 | 01 | 66 | 02 | 66 | 03 | D6 | 0C | 72 | B7 | 45 | DE | 0C | 70 |
| 880 | 3C | 48 | B6 | 48 | B1 | 57 | 25 | E5 | BF | 54 | B6 | 10 | B8 | 14 | 97 | D6 |
| 890 | 0C | 94 | B7 | 51 | BF | 4C | B6 | 11 | B8 | 15 | 97 | D6 | 0C | 94 | BB | 51 |
| 8A0 | B7 | 51 | BF | 4D | B6 | 12 | B8 | 16 | 97 | D6 | 0C | 94 | BB | 51 | B7 | 51 |
| 8B0 | BF | 4E | B6 | 13 | B8 | 17 | 97 | D6 | 0C | 94 | BB | 51 | B7 | 51 | BF | 4F |
| 8C0 | B6 | 10 | B8 | 18 | 97 | B4 | 4C | B7 | 4C | D6 | 0C | 94 | BB | 51 | B7 | 51 |

TABLE III-continued

| | | | | | | | | | | | | | | | |
|---|---|---|---|---|---|---|---|---|---|---|---|---|---|---|---|
| 8D0 | B6 | 11 | B8 | 19 | 97 | B4 | 4D | B7 | 4D | D6 | 0C | 94 | BB | 51 | B7 | 51 |
| 8E0 | B6 | 12 | B8 | 1A | 97 | B4 | 4E | B7 | 4E | D6 | 0C | 94 | BB | 51 | B7 | 51 |
| 8F0 | B6 | 13 | B8 | 1B | 97 | B4 | 4F | B7 | 4F | D6 | 0C | 94 | BB | 51 | B7 | 51 |
| 900 | B6 | 10 | B8 | 1C | 97 | B4 | 4C | B7 | 4C | D6 | 0C | 94 | BB | 51 | B7 | 51 |
| 910 | B6 | 11 | B8 | 1D | 97 | B4 | 4D | B7 | 4D | D6 | 0C | 94 | BB | 51 | B7 | 51 |
| 920 | B6 | 12 | B8 | 1E | 97 | B4 | 4E | B7 | 4E | D6 | 0C | 94 | BB | 51 | B7 | 51 |
| 930 | B6 | 13 | B8 | 1F | 97 | B4 | 4F | B7 | 4F | D6 | 0C | 94 | BB | 51 | B7 | 51 |
| 940 | B6 | 4C | 97 | D6 | 0C | 94 | B7 | 52 | B6 | 4D | 97 | D6 | 0C | 94 | BB | 52 |
| 950 | B7 | 52 | B6 | 4E | 97 | D6 | 0C | 94 | BB | 52 | B7 | 52 | B6 | 4F | 97 | D6 |
| 960 | 0C | 94 | 48 | 40 | BB | 51 | BE | 54 | A1 | 0D | 25 | 1C | B6 | 57 | AB | 04 |
| 970 | B1 | 48 | 22 | 11 | B6 | 58 | A8 | 01 | B7 | 58 | 3F | 10 | 3F | 14 | 3F | 18 |
| 980 | 3F | 1C | CC | 08 | 48 | CC | 08 | 6D | 3F | 48 | A6 | FF | B7 | 57 | B6 | 58 |
| 990 | 26 | 03 | CC | 0A | 75 | CD | 0B | 96 | CD | 0B | 3A | CD | 0B | AB | A1 | 0C |
| 9A0 | 25 | 0C | A1 | 50 | 25 | 21 | 34 | 4B | B6 | 46 | 27 | 02 | 34 | 4B | B6 | 46 |
| 9B0 | 27 | 21 | B6 | 48 | A1 | 5F | 22 | 24 | A1 | 5C | 25 | 2B | B6 | 4B | B7 | 4A |
| 9C0 | 3F | 46 | CD | 0B | DB | 20 | 20 | B6 | 46 | 27 | 1C | B6 | 48 | A1 | 5F | 22 |
| 9D0 | 0B | 20 | 14 | 3C | 46 | 3F | 48 | CD | 0B | E9 | 20 | 0B | CD | 0B | DB | 3F |
| 9E0 | 46 | 3F | 48 | A6 | 80 | B7 | 4B | CD | 0B | 57 | CD | 0B | C4 | A1 | 0C | 22 |
| 9F0 | 19 | B6 | 47 | 27 | 21 | B6 | 49 | A1 | 5F | 22 | 24 | A1 | 5C | 25 | 25 | A6 |
| A00 | 0F | B7 | 4A | 3F | 47 | CD | 0B | F7 | 20 | 1A | B6 | 47 | 27 | 16 | B6 | 49 |
| A10 | A1 | 5F | 22 | 0B | 20 | 0E | 3C | 47 | 3F | 49 | CD | 0C | 05 | 20 | 05 | CD |
| A20 | 0B | F7 | 3F | 47 | 3C | 48 | 3C | 49 | B6 | 4A | 27 | 38 | A4 | F0 | 27 | 1A |
| A30 | CD | 0B | DB | B6 | 4A | B4 | 28 | A4 | F0 | 27 | 29 | 9B | BF | 54 | AE | FF |
| A40 | 98 | 54 | 49 | 24 | FC | 9F | BE | 54 | 20 | 06 | CD | 0B | F7 | A6 | FF | 9B |
| A50 | 1E | 00 | CD | 0C | 5A | 1F | 00 | CD | 0C | 5A | 0C | 00 | F3 | A6 | 80 | B7 |
| A60 | 4B | 3F | 4A | 9A | CD | 0C | 51 | 3A | 57 | 27 | 03 | CC | 09 | 95 | A6 | 01 |
| A70 | B7 | 57 | CC | 08 | 6B | 8F | 0B | 00 | 00 | 76 | 66 | 01 | 66 | 02 | 66 | 03 |
| A80 | F6 | B8 | 20 | CD | 0B | A2 | B7 | 39 | E6 | 01 | B8 | 21 | CD | 0B | A2 | B7 |
| A90 | 3A | B8 | E6 | 02 | B8 | 22 | CD | 0B | A2 | B7 | 3B | E6 | 03 | B8 | 23 | CD | 0B |
| AA0 | A2 | B7 | 3C | BF | 54 | BE | 45 | B6 | 39 | BB | 3A | BB | 3B | BB | 3C | E7 |
| AB0 | 3D | BE | 54 | B6 | 3D | BB | 3E | BB | 3F | BB | 40 | A1 | 0C | 22 | 17 | B6 |
| AC0 | 46 | 27 | 1F | B6 | 48 | A1 | 83 | 22 | 25 | A1 | 80 | 25 | 26 | 3C | 4A | 3F |
| AD0 | 46 | CD | 0C | 13 | 20 | 1D | B6 | 46 | 27 | 19 | B6 | 48 | A1 | 83 | 22 | 0E |
| AE0 | 20 | 11 | 3C | 46 | 3F | 48 | CD | 0C | 29 | CD | 0C | 61 | 20 | 05 | CD | 0C |
| AF0 | 13 | 3F | 46 | 3C | 48 | B6 | 4A | 27 | 2B | 9B | 3F | 4C | A6 | 7F | 1E | 00 |
| B00 | CD | 0C | 5A | 1F | 00 | CD | 0C | 5A | 3A | 4C | 3A | 4C | 27 | 08 | 0C | 00 |
| B10 | ED | 3F | 4A | 9A | 20 | 0E | CD | 0C | 5A | CD | 0C | 5A | 3A | 4C | 3A | 4C |
| B20 | 27 | DC | 20 | F2 | D6 | 0C | 72 | B7 | 45 | DE | 0C | 5A | 3A | 57 | 27 | 03 |
| B30 | CC | 0A | 75 | A6 | 01 | B7 | 57 | CC | 08 | 6B | F6 | B8 | 20 | CD | 0B | A2 |
| B40 | B7 | 39 | E6 | 01 | B8 | 21 | CD | 0B | A2 | B7 | 3A | E6 | 02 | B8 | 22 | CD |
| B50 | 0B | A2 | B7 | 3B | 3F | 3C | 81 | F6 | B8 | 24 | CD | 0B | A2 | B7 | 39 | E6 |
| B60 | 01 | B8 | 25 | CD | 0B | A2 | B7 | 3A | E6 | 02 | B8 | 26 | CD | 0B | A2 | B7 |
| B70 | 3B | 81 | F6 | B8 | 20 | CD | 0B | A2 | B7 | 39 | E6 | 01 | B8 | 21 | CD | 0B |
| B80 | A2 | B7 | 3A | E6 | 02 | B8 | 22 | CD | 0B | A2 | B7 | 3B | E6 | 03 | B8 | 23 |
| B90 | CD | 0B | A2 | B7 | 3C | 81 | 8F | 0B | 00 | 00 | 76 | 66 | 01 | 66 | 02 | 66 |
| BA0 | 03 | 81 | BF | 54 | 97 | D6 | 0C | 94 | BE | 54 | BF | 54 | BE | 45 | B6 |
| BB0 | 39 | BB | 3A | BB | 3B | BB | 3C | E7 | 3D | BE | 54 | B6 | 3D | BB | 3E | BB |
| BC0 | 3F | BB | 40 | 81 | BF | 54 | BE | 45 | B6 | 39 | BB | 3A | BB | 3B | E7 | 41 |
| BD0 | BE | 54 | B6 | 41 | BB | 42 | BB | 43 | BB | 44 | 81 | B6 | 29 | B7 | 20 | B6 |
| BE0 | 2A | B7 | 21 | B6 | 2B | B7 | 22 | 20 | 52 | B6 | 2C | B7 | 20 | B6 | 2D | B7 |
| BF0 | 21 | B6 | 2E | B7 | 22 | 20 | 44 | B6 | 2F | B7 | 24 | B6 | 30 | B7 | 25 | B6 |
| C00 | 31 | B7 | 26 | 20 | 41 | B6 | 32 | B7 | 24 | B6 | 33 | B7 | 25 | B6 | 34 | B7 |
| C10 | 26 | 20 | 33 | C6 | 0C | 90 | B7 | 20 | C6 | 0C | 91 | B7 | 21 | C6 | 0C | 92 |
| C20 | B7 | 22 | C6 | 0C | 93 | B7 | 23 | 20 | 12 | B6 | 35 | B7 | 20 | B6 | 36 | B7 |
| C30 | 21 | B6 | 37 | B7 | 22 | B6 | 38 | B7 | 23 | 20 | 00 | A6 | 0F | B7 | 3D | B7 |
| C40 | 3E | B7 | 3F | B7 | 40 | 81 | A6 | 0F | B7 | 41 | B7 | 42 | B7 | 43 | B7 | 44 |
| C50 | 81 | D6 | 0C | 72 | B7 | 45 | DE | 0C | 70 | 81 | B7 | 4D | 3A | 4D | 26 | FC |
| C60 | 81 | BF | 54 | B6 | 28 | A4 | 0F | 27 | 0B | AE | 80 | 8F | 5A | 26 | FC | 4A |
| C70 | 26 | F7 | BE | 54 | 81 | 18 | 00 | B6 | 56 | B7 | 08 | 1F | 09 | 19 | 00 | 80 |
| C80 | 14 | 00 | 01 | 00 | 18 | 00 | 02 | 00 | 1C | 00 | 03 | 00 | 10 | 00 | 00 | 00 |
| C90 | 1B | A8 | 4B | 3E | 00 | 01 | 01 | 02 | 01 | 02 | 02 | 03 | 01 | 02 | 02 | 03 |
| CA0 | 02 | 03 | 03 | 04 | 01 | 02 | 02 | 03 | 02 | 03 | 03 | 04 | 02 | 03 | 03 | 04 |
| CB0 | 03 | 04 | 04 | 05 | 01 | 02 | 02 | 03 | 02 | 03 | 03 | 04 | 02 | 03 | 03 | 04 |
| CC0 | 03 | 04 | 04 | 05 | 02 | 03 | 03 | 04 | 03 | 04 | 04 | 05 | 03 | 04 | 04 | 05 |
| CD0 | 04 | 05 | 05 | 06 | 01 | 02 | 02 | 03 | 02 | 03 | 03 | 04 | 02 | 03 | 03 | 04 |
| CE0 | 03 | 04 | 04 | 05 | 02 | 03 | 03 | 04 | 03 | 04 | 04 | 05 | 03 | 04 | 04 | 05 |
| CF0 | 04 | 05 | 05 | 06 | 02 | 03 | 03 | 04 | 03 | 04 | 04 | 05 | 03 | 04 | 04 | 05 |
| D00 | 04 | 05 | 05 | 06 | 03 | 04 | 04 | 05 | 04 | 05 | 05 | 06 | 04 | 05 | 05 | 06 |
| D10 | 05 | 06 | 06 | 07 | 01 | 02 | 02 | 03 | 02 | 03 | 03 | 04 | 02 | 03 | 03 | 04 |
| D20 | 03 | 04 | 04 | 05 | 02 | 03 | 03 | 04 | 03 | 04 | 04 | 05 | 03 | 04 | 04 | 05 |
| D30 | 04 | 05 | 05 | 06 | 02 | 03 | 03 | 04 | 03 | 04 | 04 | 05 | 03 | 04 | 04 | 05 |
| D40 | 04 | 05 | 05 | 06 | 03 | 04 | 04 | 05 | 04 | 05 | 05 | 06 | 04 | 05 | 05 | 06 |
| D50 | 05 | 06 | 06 | 07 | 02 | 03 | 03 | 04 | 03 | 04 | 04 | 05 | 03 | 04 | 04 | 05 |
| D60 | 04 | 05 | 05 | 06 | 03 | 04 | 04 | 05 | 04 | 05 | 05 | 06 | 04 | 05 | 05 | 06 |
| D70 | 05 | 06 | 06 | 07 | 03 | 04 | 04 | 05 | 04 | 05 | 05 | 06 | 04 | 05 | 05 | 06 |
| D80 | 05 | 06 | 06 | 07 | 04 | 05 | 05 | 06 | 05 | 06 | 06 | 07 | 05 | 06 | 06 | 07 |
| D90 | 06 | 07 | 07 | 08 | 00 | 00 | 00 | 00 | 00 | 00 | 00 | 00 | 00 | 00 | 00 | 00 |

While specific embodiments of this invention have been shown and described, further modifications and improvements will occur to those skilled in the art. All modifications which retain the basic underlying principles disclosed and claimed herein are within the scope of this invention.

We claim:

1. A portable receiving device for receiving information modulated upon a transmitted signal, the portable receiving device comprising:

a radio frequency receiver for receiving and demodulating the transmitted signal to produce a received signal having the information;

a programmable computing device responsive to the received signal and having a first mode of operation associated with full computational capability and having a corresponding power drain from a battery, the first mode for at least determining a presence or absence of the information within the received signal, said programmable computing device having a second mode of operation associated with a substantially diminished computational capability and having a diminished power drain from the battery; and an energy conservation device for operating said programmable computing device in the first mode in order to determine the presence or absence of the information and for enabling said programmable computing device to operate in the second mode in response to said programmable computing device determining the absence of the information.

2. The portable receiving device according to claim 1 wherein the programmable computing device is a microcomputer.

3. The device according to claim 1 wherein the programmable computing device comprises:

a read only memory (ROM) for storing a computational program which operates said programmable computing device, the computational program including a processing routine to determine the presence or absence of the information;

an central processing unit (CPU) coupled to said ROM for operating the computational program at a first clock rate associated with full computational capability; and a timing circuit responsive to said energy conservation device for causing said CPU to operate at a second clock rate substantially lower than the first clock rate, thereby causing the CPU to have the substantially diminished computational capability with the diminished power drain from the battery.

4. The portable receiving device according to claim 3 wherein said programmable computing device has a clock coupled to said CPU for generating a predetermined clock rate, wherein said timing circuit generates the second clock rate to be substantially lower than the predetermined clock rate by periodically decoupling said clock from said CPU.

* * * * *